(12) United States Patent
Okamura

(10) Patent No.: US 12,109,869 B2
(45) Date of Patent: Oct. 8, 2024

(54) TEMPERATURE ADJUSTING DEVICE

(71) Applicant: DENSO CORPORATION, Kariya (JP)

(72) Inventor: Toru Okamura, Kariya (JP)

(73) Assignee: DENSO CORPORATION, Kariya (JP)

(*) Notice: Subject to any disclaimer, the term of this patent is extended or adjusted under 35 U.S.C. 154(b) by 515 days.

(21) Appl. No.: 17/354,663

(22) Filed: Jun. 22, 2021

(65) Prior Publication Data

US 2021/0316597 A1    Oct. 14, 2021

Related U.S. Application Data

(63) Continuation of application No. PCT/JP2019/044814, filed on Nov. 15, 2019.

(30) Foreign Application Priority Data

Dec. 26, 2018   (JP) ................. 2018-243390

(51) Int. Cl.
*B60H 1/32*      (2006.01)
*B60H 1/00*      (2006.01)

(52) U.S. Cl.
CPC ..... *B60H 1/32284* (2019.05); *B60H 1/00878* (2013.01); *B60H 1/3227* (2013.01); *B60H 2001/00928* (2013.01); *B60H 2001/00942* (2013.01)

(58) Field of Classification Search
CPC .............. B60H 1/32284; B60H 2001/00928
See application file for complete search history.

(56) References Cited

U.S. PATENT DOCUMENTS

| 2009/0260387 | A1 | 10/2009 | DeFrancesco |
| 2012/0222441 | A1* | 9/2012 | Sawada .............. B60H 1/00907 62/238.1 |
| 2015/0202986 | A1* | 7/2015 | Hatakeyama ........... B60H 1/32 165/287 |
| 2017/0021698 | A1 | 1/2017 | Hatakeyama et al. |
| 2018/0141410 | A1 | 5/2018 | Kami |
| 2018/0312035 | A1* | 11/2018 | Koberstein ........ B60H 1/00899 |

FOREIGN PATENT DOCUMENTS

| CN | 106103154 A | 11/2016 |
| CN | 107531128 A | 1/2018 |
| JP | 2014037178 A | 2/2014 |

* cited by examiner

*Primary Examiner* — Schyler S Sanks
(74) *Attorney, Agent, or Firm* — Harness, Dickey & Pierce, P.L.C.

(57) ABSTRACT

A temperature adjusting device includes a heat radiation portion and a refrigeration cycle device. The heat radiation portion radiates heat of a target object to outside air. The refrigeration cycle device has a condenser and an evaporator. The condenser condenses a high-pressure refrigerant discharged from a compressor that compresses and discharges a refrigerant. The evaporator evaporates a low-pressure refrigerant pressure-reduced in a pressure reducing portion that reduces a pressure of the high-pressure refrigerant. The condenser radiates heat of the high-pressure refrigerant to at least part of the outside air that has passed through the heat radiation portion. The heat radiation portion radiates the heat of the target object to the outside air before heat of the outside air is absorbed in the condenser.

8 Claims, 32 Drawing Sheets

COOLING OPERATION MODE

HEATING OPERATION MODE

BATTERY DEVICE COOLING MODE

BATTERY PRIORITY COOLING MODE

DEVICE INDEPENDENT COOLING MODE

BATTERY INDEPENDENT COOLING MODE

COOLING OPERATION MODE

HEATING OPERATION MODE

BATTERY PRIORITY COOLING MODE

BATTERY COOLING SWITCHING MODE

DEVICE INDEPENDENT COOLING MODE

COOLING OPERATION MODE

HEATING OPERATION MODE

COOLING OPERATION MODE

HEATING OPERATION MODE

XXXV- XXXV

TEMPERATURE ADJUSTING DEVICE

CROSS REFERENCE TO RELATED APPLICATION

The present application is a continuation application of International Patent Application No. PCT/JP2019/044814 filed on Nov. 15, 2019, which designated the U.S. and claims the benefit of priority from Japanese Patent Application No. 2018-243390 filed on Dec. 26, 2018. The entire disclosures of all of the above applications are incorporated herein by reference.

TECHNICAL FIELD

The present disclosure relates to a temperature adjusting device that adjusts a temperature of a temperature adjustment target object.

BACKGROUND

In a temperature adjusting device mounted on a vehicle has, as temperature adjustment target objects, a vehicle-mounted device such as a battery or an inverter that generates heat during operation, or ventilation air that is blown into a vehicle compartment in order to air-condition the vehicle compartment.

For example, the temperature adjusting device includes a vapor-compression type refrigeration cycle device having two evaporators connected in parallel to each other. One of the evaporators cools a coolant of a vehicle-mounted device. The other evaporator cools air blown by a blower that blows air into a vehicle compartment. In this case, the temperature adjusting device performs both adjustment of the temperature of the vehicle-mounted device and air conditioning of the vehicle compartment.

SUMMARY

A temperature adjusting device of an aspect of the present disclosure includes a heat radiation portion and a refrigeration cycle device.

The heat radiation portion radiates a heat of a target object to outside air. The refrigeration cycle device has a condenser and an evaporator. The condenser condenses a high-pressure refrigerant discharged from a compressor that compresses and discharges a refrigerant. The evaporator evaporates a low-pressure refrigerant whose pressure is reduced in a pressure reducing portion that reduces a pressure of the high-pressure refrigerant.

The condenser radiates heat of the high-pressure refrigerant to at least part of the outside air that has passed through the heat radiation portion. The heat radiation portion radiates the heat of the target object to the outside air before heat of the outside air is absorbed in the condenser.

Therefore, in the heat radiation portion, the heat of the target object can be stably radiated to the outside air without being affected by an operation state of the refrigeration cycle device. Thus, even if the refrigeration cycle device is stopped, the target object can be cooled stably. As a result, the target object can be cooled efficiently without causing inefficient energy consumption in the refrigeration cycle device.

BRIEF DESCRIPTION OF THE DRAWINGS

The above and other objects, features and advantages of the present disclosure will become more apparent from the following detailed description made with reference to the accompanying drawings.

DESCRIPTION OF EMBODIMENTS

Figure 1:
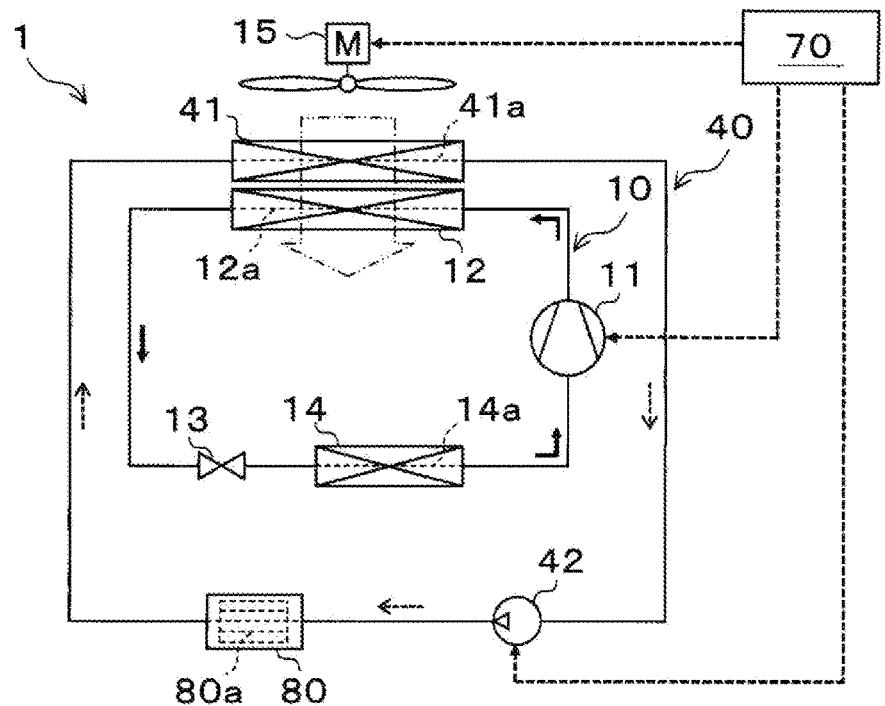
FIG. 1 is an overall configuration diagram of a temperature adjusting device of a first embodiment.

According to the studies by the inventors of the present disclosure, in a temperature adjusting device including a vapor-compression type refrigeration cycle device having two evaporators connected in parallel to each other, it may be difficult to efficiently adjust the temperature of a target object. This is because, for example, even when air conditioning in the vehicle compartment is not required, the refrigeration cycle device is required to be operated in order to adjust the temperature of the vehicle-mounted device, and thus there is concern of causing inefficient energy consumption in the refrigeration cycle device.

More specifically, when both air conditioning in the vehicle compartment and temperature adjustment of the vehicle-mounted device are performed, an operation point of the refrigeration cycle device (specifically, a rotation speed of the compressor, or the like) is different from an operation point of the refrigeration cycle device when only one of the air conditioning in the vehicle compartment and the temperature adjustment of the vehicle-mounted device is performed. This is because cooling capacities required for the refrigeration cycle device are different. In a vapor-compression type refrigeration cycle device, it may be difficult to achieve high operation efficiency at either operation point.

In view of the above circumstances, an object of the present disclosure is to provide a temperature adjusting device capable of efficiently adjusting the temperature of a target object.

A temperature adjusting device according to a first exemplar of the present disclosure includes: an evaporation-side target-object heat exchanger, a refrigeration cycle device, a first heat exchanger, and a second heat exchanger.

The evaporation-side target-object heat exchanger is made to flow therein a first heat medium and to exchange heat with an evaporation-side target object. The refrigeration cycle device includes a condenser and an evaporator. The condenser is configured to condense a high-pressure refrigerant discharged from a compressor that compresses and discharges a refrigerant. The evaporator is configured to evaporate a low-pressure refrigerant pressure reduced in a pressure reducing portion that reduces a pressure of the high-pressure refrigerant. The condensing-side heat exchanger is thermally connected to the condenser and exchanges heat between a second heat medium and the high-pressure refrigerant. The first heat exchanger is configured to exchange heat between the first heat medium flowing out of the evaporation-side target-object heat exchanger and outside air. The second heat exchanger is configured to exchange heat between the second heat medium flowing out of the condensing-side heat exchanger and the outside air.

The first heat exchanger exchanges heat between the first heat medium flowing out of the evaporation-side target-object heat exchanger and the outside air before heat exchange in the second heat exchanger. The second heat exchanger exchanges heat between the second heat medium flowing out of the condensing-side heat exchanger and at least part of the outside air that has passed through the first heat exchanger.

With this configuration, since the evaporation-side target-object heat exchanger and the first heat exchanger are provided, the heat of the evaporation-side target object can be radiated to the outside air via the first heat medium. Consequently, the evaporation-side target object can be cooled.

The first heat exchanger exchanges heat between the first heat medium flowing out of the evaporation-side target object and the outside air before passing through the second heat exchanger. The second heat exchanger exchanges heat between the second heat medium flowing out of the condensing-side heat exchanger and at least part of the outside air that has passed through the first heat exchanger.

Therefore, in the first heat exchanger, the heat absorbed by the first heat medium from the evaporation-side target object can be stably radiated to the outside air without being affected by an operation state of the refrigeration cycle device. That is, even if the refrigerant cycle device is stopped, the evaporation-side target object can be cooled stably. As a result, the evaporation-side target object can be efficiently cooled without causing inefficient energy consumption in the refrigeration cycle device.

A temperature adjusting device according to a second exemplar of the present disclosure includes an evaporation-side target-object heat exchanger, an outside-air-side target-object heat exchanger, a refrigeration cycle device, a condensing-side heat exchanger, an evaporation-side heat exchanger, a first heat exchanger, a second heat exchanger, and a switching unit.

The evaporation-side target-object heat exchanger is made to flow therein a first heat medium and to exchange heat with an evaporation-side target object. The outside-air-side target-object heat exchanger is made to flow therein a second heat medium and to exchange heat with an outside-air-side target object. The refrigeration cycle device that includes a condenser and an evaporator. The condenser is configured to condense a high-pressure refrigerant discharged from a compressor that compresses and discharges a refrigerant. The evaporator is configured to evaporate a low-pressure refrigerant pressure reduced in a pressure reducing portion that reduces a pressure of the high-pressure refrigerant. The condensing-side heat exchanger is thermally connected to the condenser to exchange heat between the first heat medium and the high-pressure refrigerant. The evaporation-side heat exchanger is thermally connected to the evaporator to exchange heat between the first heat medium and the low-pressure refrigerant. The first heat exchanger is configured to exchange heat between the first heat medium and outside air. The second heat exchanger is configured to exchange heat between the second heat medium flowing out of the outside-air-side target-object heat exchanger and the outside air. The switching unit is configured to switch circuit configurations of a first heat medium circuit that circulates the first heat medium.

The switching unit switches a circuit configuration in which the first heat medium is circulated between the evaporation-side heat exchanger and the evaporation-side target-object heat exchanger, a circuit configuration in which the first heat medium is circulated between the evaporation-side heat exchanger and the first heat exchanger, and a circuit configuration in which the first heat medium is circulated between the condensing-side heat exchanger and the first heat exchanger.

The first heat exchanger is configured to exchange heat between the first heat medium and the outside air before heat exchange in the second heat exchanger. The second heat exchanger is configured to exchange heat between the second heat medium flowing out of the outside-air-side target-object heat exchanger and at least part of the outside air that has passed through the first heat exchanger.

With this configuration, since the second heat exchanger is provided, the heat of the outside-air-side target object can be radiated to the outside air via the second heat medium. Therefore, even if the refrigeration cycle device is not operated, the outside-air-side target object can be cooled.

In addition thereto, since the switching unit is provided, the heat of the evaporation-side target object can be radiated to the outside air in the first heat exchanger via the first heat medium, or the outside air can be used as a heat absorption source or a heat radiation destination for the refrigerant in the first heat exchanger according to an operation state of the refrigeration cycle device.

In this case, the first heat exchanger exchanges heat between the first heat medium and the outside air before heat exchange in the second heat exchanger. Therefore, in the first heat exchanger, the heat of the evaporation-side target object can be stably radiated to the outside air or the outside air can be stably used as a heat absorption source or heat radiation destination for the refrigerant without being affected by an amount of heat exchange between the second heat medium and the outside air in the second heat exchanger. As a result, the evaporation-side target object and the outside-air-side target object can be efficiently cooled without causing inefficient energy consumption in the refrigeration cycle device.

A temperature adjusting device according to a third exemplar of the present disclosure includes a refrigeration cycle device, an evaporation-side heat exchanger, an outside-air-side target-object heat exchanger, a first heat exchanger, a condensing-side heat exchanger, a heater, a second heat exchanger, a first switching unit and a second switching unit.

The refrigeration cycle device includes a condenser, an evaporator, and a fluid-side evaporator. The condenser is configured to condense a high-pressure refrigerant discharged from a compressor that compresses and discharges a refrigerant. The evaporator is configured to evaporate a low-pressure refrigerant pressure-reduced in a pressure reducing portion that reduces a pressure of the high-pressure refrigerant. The fluid-side evaporator is configured to evaporate the low-pressure refrigerant pressure-reduced in a fluid-side pressure reducing portion that reduces the pressure of the high-pressure refrigerant, through heat exchange with a cooling target fluid. The evaporation-side heat exchanger is thermally connected to the evaporator and configured to exchange heat between the first heat medium and the low-pressure refrigerant. The outside-air-side target-object heat exchanger is made to flow therein the first heat medium and to exchange heat with an outside-air-side target object. The first heat exchanger is configured to exchange heat between the first heat medium and outside air. The condensing-side heat exchanger is thermally connected to the condenser and is configured to exchange heat between the second heat medium and the high-pressure refrigerant. The heater configured to exchange heat between the second heat medium and a heating target fluid. The second heat exchanger is configured to exchange heat between the second heat medium and the outside air. The first switching unit is configured to switch circuit configurations of a first heat medium circuit that circulates the first heat medium. Furthermore, the second switching unit is configured to switch circuit configurations of a second heat medium circuit that circulates the second heat medium.

The first heat exchanger and the second heat exchanger are disposed such that the outside air that has passed through one of the first and second heat exchangers flows into the other heat exchanger.

In a cooling operation mode in which the cooling target fluid is cooled in the fluid-side evaporator, the first switching unit switches to a circuit configuration in which the first heat medium flowing out of the first heat exchanger flows into the outside-air-side target-object heat exchanger, and the second switching unit switches to a circuit configuration in which the second heat medium flowing out of the condensing-side heat exchanger flows into the second heat exchanger.

In a heating operation mode in which the heating target fluid is heated in the heater, the first switching unit switches to a circuit configuration in which the first heat medium flowing out of the evaporation-side heat exchanger flows into the first heat exchanger and the outside-air-side target-object heat exchanger, and the second switching unit switches to a circuit configuration in which the second heat medium flowing out of the condensing-side heat exchanger flows into the heater.

During the cooling operation mode, a flowing direction of the first heat medium flowing through the first heat exchanger is the same as a flowing direction of the second heat medium flowing through the second heat exchanger. A flowing direction of the first heat medium flowing through the first heat exchanger during the cooling operation mode is different from a flowing direction of the first heat medium flowing through the first heat exchanger during the heating operation mode. Furthermore, a flowing direction of the first heat medium flowing through the outside-air-side target-object heat exchanger during the cooling operation mode is the same as a flowing direction of the first heat medium flowing through the outside-air-side target-object heat exchanger during the heating operation mode.

With this configuration, during the cooling operation mode, the flowing direction of the first heat medium flowing through the first heat exchanger is the same as a flowing direction of the second heat medium flowing through the second heat exchanger. That is, a flow of the first heat medium flowing through the first heat exchanger and a flow of the second heat medium flowing through the second heat exchanger are so-called parallel flows. Therefore, even if a temperature distribution occurs in the outside air passing through one of the first and second heat exchangers, it is possible to restrict the expansion of a temperature difference between the outside air and the heat medium flowing through the other heat exchanger.

Consequently, during the cooling operation mode, the heat exchange efficiency between the heat medium flowing through the other heat exchanger and the outside air can be improved, and thus the cooling target fluid that is a target object can be efficiently cooled.

The flowing direction of the first heat medium flowing through the first heat exchanger during the cooling operation mode is different from the flowing direction of the first heat medium flowing through the first heat exchanger during the heating operation mode. Furthermore, the flowing direction of the first heat medium flowing through the outside-air-side target-object heat exchanger during the cooling operation mode is the same as a flowing direction of the first heat medium flowing through the outside-air-side target-object heat exchanger during the heating operation mode.

Consequently, it is possible to provide a circuit configuration in which the first heat exchanger and the outside-air-side target-object heat exchanger are connected in series during the cooling operation mode. It is possible to provide a circuit configuration in which the first heat exchanger and the outside-air-side target-object heat exchanger are connected in parallel to each other with respect to the flow of the first heat medium flowing out of the evaporation-side heat exchanger during the heating operation mode.

Therefore, during the heating operation mode, a flow rate ratio between a flow rate of the first heat medium flowing into the first heat exchanger and a flow rate of the first heat medium flowing into the outside-air-side target-object heat exchanger is adjusted, and thus an amount of heat absorbed from the target object can be adjusted in the outside-air-side target-object heat exchanger. As a result, during the heating operation mode, an amount of heat absorbed by the first heat medium from the target object can be appropriately adjusted to efficiently heat the heating target fluid.

A temperature adjusting device according to a fourth exemplar of the present disclosure includes a refrigeration cycle device, an evaporation-side heat exchanger, a condensing-side heat exchanger, an outside-air-side target-object heat exchanger, an external heat exchanger, a heater, and a switching unit.

The refrigeration cycle device includes a condenser, an evaporator and a fluid-side evaporator. The condenser is configured to condense a high-pressure refrigerant discharged from a compressor that compresses and discharges a refrigerant. The evaporator is configured to evaporate a low-pressure refrigerant pressure-reduced in a pressure reducing portion that reduces a pressure of the high-pressure refrigerant. The fluid-side evaporator is configured to evaporate the low-pressure refrigerant pressure-reduced in a fluid-side pressure reducing portion that reduces the pressure of the high-pressure refrigerant through heat exchange with a cooling target fluid. The evaporation-side heat exchanger is thermally connected to the evaporator and exchanges heat between a heat medium and the low-pressure refrigerant. The condensing-side heat exchanger is thermally connected to the condenser and exchanges heat between the heat medium and the high-pressure refrigerant. The outside-air-side target-object heat exchanger causes the heat medium to flow and to exchange heat with an outside-air-side target object. The external heat exchanger is configured to exchange heat between the heat medium and outside air. The heater exchanges heat between the heat medium and a heating target fluid. Furthermore, the switching unit is configured to switch circuit configurations of a heat medium circuit that circulates the heat medium.

In a cooling operation mode in which the cooling target fluid is cooled in the fluid-side evaporator, the switching unit switches a circuit configuration in which the heat medium flowing out of the external heat exchanger flows into the condensing-side heat exchanger and the outside-air-side target-object heat exchanger.

In a heating operation mode in which the heating target fluid is heated in the heater, the switching unit switches a circuit configuration in which the heat medium flowing out of the evaporation-side heat exchanger flows into the external heat exchanger and the outside-air-side target-object heat exchanger, and the heat medium flowing out of the condensing-side heat exchanger flows into the heater.

A flowing direction of the heat medium flowing through the external heat exchanger during the cooling operation mode is different from a flowing direction of the heat medium flowing through the external heat exchanger during the heating operation mode. Furthermore, a flowing direction of the heat medium flowing through the outside-air-side target-object heat exchanger during the cooling operation mode is the same as a flowing direction of the heat medium flowing through the outside-air-side target-object heat exchanger during the heating operation mode.

As described above, the flowing direction of the heat medium flowing through the external heat exchanger during the cooling operation mode is made different from the flowing direction of the heat medium flowing through the external heat exchanger during the heating operation mode. Furthermore, the flowing direction of the heat medium flowing through the outside-air-side target-object heat exchanger during the cooling operation mode is made the same as the flowing direction of the heat medium flowing through the outside-air-side target-object heat exchanger during the heating operation mode.

Consequently, it is possible to provide a circuit configuration in which the external heat exchanger and the outside-air-side target-object heat exchanger are connected in series to each other during the cooling operation mode. It is possible to provide a circuit configuration in which the external heat exchanger and the outside-air-side target-object heat exchanger are connected in parallel to each other with respect to the flow of the heat medium flowing out of the evaporation-side heat exchanger during the heating operation mode.

Therefore, a flow rate ratio between a flow rate of the heat medium flowing into the external heat exchanger and a flow rate of the heat medium flowing into the outside-air-side target-object heat exchanger during the heating operation mode is adjusted, and thus an amount of heat absorbed from the target object in the outside-air-side target-object heat exchanger can be adjusted. As a result, during the heating operation mode, an amount of heat absorbed by the heat medium from the target object can be appropriately adjusted, and the heating target fluid that is a target object can be efficiently cooled.

A temperature adjusting device according to a fifth exemplar of the present disclosure includes a refrigeration cycle device, an evaporation-side heat exchanger, an outside-air-side target-object heat exchanger, a first heat exchanger, a condensing-side heat exchanger, a heater, a second heat exchanger, a first switching unit, and a second switching unit.

The refrigeration cycle device includes a condenser, an evaporator and a fluid-side evaporator. The condensation portion is configured to condense a high-pressure refrigerant discharged from a compressor that compresses and discharges a refrigerant. The evaporator is configured to evaporate a low-pressure refrigerant pressure-reduced in a pressure reducing portion that reduces a pressure of the high-pressure refrigerant. The fluid-side evaporator is configured to evaporate the low-pressure refrigerant pressure-reduced in a fluid-side pressure reducing portion that reduces the pressure of the high-pressure refrigerant, through heat exchange with a cooling target fluid. The evaporation-side heat exchanger is thermally connected to the evaporator and exchanges heat between a first heat medium and the low-pressure refrigerant. The outside-air-side target-object heat exchanger causes the first heat medium to flow and to exchange heat with an outside-air-side target object. The first heat exchanger exchanges heat between the first heat medium and outside air. The condensing-side heat exchanger is thermally connected to the condenser and exchanges heat between a second heat medium and the high-pressure refrigerant. The heater exchanges heat between the second heat medium and a heating target fluid. The second heat exchanger exchanges heat between the second heat medium and the outside air. The first switching unit is configured to switch circuit configurations of a first heat medium circuit that circulates the first heat medium. Furthermore, the second switching unit is configured to switch circuit configurations of a second heat medium circuit that circulates the second heat medium.

The first heat exchanger and the second heat exchanger are disposed such that the outside air having passed through one of the first and second heat exchangers flows into the other heat exchanger.

In a cooling operation mode in which the cooling target fluid is cooled in the fluid-side evaporator, the first switching unit is configured to switch a circuit configuration in which the first heat medium flowing out of the first heat exchanger flows into the outside-air-side target-object heat exchanger. Furthermore, the second switching unit is configured to switch a circuit configuration in which the second heat medium flowing out of the condensing-side heat exchanger flows into the second heat exchanger.

In a heating operation mode in which the heating target fluid is heated in the heater, the first switching unit is configured to switch a circuit configuration in which the first heat medium flowing out of the first heat exchanger flows into the evaporation-side heat exchanger and the outside-air-side target-object heat exchanger, and the second switching unit is configured to switch a circuit configuration in which the second heat medium flowing out of the condensing-side heat exchanger flows into the heater.

During the cooling operation mode, a flowing direction of the first heat medium flowing through the first heat exchanger is the same as a flowing direction of the second heat medium flowing through the second heat exchanger, and a flowing direction of the first heat medium flowing through the outside-air-side target-object heat exchanger during the cooling operation mode is the same as a flowing direction of the first heat medium flowing through the outside-air-side target-object heat exchanger during the heating operation mode.

With this configuration, during the cooling operation mode, the flowing direction of the first heat medium flowing through the first heat exchanger is the same as a flowing direction of the second heat medium flowing through the second heat exchanger. That is, a flow of the first heat medium flowing through the first heat exchanger and a flow of the second heat medium flowing through the second heat exchanger are parallel flows. Therefore, even if a temperature distribution occurs in the outside air passing through one of the first and second heat exchangers, it is possible to restrict the expansion of a temperature difference between the outside air and the heat medium flowing through the other heat exchanger.

Consequently, during the cooling operation mode, the heat exchange efficiency between the heat medium flowing through the other heat exchanger and the outside air can be improved, and thus the cooling target fluid that is a target object can be efficiently cooled.

A flowing direction of the first heat medium flowing through the outside-air-side target-object heat exchanger during the cooling operation mode is the same as a flowing direction of the first heat medium flowing through the outside-air-side target-object heat exchanger during the heating operation mode. Therefore, during operations in both the cooling operation mode and the heating operation mode, the first heat medium having a temperature close to the temperature of the outside air flowing out of the first heat exchanger can be made to flow into the outside-air-side target-object heat exchanger. As a result, even if operation modes are switched, the temperature of the target object can be reliably maintained to be the outside air temperature regardless of an operation state of the refrigeration cycle device.

A temperature adjusting device according to a sixth exemplar of the present disclosure includes a refrigeration cycle device, an evaporation-side heat exchanger, a condensing-side heat exchanger, an outside-air-side target-object heat exchanger, an external heat exchanger, a heater, and a switching unit.

The refrigeration cycle device includes a condenser, an evaporator, and a fluid-side evaporator. The condenser is configured to condense a high-pressure refrigerant discharged from a compressor that compresses and discharges a refrigerant. The evaporator is configured to evaporate a low-pressure refrigerant pressure-reduced in a pressure reducing portion that reduces a pressure of the high-pressure refrigerant. The fluid-side evaporator is configured to evaporate the low-pressure refrigerant pressure-reduced in a fluid-side pressure reducing portion that reduces the pressure of the high-pressure refrigerant, through heat exchange with a cooling target fluid. The evaporation-side heat exchanger is thermally connected to the evaporator and exchanges heat between a heat medium and the low-pressure refrigerant. The condensing-side heat exchanger is thermally connected to the condenser and exchanges heat between the heat medium and the high-pressure refrigerant. The outside-air-side target-object heat exchanger causes the heat medium to flow and to exchange heat with an outside-air-side target object. The external heat exchanger exchanges heat between the heat medium and outside air, the heater that exchanges heat between the heat medium and a heating target fluid, and the switching unit is configured to switch circuit configurations of a heat medium circuit that circulates the heat medium.

In a cooling operation mode in which the cooling target fluid is cooled in the fluid-side evaporator, the switching unit is configured to switch a circuit configuration in which the heat medium flowing out of the external heat exchanger flows into the outside-air-side target-object heat exchanger and the condensing-side heat exchanger.

In a heating operation mode in which the heating target fluid is heated in the heater, the switching unit is configured to switch a circuit configuration in which the heat medium flowing out of the external heat exchanger flows into the outside-air-side target-object heat exchanger and the evaporation-side heat exchanger, and the heat medium flowing out of the condensing-side heat exchanger flows into the heater.

A flowing direction of the heat medium flowing through the outside-air-side target-object heat exchanger during the cooling operation mode is the same as a flowing direction of the heat medium flowing through the outside-air-side target-object heat exchanger during the heating operation mode.

With this configuration, the flowing direction of the first heat medium flowing through the outside-air-side target-object heat exchanger during the cooling operation mode is made the same as the flowing direction of the first heat medium flowing through the outside-air-side target-object heat exchanger during the heating operation mode.

Therefore, during operations in both the cooling operation mode and the heating operation mode, the heat medium having a temperature close to the temperature of the outside air flowing out of the external heat exchanger can be made to flow into the outside-air-side target-object heat exchanger. As a result, even if operation modes are switched, the temperature of the target object can be reliably maintained to be the outside air temperature regardless of an operation state of the refrigeration cycle device.

Multiple embodiments for carrying out the present disclosure will be described below with reference to the drawings. In each embodiment, the portions corresponding to the matters described in the preceding embodiments are designated by using the same reference numerals and repeated description will be omitted. When only a part of the configuration is described in each embodiment, other preceding described embodiments may be applied to the other parts of the configuration. Not only a combination of the portions that clearly indicate that the combination is possible in each embodiment, but also a partial combination of the embodiments is possible even if the combination is not clearly described when there is no particular problem in the combination.

First Embodiment

A first embodiment of a temperature adjusting device 1 according to the present disclosure will be described with reference to FIG. 1. The temperature adjusting device 1 of the present embodiment is mounted on an electric vehicle that obtains a traveling driving force from an electric motor. The temperature adjusting device 1 adjusts the temperature of a battery 80 that supplies power to the electric motor or the like in the electric vehicle, and the temperature of the ventilation air that is blown into vehicle compartment that is a space to be air conditioned.

Therefore, the battery 80 and the ventilation air of the present embodiment are target objects whose temperatures are adjusted by temperature adjusting device 1.

The battery 80 is an assembled battery configured by electrically connecting multiple battery cells in series or in parallel. The battery cell is a rechargeable secondary battery (in the present embodiment, a lithium ion battery). The battery 80 is a battery in which multiple battery cells are stacked and arranged to have a substantially rectangular parallelepiped shape and housed in a dedicated case.

In this type of battery, a chemical reaction does not proceed easily at a low temperature and the output tends to decrease. The battery generates heat during an operation (that is, during charging/discharging). The battery tends to deteriorate at a high temperature. Thus, the temperature of the battery is desirable to be maintained within an appropriate temperature range (15° C. or higher and 55° C. or lower in the present embodiment) in which the charging and discharging capacity of the battery can be fully utilized.

The temperature adjusting device 1 includes a refrigeration cycle device 10 and a heat medium circuit 40 as illustrated in the overall configuration diagram of FIG. 1. The refrigeration cycle device 10 is a vapor compression type refrigeration cycle device in which a compressor 11, a condenser 12, an expansion valve 13, and an internal evaporator 14 are connected in a ring shape.

The refrigeration cycle device 10 uses an HFO-based refrigerant (specifically, R1234yf) as a refrigerant. The refrigeration cycle device 10 has a subcritical refrigeration cycle in which the pressure of a high-pressure refrigerant discharged from the compressor 11 does not exceed the critical pressure of the refrigerant. The refrigerant contains a refrigerator oil for lubricating the compressor 11. A part of the refrigerator oil is circulated in the cycle together with the refrigerant.

The compressor 11 sucks the refrigerant in the refrigeration cycle device 10, compresses the refrigerant to become a high-pressure refrigerant, and then discharges the refrigerant. The compressor 11 is an electric compressor that rotationally drives a fixed-capacity compression mechanism having a fixed discharge capacity with an electric motor. A rotation speed (that is, a refrigerant discharge capacity) of the compressor 11 is controlled according to a control signal output from a control device 70 that will be described later.

The condenser 12 is a heat exchanger that condenses the high-pressure refrigerant by exchanging heat between the high-pressure refrigerant discharged from the compressor 11 and the outside air blown from an external blower 15. In the condenser 12, a refrigerant passage 12a through which the high-pressure refrigerant flows is a condenser that condenses the high-pressure refrigerant discharged from the compressor 11. The external blower 15 is an electric blower whose rotation speed (that is, an air blowing capacity) is controlled according to a control voltage output from the control device 70.

The condenser 12 is disposed on the front side of a drive device room. The drive device room forms a space in which at least a part of a drive device (for example, an electric motor) for outputting a traveling driving force is disposed. The drive device room is located on the front side of the vehicle compartment. The outside air is introduced into the drive device room through vent holes provided at a front grille of a foremost portion of the vehicle.

The expansion valve 13 is a pressure reducing portion that reduces a pressure of the high-pressure refrigerant flowing out of the condenser 12 to become a low-pressure refrigerant. In the refrigeration cycle device 10 of the present embodiment, the expansion valve 13 employs a thermal expansion valve that changes a throttle opening degree with a mechanical mechanism such that the degree of superheat of an outlet side refrigerant of the internal evaporator 14 comes close to the predetermined reference degree of superheat.

The internal evaporator 14 is a heat exchanger that evaporates the low-pressure refrigerant by exchanging heat between the low-pressure refrigerant whose pressure is reduced by the expansion valve 13 and the ventilation air blown into the vehicle compartment from the internal blower (not illustrated). In the internal evaporator 14, a refrigerant passage 14a through which the low-pressure refrigerant flows is an evaporator that evaporates the low-pressure refrigerant. The internal blower is an electric blower whose rotation speed (that is, an air blowing capacity) is controlled according to a control voltage output from the control device 70.

The heat medium circuit 40 is a heat medium circulation circuit that circulates a heat medium between a coolant passage 80a of the battery 80 and a radiator 41. As the heat medium, ethylene glycol, dimethylpolysiloxane, a solution containing nanofluid, antifreeze, or the like may be used.

A water pump 42 is disposed in the heat medium circuit 40. The water pump 42 pumps the heat medium flowing out of the radiator 41 to the coolant passage 80a of the battery 80. The water pump 42 is an electric pump whose rotation speed (that is, a water pumping capacity) is controlled according to a control voltage output from the control device 70.

The coolant passage 80a of the battery 80 is provided in a dedicated case of the battery 80. The coolant passage 80a is an evaporation-side target-object heat exchanger that causes the heat medium to flow and exchanges heat with the battery 80. Specifically, the coolant passage 80a is a heat exchanger that causes the heat of the battery 80 (that is, exhaust heat of the battery 80) to be absorbed by the heat medium.

A passage configuration of the coolant passage 80a is a passage configuration in which multiple passages are connected in parallel inside the dedicated case. Consequently, the coolant passage 80a is provided to be capable of evenly absorbing the exhaust heat of the battery 80 over the entire region of the battery 80. In other words, the coolant passage 80a is provided to be capable of evenly absorbing heat of all the battery cells and thus cooling all the battery cells.

The radiator 41 is a first heat exchanger that exchanges heat between the heat medium flowing out of the coolant passage 80a of the battery 80 and the outside air blown from the external blower 15 to radiate the heat of the heat medium to the outside air. In the radiator 41, a heat medium passage 41a through which the heat medium flows is a heat radiation portion that radiates the exhaust heat of the battery 80 to the outside air via the heat medium. An outlet of the heat medium passage 41a is connected to an intake port side of the water pump 42.

The radiator 41 is located on the front side in the drive device and on the upstream side of the condenser 12 in the outside air flowing direction. Thus, when a vehicle is traveling, the radiator 41 can be exposed to the traveling wind. The radiator 41 and the condenser 12 are provided to have substantially the same area of the heat exchangers that contribute to heat exchange when viewed from the outside air flowing direction. The radiator 41 and the condenser 12 are disposed close to each other to overlap each other when viewed from the outside air flowing direction.

Therefore, the condenser 12 exchanges heat between the high-pressure refrigerant discharged from the compressor 11 and the outside air that has passed through the radiator 41. The radiator 41 exchanges heat between the heat medium flowing out of the coolant passage 80a of the battery 80 and the outside air before absorbing heat in the condenser 12.

In other words, the refrigerant passage 12a of the condenser 12 radiates the heat of the high-pressure refrigerant to the outside air that has passed through the radiator 41. The heat medium passage 41a of the radiator 41 radiates the exhaust heat of the battery 80 absorbed by the heat medium to the outside air before absorbing heat in the condenser 12.

The control device 70 is configured with a well-known microcomputer including a CPU, a ROM, a RAM, and the like and its peripheral circuits. The control device 70 performs various calculations and processes based on an air conditioning control program stored in the ROM, and controls operations of various control target devices 11, 15, and 42, and the like connected to an output side thereof.

A control sensor group is connected to an input side of the control device 70. The control sensor group includes an inside air temperature detection unit that detects a vehicle interior temperature (inside air temperature) Tr and a battery temperature detection unit that detects a battery temperature TB that is the temperature of the battery 80.

An operation panel (not illustrated) is connected to the input side of the control device 70. The operation panel includes, for example, a temperature setting unit that sets the vehicle interior temperature. The control device 70 receives a detection signal from the sensor group and an operation signal from the operation panel.

The control device 70 of the present embodiment is integrally provided with a control unit that controls various control target devices connected to the output side thereof. That is, a configuration (hardware and software) that controls an operation of each control target device configure a control unit that controls an operation of each control target device. For example, a configuration that controls an operation of the compressor 11 configures a compressor control unit.

Next, an operation of the temperature adjusting device 1 having the above configuration will be described. In the temperature adjusting device 1, the control device 70 controls operations of the external blower 15 and the water pump 42 such that the battery temperature TB is maintained within an appropriate temperature range. The control device 70 controls operations of the compressor 11, the external blower 15, the internal blower, and the like such that the vehicle interior temperature Tr comes close to a set temperature that is set by the temperature setting unit.

When the control device 70 operates the water pump 42, in the heat medium circuit 40, the heat medium pumped from the water pump 42 flows into the coolant passage 80a of the battery 80. The heat medium that has flowed into the coolant passage 80a absorbs the exhaust heat of the battery 80 when flowing through the coolant passage 80a. Consequently, the battery 80 is cooled.

The heat medium flowing out of the coolant passage 80a flows into the heat medium passage 41a of the radiator 41. The heat medium that has flowed into the heat medium passage 41a radiates the heat to the outside air. Consequently, the heat medium is cooled. The heat medium flowing out of the heat medium passage 41a is sucked into the water pump 42 and is pumped to the coolant passage 80a again.

On the other hand, in the refrigeration cycle device 10, the high-pressure refrigerant discharged from the compressor 11 flows into the refrigerant passage 12a of the condenser 12. The refrigerant that has flowed into the refrigerant passage 12a radiates heat to the outside air that has passed through the radiator 41 and is then condensed. The liquid phase high-pressure refrigerant condensed in the condenser 12 flows into the expansion valve 13 and is reduced in pressure. In this case, the throttle opening degree of the expansion valve 13 is adjusted such that the degree of superheat of the refrigerant on the outlet side of the internal evaporator 14 comes close to the reference degree of superheat.

The low-pressure refrigerant whose pressure is reduced by the expansion valve 13 flows into the refrigerant passage 14a of the internal evaporator 14. The low-pressure refrigerant that has flowed into the refrigerant passage 14a of the internal evaporator 14 exchanges heat with the ventilation air blown from the internal blower to be evaporated. Consequently, the ventilation air is cooled. The refrigerant flowing out of the refrigerant passage 14a of the internal evaporator 14 is sucked into the compressor 11 and is compressed again.

As described above, according to the temperature adjusting device 1 of the present embodiment, the exhaust heat of the battery 80 can be radiated to the outside air by the radiator 41 via the heat medium. Consequently, the battery 80 is cooled and thus it is possible to restrict an increase in the temperature of the battery 80. The ventilation air can be cooled by the internal evaporator 14 to cool the vehicle compartment.

In the temperature adjusting device 1 of the present embodiment, the condenser 12 is disposed on the downstream side of the radiator 41 in the outside air flowing direction. That is, the heat medium passage 41*a* of the radiator 41 radiates the exhaust heat of the battery 80 absorbed by the heat medium to the outside air before absorbing the heat in the condenser 12. The refrigerant passage 12*a* of the condenser 12 radiates the heat of the high-pressure refrigerant to the outside air that has passed through the radiator 41.

Therefore, in the radiator 41, the exhaust heat of the battery 80 can be stably radiated to the outside air via the heat medium without being affected by an operation state of the refrigeration cycle device 10. That is, the battery 80 can be cooled even when the refrigeration cycle device 10 is stopped. As a result, the battery 80 can be cooled efficiently without consuming unnecessary energy in the refrigeration cycle device 10.

When the refrigeration cycle device 10 is operated, a rotation speed of the compressor 11 can be adjusted such that the coefficient of performance (COP) comes close to the maximum value regardless of a heat generation amount of the battery 80. That is, in the refrigeration cycle device 10, the rotation speed of the compressor 11 can be adjusted such that the COP is improved regardless of the temperature of the outside air that has flowed into the condenser 12. Therefore, the internal evaporator 14 can cool the ventilation air efficiently.

In the temperature adjusting device 1, the radiator 41 and the condenser 12 are disposed close to each other to overlap each other when viewed from the outside air flowing direction. The outside air is blown toward the radiator 41 and the condenser 12 by the common external blower 15. Thus, a mounting space for the radiator 41, the condenser 12, and the external blower 15 can be reduced to improve the mounting degree of freedom.

In the present embodiment, an example in which the ventilation air cooled in the internal evaporator 14 is blown into the vehicle compartment has been described, but the ventilation air cooled in the internal evaporator 14 may be blown to the battery 80. Thus, the temperature adjusting device 1 may be used as a battery cooling device used only for cooling the battery 80.

In this case, the refrigeration cycle device 10 may be stopped when the water pump 42 and the external blower 15 can be operated to maintain the temperature of the battery 80 within an appropriate temperature range. Therefore, a target object whose temperature is adjusted (battery 80 in the present embodiment) can be cooled efficiently.

Second Embodiment

Figure 2:
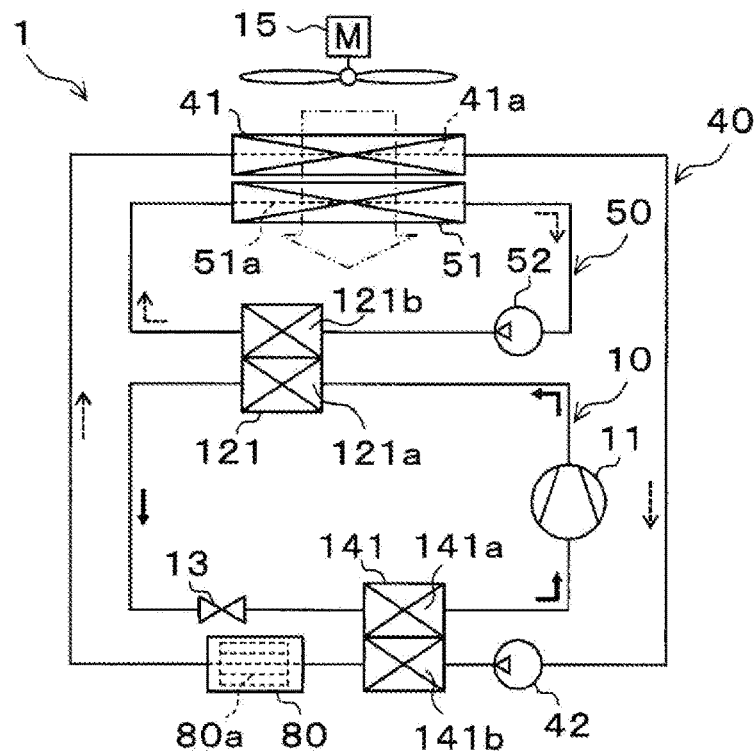
FIG. 2 is an overall configuration diagram of a temperature adjusting device of a second embodiment.

In the present embodiment, as illustrated in FIG. 2, an example in which a second heat medium circuit 50 is added compared with the first embodiment will be described. The temperature adjusting device 1 of the present embodiment is applied to a battery cooling device that cools the battery 80. In FIG. 2, for clarification, the control device 70 and the power lines or the signal lines connecting the control device 70 to various control target devices are not illustrated. This is the same for other drawings.

In the present embodiment, for clarification of description, the heat medium circuit 40 described in the first embodiment is referred to as a first heat medium circuit 40. Constituent devices of the first heat medium circuit 40 are added with "first" or the like and are described. For example, the water pump 42 described in the first embodiment will be referred to as a first battery side water pump 42. The heat medium will be referred to as a first heat medium. The radiator 41 will be referred to as a first radiator 41.

In the refrigeration cycle device 10 of the present embodiment, a water-refrigerant heat exchanger 121 is used instead of the condenser 12. In the refrigeration cycle device 10 of the present embodiment, a chiller 141 is used instead of the internal evaporator 14.

The water-refrigerant heat exchanger 121 has a refrigerant passage 121*a* and a heat medium passage 121*b*. The refrigerant passage 121*a* is a passage through which the high-pressure refrigerant discharged from the compressor 11 flows. The heat medium passage 121*b* is a passage through which the second heat medium circulated in the second heat medium circuit 50 flows. The water-refrigerant heat exchanger 121 is a heat exchanger that exchanges heat between the high-pressure refrigerant flowing through the refrigerant passage 121*a* and the second heat medium flowing through the heat medium passage 121*b*.

Therefore, in the refrigerant passage 121*a* when the refrigeration cycle device 10 is being operated, the high-pressure refrigerant radiates heat to the second heat medium and is then condensed. On the other hand, in the heat medium passage 121*b*, the second heat medium absorbs heat from the high-pressure refrigerant and is heated.

That is, the refrigerant passage 121*a* is a condenser that condenses the high-pressure refrigerant discharged from the compressor 11. The heat medium passage 121*b* is a condensing-side heat exchanger that is thermally connected to the condenser to exchange heat between the second heat medium and the high-pressure refrigerant and causes the heat of the high-pressure refrigerant to be absorbed by the second heat medium.

The second heat medium circuit 50 is a heat medium circulation circuit that circulates the second heat medium between the heat medium passage 121*b* of the water-refrigerant heat exchanger 121 and the second radiator 51. The same heat medium as the first heat medium may be used as the second heat medium.

A second heat exchanger side water pump 52 is disposed in the second heat medium circuit 50. The second heat exchanger side water pump 52 pumps the second heat medium flowing out of the second radiator 51 to the heat medium passage 121*b* of the water-refrigerant heat exchanger 121. A fundamental configuration of the second heat exchanger side water pump 52 is the same as that of the first battery side water pump 42. The second radiator 51 is a second heat exchanger that exchanges heat between the second heat medium flowing out of the heat medium passage 121*b* of the water-refrigerant heat exchanger 121 and the outside air blown from the external blower 15. An intake port side of the second heat exchanger side water pump 52 is connected to the second heat medium passage 51*a* of the second radiator 51.

The second radiator 51 is disposed on the front side in the drive device in the same manner as the condenser 12 described in the first embodiment. That is, the second radiator 51 is disposed on the downstream side of the first radiator 41 in the outside air flowing direction.

The first radiator 41 and the second radiator 51 are provided to have substantially the same area of heat exchangers that contribute to heat exchange when viewed from the outside air flowing direction. The first radiator 41 and the second radiator 51 are disposed close to each other to overlap each other when viewed from the outside air flowing direction.

Therefore, the second radiator 51 exchanges heat between the second heat medium flowing out of the heat medium passage 121b of the water-refrigerant heat exchanger 121 and the outside air that has passed through the first radiator 41. The first radiator 41 exchanges heat between the first heat medium flowing out of the coolant passage 80a of the battery 80 and the outside air before heat exchange with the second heat medium in the second radiator 51.

In other words, the first heat medium passage 41a of the first radiator 41 radiates the exhaust heat of the battery 80 absorbed by the first heat medium to the outside air before absorbing heat in the second radiator 51. The second heat medium passage 51a of the second radiator 51 radiates the heat of the high-pressure refrigerant absorbed by the second heat medium to the outside air that has passed through the first radiator 41.

The chiller 141 has a refrigerant passage 141a and a heat medium passage 141b. The refrigerant passage 141a is a passage through which a low-pressure refrigerant whose pressure is reduced by the expansion valve 13 flows. The heat medium passage 141b is a passage through which the first heat medium circulated in the first heat medium circuit 40 flows. The chiller 141 is a heat exchanger that exchanges heat between the low-pressure refrigerant flowing through the refrigerant passage 141a and the first heat medium flowing through the heat medium passage 141b.

Therefore, in the refrigerant passage 141a when the refrigeration cycle device 10 is being operated, the low-pressure refrigerant absorbs heat from the first heat medium to be evaporated. On the other hand, in the heat medium passage 141b, the second heat medium is cooled by the heat thereof being absorbed by the low-pressure refrigerant.

That is, the refrigerant passage 141a is an evaporator that evaporates the low-pressure refrigerant whose pressure is reduced by the expansion valve 13. The heat medium passage 141b is an evaporation-side heat exchanger that is thermally connected to the evaporator, exchanges heat between the first heat medium and the low-pressure refrigerant and thus causes the heat of the first heat medium to be absorbed by the low-pressure refrigerant.

An inlet side of the coolant passage 80a of the battery 80 is connected to an outlet of the heat medium passage 141b. Remaining configurations of the first heat medium circuit 40 are the same as those in the first embodiment. Therefore, the first heat medium circuit 40 and the second heat medium circuit 50 of the present embodiment form independent heat medium circuits that do not mix the first heat medium and the second heat medium.

The battery 80 of the present embodiment is an evaporation-side target object and is included in a target object on which the temperature adjusting device 1 performs temperature adjustment. The coolant passage 80a is an evaporation-side target-object heat exchanger.

Next, an operation of the temperature adjusting device 1 of the present embodiment having the above configuration will be described. In the temperature adjusting device 1 of the present embodiment, the control device 70 controls an operation of each control target device connected to the output side thereof such that the battery temperature TB is maintained within an appropriate temperature range. The temperature adjusting device 1 of the present embodiment may switch between a first battery cooling mode and a second battery cooling mode according to the battery temperature TB.

(a) First Battery Cooling Mode

The first battery cooling mode is executed when the battery temperature TB becomes equal to or higher than a predetermined first reference temperature KTB1. The first reference temperature KTB1 is set to a value (30° C. in the present embodiment) equal to or smaller than an upper limit value within the appropriate temperature range of the battery 80. In the first battery cooling mode, the control device 70 operates the external blower 15 and the first battery side water pump 42. The control device 70 stops the compressor 11 and the second heat exchanger side water pump 52.

Therefore, in the first heat medium circuit 40, the first heat medium pumped from the first battery side water pump 42 flows into the heat medium passage 141b of the chiller 141. In the first battery cooling mode, the compressor 11 is stopped. Therefore, the first heat medium flows into the coolant passage 80a of the battery 80 without being cooled in the heat medium passage 141b.

The first heat medium that has flowed into the coolant passage 80a absorbs the exhaust heat of the battery 80 when flowing through the coolant passage 80a. Consequently, the battery 80 is cooled. The first heat medium flowing out of the coolant passage 80a flows into the first heat medium passage 41a of the first radiator 41.

The first heat medium that has flowed into the first heat medium passage 41a radiates the heat to the outside air. Consequently, the first heat medium is cooled. The first heat medium flowing out of the first heat medium passage 41a is sucked into the first battery side water pump 42 and is pumped to the coolant passage 80a again.

Therefore, in the first battery cooling mode, the exhaust heat of the battery 80 can be radiated to the outside air in the first radiator 41 via the first heat medium. Consequently, the battery 80 can be cooled.

(b) Second Battery Cooling Mode

The second battery cooling mode is executed when the battery temperature TB increases above the first reference temperature KTB1 and reaches a predetermined second reference temperature KTB2 or higher. The second reference temperature KTB2 is set to a value (45° C. in the present embodiment) more than the first reference temperature KTB1 and is equal to or less than the upper limit value within the appropriate temperature range of the battery 80.

In the second battery cooling mode, the control device 70 operates the external blower 15 and the first battery side water pump 42. The control device 70 operates the compressor 11 and the second heat exchanger side water pump 52.

Therefore, in the first heat medium circuit 40, similarly to the first battery cooling mode, the first heat medium pumped from the first battery side water pump 42 is circulated in an order of the heat medium passage 141b of the chiller 141, the coolant passage 80a of the battery 80, the first heat medium passage 41a of the first radiator 41, and the intake side of the first battery side water pump 42.

Consequently, in the first heat medium circuit 40, the exhaust heat of the battery 80 absorbed by the first heat medium when the first heat medium flows through the coolant passage 80a of the battery 80 can be radiated to the outside air in the first radiator 41.

In the second heat medium circuit 50, the second heat medium pumped from the second heat exchanger side water pump 52 flows into the heat medium passage 121b of the water-refrigerant heat exchanger 121. The second heat medium that has flowed into the heat medium passage 121*b* is heated by absorbing heat from the high-pressure refrigerant flowing through the refrigerant passage 121*a* of the water-refrigerant heat exchanger 121.

The second heat medium flowing out of the heat medium passage 121*b* flows into the second heat medium passage 51*a* of the second radiator 51. The second heat medium that has flowed into the second heat medium passage 51*a* radiates heat to the outside air that has passed through the first radiator 41. Consequently, the second heat medium is cooled. The second heat medium flowing out of the second heat medium passage 51*a* is sucked into the second heat exchanger side water pump 52 and is pumped to the heat medium passage 121*b* again.

In the refrigeration cycle device 10, the high-pressure refrigerant discharged from the compressor 11 flows into the refrigerant passage 121*a* of the water-refrigerant heat exchanger 121. The high-pressure refrigerant that has flowed into the refrigerant passage 121*a* radiates heat to the second heat medium flowing through the heat medium passage 121*b* of the water-refrigerant heat exchanger 121 to be condensed.

The refrigerant condensed in the refrigerant passage 121*a* of the water-refrigerant heat exchanger 121 flows into the expansion valve 13 and is reduced in pressure. In this case, the throttle opening degree of the expansion valve 13 is adjusted such that the degree of superheat of the outlet side refrigerant of the internal evaporator 14 comes close to the reference degree of superheat. The low-pressure refrigerant whose pressure is reduced in the expansion valve 13 flows into the refrigerant passage 141*a* of the chiller 141.

The low-pressure refrigerant that has flowed into the refrigerant passage 141*a* of the chiller 141 absorbs heat from the first heat medium flowing through the heat medium passage 141*b* to be evaporated. Consequently, the first heat medium flowing through the heat medium passage 141*b* of the chiller 141 is cooled. The refrigerant flowing out of the refrigerant passage 141*a* is sucked into the compressor 11 and is compressed again.

Therefore, in the second battery cooling mode, it is possible to restrict an increase in the temperature of the battery 80 in the same manner as in the first battery cooling mode. In the second battery cooling mode, the temperature of the first heat medium that has flowed into the coolant passage 80*a* of the battery 80 can be made lower than in the first battery cooling mode. Therefore, in the second battery cooling mode, it is possible to cool the battery 80 with a higher cooling capacity than in the first battery cooling mode.

As described above, according to the temperature adjusting device 1 of the present embodiment, the battery 80 can be cooled and an increase in the temperature of the battery 80 can be restricted.

In the temperature adjusting device 1 of the present embodiment, the second radiator 51 is disposed on the downstream side of the first radiator 41 in the outside air flowing direction. That is, the second radiator 51 exchanges heat between the second heat medium flowing out of the heat medium passage 121*b* of the water-refrigerant heat exchanger 121 and the outside air that has passed through the first radiator 41. The first radiator 41 exchanges heat between the first heat medium flowing out of the coolant passage 80*a* of the battery 80 and the outside air before passing through the second radiator 51.

Therefore, in the first radiator 41, the exhaust heat of the battery 80 can be stably radiated to the outside air via the first heat medium without being affected by an operation state of the refrigeration cycle device 10. In the same manner as in the first battery cooling mode, the battery 80 can be cooled even if the refrigeration cycle device 10 is stopped. As a result, the battery 80 can be cooled efficiently without consuming unnecessary energy in the refrigeration cycle device 10.

Since the temperature adjusting device 1 of the present embodiment includes the chiller 141, the first heat medium is cooled during the second battery cooling mode, and the battery 80 is cooled with a higher cooling capacity than in the first battery cooling mode. Therefore, the battery 80 can be reliably cooled through switching to the second battery cooling mode under an operation condition that the battery 80 is not sufficiently cooled during the first battery cooling mode.

as a result, according to the temperature adjusting device 1 of the present embodiment, the battery 80 can be cooled efficiently and reliably without consuming unnecessary energy in the refrigeration cycle device 10.

In the temperature adjusting device 1 of the present embodiment, the first heat medium circuit 40 and the second heat medium circuit 50 form heat medium circuits that are independent from each other. Thus, there is no temperature change in the first heat medium due to mixing of the first heat medium and the second heat medium. Therefore, it is easy to adjust the temperature of the first heat medium in the refrigeration cycle device 10. As a result, it is easy to more reliably maintain the temperature of the battery 80 within the appropriate temperature range.

Third Embodiment

Figure 3:
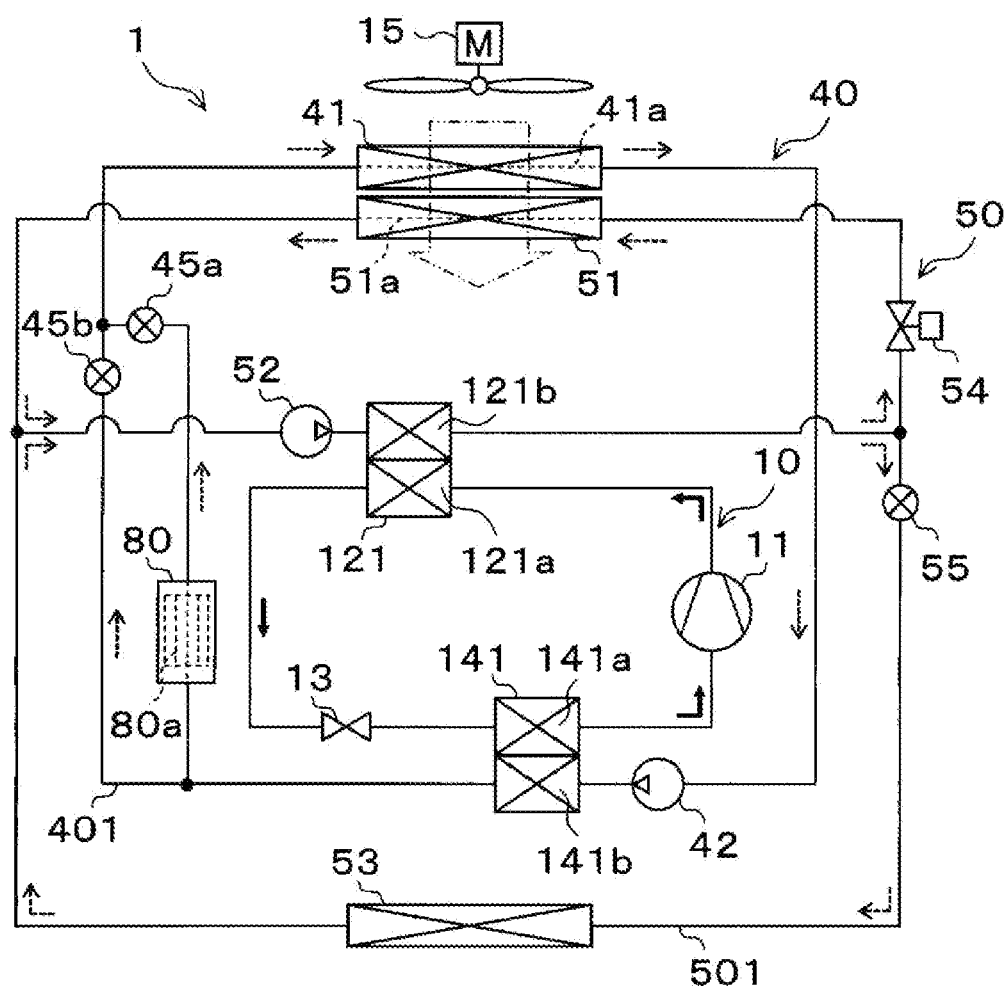
FIG. 3 is an overall configuration diagram of a temperature adjusting device of a third embodiment.

In the present embodiment, as illustrated in FIG. 3, a description will be made of an example in which the configuration of the first heat medium circuit 40 and the configuration of the second heat medium circuit 50 are changed and a heater is added compared with the second embodiment. The heater heats ventilation air blown into the vehicle compartment. Therefore, the ventilation air of the present embodiment is a heating target fluid. The heating target fluid is included in a target object on which the temperature adjusting device 1 performs temperature adjustment.

Specifically, the first heat medium circuit 40 of the present embodiment has a first battery bypass passage 401. The first battery bypass passage 401 is a heat medium passage that causes the first heat medium flowing out of the heat medium passage 141*b* of the chiller 141 to bypass the coolant passage 80*a* of the battery 80 to be guided to the inlet side of the first heat medium passage 41*a* of the first radiator 41.

The first heat medium circuit 40 of the present embodiment has a first battery side open-close valve 45*a* and a first bypass passage side open-close valve 45*b*. The first battery side open-close valve 45*a* and the first bypass passage side open-close valve 45*b* are a switching unit that switches circuit configurations of the first heat medium circuit 40.

The first battery side open-close valve 45*a* is an electromagnetic valve that opens and closes a heat medium passage through which the first heat medium flowing out of the heat medium passage 141*b* of the chiller 141 flows into the coolant passage 80*a* of the battery 80. The first bypass passage side open-close valve 45*b* is an electromagnetic valve that opens and closes the first battery bypass passage 401. Operations of the first battery side open-close valve 45*a* and the first bypass passage side open-close valve 45*b* are controlled according to a control voltage output from the control device 70.

The second heat medium circuit 50 of the present embodiment has a second radiator bypass passage 501. The second radiator bypass passage 501 is a heat medium passage that causes the second heat medium flowing out of the heat medium passage 121b of the water-refrigerant heat exchanger 121 to bypass the second radiator 51 to be guided to the intake side of the second heat exchanger side water pump 52.

the second heat medium circuit 50 of the present embodiment has a heater core 53, a second radiator side flow rate regulation valve 54, and a second heater core side open-close valve 55.

The heater core 53 is located in the second radiator bypass passage 501. The second radiator 51 and the heater core 53 are connected in parallel to each other with respect to a flow of the second heat medium flowing out of the heat medium passage 121b. The heater core 53 is a heat exchanger that heats the ventilation air by exchanging heat between the second heat medium flowing out of the heat medium passage 121b and the ventilation air blown from the internal blower (not illustrated) into the vehicle compartment.

The second radiator side flow rate regulation valve 54 is disposed in the heat medium passage that guides the second heat medium flowing out of the heat medium passage 121b of the water-refrigerant heat exchanger 121 to the second heat medium passage 51a of the second radiator 51. The second radiator side flow rate regulation valve 54 regulates a flow rate of the second heat medium that has flowed into the second heat medium passage 51a of the second radiator 51.

The second radiator side flow rate regulation valve 54 is an electric variable throttle mechanism. The second radiator side flow rate regulation valve 54 has a fully open function, that is, functions as a mere heat medium passage with almost no flow rate regulation action by setting the valve opening to full opening, and a fully closed function of closing the heat medium passage by setting the valve opening to full closing. An operation of the second radiator side flow rate regulation valve 54 is controlled according to a control signal output from the control device 70.

The second heater core side open-close valve 55 is disposed in the heat medium passage that guides the second heat medium flowing out of the heat medium passage 121b of the water-refrigerant heat exchanger 121 to the heater core 53. The second heater core side open-close valve 55 is an electromagnetic valve that opens and closes the second radiator bypass passage 501. A fundamental configuration of the second heater core side open-close valve 55 is the same as that of the first battery side open-close valve 45a or the like. Remaining configurations of the temperature adjusting device 1 are the same as those in the second embodiment.

Therefore, in the second heat medium circuit 50 of the present embodiment, the second heat medium heated in the heat medium passage 121b of the water-refrigerant heat exchanger 121 flows into the heater core 53, and thus the ventilation air can be heated in the heater core 53.

That is, in the temperature adjusting device 1 of the present embodiment, the heater includes the second heat medium circuit 50 having the water-refrigerant heat exchanger 121 and the heater core 53. More specifically, the heater includes a circuit that circulates the second heat medium between the water-refrigerant heat exchanger 121 and the heater core 53 of the second heat medium circuit 50.

Next, an operation of the temperature adjusting device 1 of the present embodiment having the above configuration will be described. In the temperature adjusting device 1 of the present embodiment, the control device 70 controls an operation of the control target device such that the battery temperature TB is maintained within an appropriate temperature range. The control device 70 controls an operation of the control target device such that the vehicle interior temperature Tr comes close to a set temperature that is set by the temperature setting unit.

In the temperature adjusting device 1 of the present embodiment, operation modes may be switched according to the battery temperature TB and the vehicle interior temperature Tr. Each operation mode will be described below.

(a) First Battery Cooling Mode

The first battery cooling mode is executed when the battery temperature TB is equal to or higher than the first reference temperature KTB1 and the vehicle interior temperature Tr is higher than the set temperature. When the battery temperature TB is equal to or higher than the first reference temperature is KTB1, it is necessary to cool the battery 80. When the vehicle interior temperature Tr is higher than the set temperature, it is not necessary to heat the vehicle compartment. Thus, in the first battery cooling mode, it is not necessary to operate the refrigeration cycle device 10.

In the first battery cooling mode, the control device 70 opens the first battery side open-close valve 45a and closes the first bypass passage side open-close valve 45b. The control device 70 operates the external blower 15 and the first battery side water pump 42. The control device 70 stops the second heat exchanger side water pump 52 and the compressor 11.

Therefore, in the first heat medium circuit 40, the first heat medium is circulated in the same manner as in the second embodiment. Consequently, in the first heat medium circuit 40, the exhaust heat of the battery 80 absorbed by the first heat medium when the first heat medium flows through the coolant passage 80a of the battery 80 can be radiated to the outside air in the first radiator 41.

In the second heat medium circuit 50, the second heat exchanger side water pump 52 is stopped, and thus the second heat medium is not circulated. In the refrigeration cycle device 10, the compressor 11 is stopped, and thus the refrigerant is not circulated.

Therefore, in the first battery cooling mode, the battery 80 can be cooled in the same manner as in the first battery cooling mode described in the second embodiment.

(b) Second Battery Cooling Mode

The second battery cooling mode is executed when the battery temperature TB is equal to or higher than the second reference temperature KTB2 and the vehicle interior temperature Tr is higher than the set temperature. When the temperature of the battery 80 is equal to or higher than the second reference temperature is KTB2, there is concern that the battery 80 may not be sufficiently cooled simply by circulating the first heat medium in the first heat medium circuit 40. Therefore, in the second battery cooling mode, the refrigeration cycle device 10 is operated.

In the second battery cooling mode, the control device 70 opens the first battery side open-close valve 45a and closes the first bypass passage side open-close valve 45b. The control device 70 operates the external blower 15 and the first battery side water pump 42. The control device 70 fully opens the second radiator side flow rate regulation valve 54 and closes the second heater core side open-close valve 55. The control device 70 operates the second heat exchanger side water pump 52 and the compressor 11.

Therefore, in the first heat medium circuit 40, the first heat medium is circulated in the same manner as in the first battery cooling mode. Consequently, in the first heat medium circuit 40, the exhaust heat of the battery 80 absorbed by the first heat medium when the first heat medium flows through the coolant passage 80*a* of the battery 80 can be radiated to the outside air in the first radiator 41.

In the second heat medium circuit 50, in the same manner as in the second battery cooling mode of the second embodiment, the second heat medium pumped from the second heat exchanger side water pump 52 is circulated in an order of the heat medium passage 121*b* of the water-refrigerant heat exchanger 121, the second heat medium passage 51*a* of the second radiator 51, and the intake side of the second heat exchanger side water pump 52. Consequently, in the second heat medium circuit 50, the heat absorbed by the second heat medium from the high-pressure refrigerant in the water-refrigerant heat exchanger 121 can be radiated to the outside air in the second radiator 51.

In the refrigeration cycle device 10, in the same manner as in the second battery cooling mode of the second embodiment, the refrigerant discharged from the compressor 11 is circulated in an order of the refrigerant passage 121*a* of the water-refrigerant heat exchanger 121, the expansion valve 13, the refrigerant passage 141*a* of the chiller 141, and the intake side of the compressor 11. Consequently, in the refrigeration cycle device 10, the heat absorbed by the refrigerant from the first heat medium in the chiller 141 can be radiated to the second heat medium in the water-refrigerant heat exchanger 121.

Therefore, in the second battery cooling mode, in the same manner as in the second battery cooling mode described in the second embodiment, the temperature of the first heat medium that has flowed into the coolant passage 80*a* of the battery 80 can be made lower than in the first battery cooling mode. Consequently, the battery 80 can be cooled with a higher cooling capacity than in the first battery cooling mode.

(c) Heating-Cooling Mode

A heating-cooling mode is executed when the battery temperature TB is equal to or higher than the first reference temperature KTB1 and the vehicle interior temperature Tr is lower than the set temperature. When the vehicle interior temperature Tr is lower than the set temperature, it is necessary to heat the vehicle compartment.

In the heating-cooling mode, the control device 70 opens the first battery side open-close valve 45*a* and closes the first bypass passage side open-close valve 45*b*. The control device 70 operates the external blower 15 and the first battery side water pump 42.

The control device 70 adjusts the opening degree of the second radiator side flow rate regulation valve 54 and also opens the second heater core side open-close valve 55. The opening degree of the second radiator side flow rate regulation valve 54 is adjusted such that the vehicle interior temperature Tr comes close to the set temperature. The control device 70 operates the second heat exchanger side water pump 52 and the compressor 11.

Therefore, in the first heat medium circuit 40, the first heat medium is circulated in the same manner as in the first battery cooling mode. Consequently, in the first heat medium circuit 40, the exhaust heat of the battery 80 absorbed by the first heat medium when the first heat medium flows through the coolant passage 80*a* of the battery 80 can be radiated to the outside air in the first radiator 41.

In the second heat medium circuit 50, the second heat medium pumped from the second heat exchanger side water pump 52 is heated in the heat medium passage 121*b* of the water-refrigerant heat exchanger 121.

A part of the second heat medium heated in the heat medium passage 121*b* flows into the heater core 53 through the second heater core side open-close valve 55. The second heat medium that has flowed into the heater core 53 exchanges heat with the ventilation air blown from the internal blower to radiate heat. Consequently, the ventilation air is heated. The second heat medium flowing out of the heater core 53 merges with the second heat medium flowing out of the second heat medium passage 51*a*.

The residual second heat medium heated in the heat medium passage 121*b* flows into the second heat medium passage 51*a* of the second radiator 51 through the second radiator side flow rate regulation valve 54. The second heat medium that has flowed into the second heat medium passage 51*a* radiates heat to the outside air that has passed through the first radiator 41. Consequently, the second heat medium is cooled.

In this case, the opening degree of the second radiator side flow rate regulation valve 54 is adjusted such that the heat of the second heat medium is not excessively radiated to the outside air in the second radiator 51 in order to cause the vehicle interior temperature Tr to come close to the set temperature. The second heat medium flowing out of the second heat medium passage 51*a* merges with the second heat medium flowing out of the heater core 53 and is sucked into the second heat exchanger side water pump 52.

In the refrigeration cycle device 10, the refrigerant is circulated in the same manner as in the second battery cooling mode. Consequently, in the refrigeration cycle device 10, the heat absorbed by the refrigerant from the first heat medium in the chiller 141 can be radiated to the second heat medium in the water-refrigerant heat exchanger 121.

Therefore, in the heating-cooling mode, in the same manner as in the second battery cooling mode, the battery 80 can be cooled with a high cooling capacity. The ventilation air can be heated in the heater core 53 to heat the vehicle compartment.

(d) Heating Operation Mode

A heating operation mode is executed when the battery temperature TB is lower than the first reference temperature KTB1 and the vehicle interior temperature Tr is lower than the set temperature. When the battery temperature TB is lower than the first reference temperature KTB1, it is not necessary to cool the battery 80.

In the heating operation mode, the control device 70 closes the first battery side open-close valve 45*a* and opens the first bypass passage side open-close valve 45*b*. The control device 70 operates the external blower 15 and the first battery side water pump 42.

The control device 70 adjusts the opening degree of the second radiator side flow rate regulation valve 54 and also opens the second heater core side open-close valve 55. The opening degree of the second radiator side flow rate regulation valve 54 is adjusted such that the vehicle interior temperature Tr comes close to the set temperature. The control device 70 operates the second heat exchanger side water pump 52 and the compressor 11.

Therefore, in the first heat medium circuit 40, the first heat medium pumped from the first battery side water pump 42 flows into the heat medium passage 141*b* of the chiller 141. The first heat medium that has flowed into the heat medium passage 141*b* of the chiller 141 is cooled by the heat thereof being absorbed by the low-pressure refrigerant flowing through the refrigerant passage 141*a* of the chiller 141.

The first heat medium flowing out of the heat medium passage 141*b* flows into the first heat medium passage 41*a* of the first radiator 41 through the first battery bypass passage 401. Therefore, in the heating operation mode, the first heat medium does not absorb the exhaust heat of the battery 80. The first heat medium that has flowed into the first heat medium passage 41a exchanges heat with the outside air blown from the external blower 15.

In the heating operation mode, the low-temperature first heat medium flows into the first heat medium passage 41a. Therefore, in the first radiator 41, the first heat medium absorbs heat from the outside air and the temperature thereof increases to about the outside air temperature. The first heat medium flowing out of the first heat medium passage 41a is sucked into the first battery side water pump 42 and is pumped to the heat medium passage 141b again.

In the second heat medium circuit 50, in the same manner as in the heating-cooling mode, the second heat medium pumped from the second heat exchanger side water pump 52 is circulated in an order of the refrigerant passage 121a of the water-refrigerant heat exchanger 121, the second heater core side open-close valve 55, the heater core 53, and the intake port of the second heat exchanger side water pump 52. The second heat medium is circulated in an order of the refrigerant passage 121a of the water-refrigerant heat exchanger 121, the second radiator side flow rate regulation valve 54, the second heat medium passage 51a of the second radiator 51, and the intake port of the second heat exchanger side water pump 52.

Consequently, in the second heat medium circuit 50, part of the heat absorbed by the second heat medium from the high-pressure refrigerant in the water-refrigerant heat exchanger 121 can be radiated to the ventilation air in the heater core 53. The residual heat can be radiated to the outside air in the second radiator 51.

In the refrigeration cycle device 10, the refrigerant is circulated in the same manner as in the second battery cooling mode. Consequently, in the refrigeration cycle device 10, the heat absorbed by the refrigerant from the first heat medium in the chiller 141 can be radiated to the second heat medium in the water-refrigerant heat exchanger 121.

Therefore, in the heating operation mode, the ventilation air can be heated in the heater core 53 without cooling the battery 80. Consequently, it is possible to heat the vehicle compartment.

As described above, in the temperature adjusting device 1 of the present embodiment, the first battery cooling mode and the second battery cooling mode can be switched. Therefore, in the same manner as in the second embodiment, it is possible to efficiently and reliably cool the battery 80 without consuming unnecessary energy in the refrigeration cycle device 10 and thus to restrict an increase in the temperature of the battery 80.

The temperature adjusting device 1 of the present embodiment includes the second heat medium circuit 50 having the water-refrigerant heat exchanger 121 and the heater core 53 as a heater. In the refrigeration cycle device 10, the heat absorbed from the first heat medium in the chiller 141 is radiated to the second heat medium in the water-refrigerant heat exchanger 121. Therefore, in the heater core 53, the ventilation air can be heated with the high-pressure refrigerant as a heat source via the second heat medium.

In the temperature adjusting device 1 of the present embodiment, the first radiator 41 exchanges heat between the first heat medium and the outside air before passing through the second radiator 51.

Thus, the temperature of the first heat medium flowing out of the first heat medium passage 41a can be made to come close to the outside air temperature regardless of the temperature of the first heat medium that has flowed into the first heat medium passage 41a of the first radiator 41. That is, even if the heating-cooling mode and the heating operation mode are switched, the temperature of the first heat medium that has flowed into the heat medium passage 141b of the chiller 141 can be made to come close to the outside air temperature.

Therefore, even if the heating-cooling mode and the heating operation mode are switched, it is possible to restrict the fluctuation in an amount of heat absorbed by the refrigerant from the first heat medium in the chiller 141. Even though the heating-cooling mode and the heating operation mode are switched, it is possible to restrict the fluctuation in a heat radiation amount radiated by the refrigerant to the second heat medium in the water-refrigerant heat exchanger 121.

As a result, according to the temperature adjusting device 1 of the present embodiment, stable heating performance can be exhibited even if the heating-cooling mode and the heating operation mode are switched.

Fourth Embodiment

Figure 4:
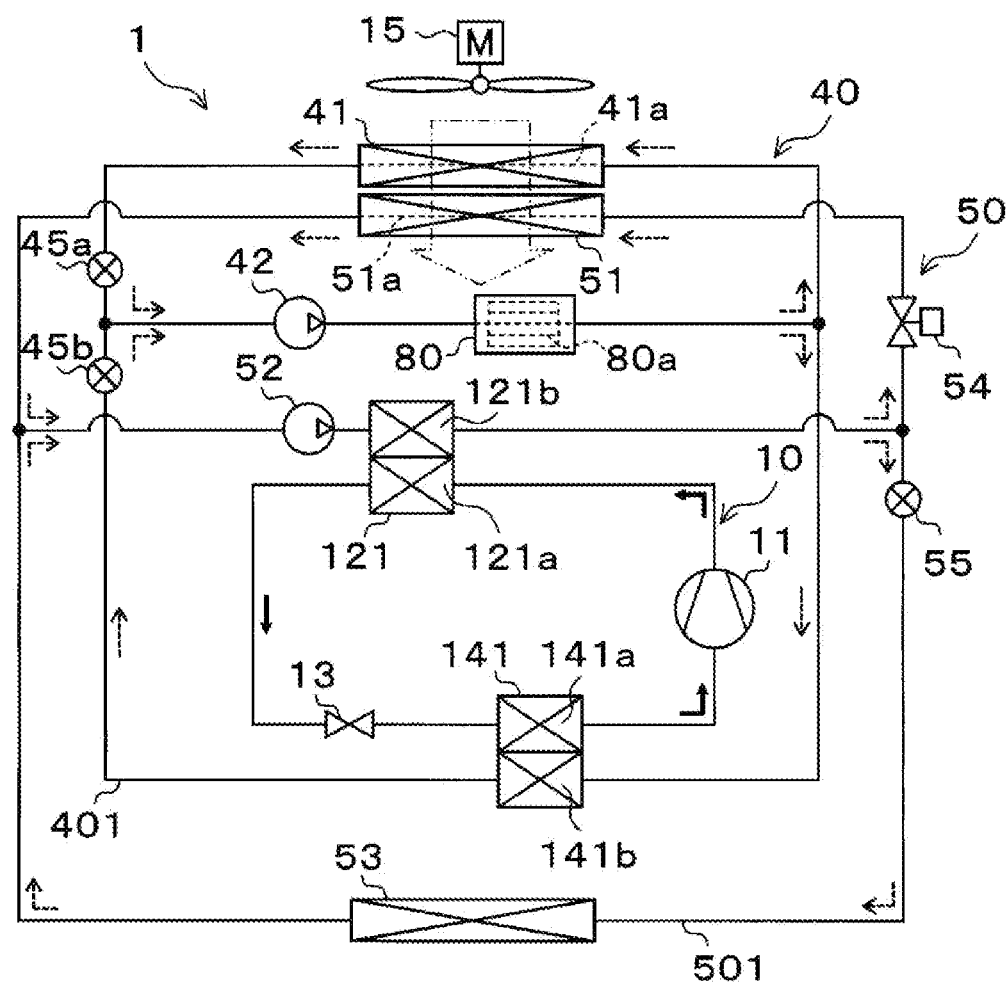
FIG. 4 is an overall configuration diagram of a temperature adjusting device of a fourth embodiment.

In the present embodiment, as illustrated in FIG. 4, a description will be made of an example in which the configuration of the first heat medium circuit 40 and the configuration of the second heat medium circuit 50 are changed and a heater is added compared with the second embodiment.

Specifically, in the first heat medium circuit 40 of the present embodiment, the inlet side of the coolant passage 80a of the battery 80 is connected to the discharge port of the first battery side water pump 42. The outlet of the coolant passage 80a is connected to the inlet side of the first heat medium passage 41a of the first radiator 41 and the inlet side of the heat medium passage 141b of the chiller 141.

The first battery side open-close valve 45a of the present embodiment is disposed to open and close a heat medium passage that guides the first heat medium flowing out of the first heat medium passage 41a to the intake port of the first battery side water pump 42.

The first battery bypass passage 401 of the present embodiment is connected to the inlet side of the heat medium passage 141b such that the first heat medium flowing out of the coolant passage 80a of the battery 80 is guided to the inlet side of the heat medium passage 141b of the chiller 141 by bypassing the first heat medium passage 41a. That is, the first radiator 41 and the chiller 141 of the present embodiment are connected in parallel to each other with respect to a flow of the first heat medium flowing out of the coolant passage 80a.

The outlet of the heat medium passage 141b is connected to the intake port side of the first battery side water pump 42. The first bypass passage side open-close valve 45b is disposed to open and close the heat medium passage through which the first heat medium flowing out of the heat medium passage 141b flows into the intake port of the first battery side water pump 42. Remaining configurations are the same as those in the third embodiment. Therefore, the heater of the present embodiment includes the second heat medium circuit 50 in the same manner as in the third embodiment.

Next, an operation of the temperature adjusting device 1 of the present embodiment having the above configuration will be described. In the temperature adjusting device 1 of the present embodiment, three operation modes may be switched according to the battery temperature TB and the vehicle interior temperature Tr. Each operation mode will be described below.

(a) First Battery Cooling Mode

The first battery cooling mode is executed when the battery temperature TB is equal to or higher than the first reference temperature KTB1 and the vehicle interior temperature Tr is higher than the set temperature.

In the first battery cooling mode, the control device 70 opens the first battery side open-close valve 45a and closes the first bypass passage side open-close valve 45b. The control device 70 operates the external blower 15 and the first battery side water pump 42. The control device 70 stops the second heat exchanger side water pump 52 and the compressor 11.

Therefore, in the first heat medium circuit 40, the first heat medium discharged from the first battery side water pump 42 flows into the coolant passage 80a of the battery 80. The first heat medium that has flowed into the coolant passage 80a absorbs the exhaust heat of the battery 80 to be heated when the first heat medium flows through the coolant passage 80a. Consequently, the battery 80 is cooled.

The first heat medium flowing out of the coolant passage 80a flows into the first heat medium passage 41a of the first radiator 41. The first heat medium that has flowed into the first heat medium passage 41a radiates the heat to the outside air. Consequently, the first heat medium is cooled. The first heat medium flowing out of the first heat medium passage 41a is sucked into the first battery side water pump 42 and is pumped to the coolant passage 80a again.

In the second heat medium circuit 50, since the second heat exchanger side water pump 52 is stopped, the second heat medium is not circulated. In the refrigeration cycle device 10, the compressor 11 Is stopped, and the refrigerant is not circulated.

Therefore, in the first battery cooling mode, it is possible to restrict an increase in the temperature of the battery 80 in the same manner as in the first battery cooling mode described in the second embodiment.

(b) Second Battery Cooling Mode

The second battery cooling mode is executed when the battery temperature TB is equal to or higher than the second reference temperature KTB2 and the vehicle interior temperature Tr is higher than the set temperature.

In the second battery cooling mode, the control device 70 opens the first battery side open-close valve 45a and opens the first bypass passage side open-close valve 45b. The control device 70 operates the external blower 15 and the first battery side water pump 42. The control device 70 fully opens the second radiator side flow rate regulation valve 54 and closes the second heater core side open-close valve 55. The control device 70 operates the second heat exchanger side water pump 52 and the compressor 11.

Therefore, in the first heat medium circuit 40, the first heat medium pumped from the first battery side water pump 42 flows into the coolant passage 80a of the battery 80. The first heat medium that has flowed into the coolant passage 80a absorbs the exhaust heat of the battery 80 to be heated when the first heat medium flows through the coolant passage 80a. Consequently, the battery 80 is cooled.

A part of the first heat medium heated in the coolant passage 80a flows into the first heat medium passage 41a of the first radiator 41. The part of the first heat medium that has flowed into the first heat medium passage 41a radiates the heat to the outside air that has passed through the first radiator 41. Consequently, the first heat medium is cooled. The first heat medium flowing out of the first heat medium passage 41a merges with the first heat medium flowing out of the heat medium passage 141b of the chiller 141.

The residual first heat medium heated in the coolant passage 80a flows into the heat medium passage 141b of the chiller 141. The first heat medium that has flowed into the heat medium passage 141b of the chiller 141 is cooled by the heat thereof being absorbed by the low-pressure refrigerant flowing through the refrigerant passage 141a of the chiller 141. Consequently, the temperature of the first heat medium is lower than the outside air temperature.

The first heat medium flowing out of the heat medium passage 141b merges with the first heat medium flowing out of the first heat medium passage 41a and is sucked into the first battery side water pump 42. Thus, in the second battery cooling mode, the temperature of the first heat medium discharged from the first battery side water pump 42 and that has flowed into the coolant passage 80a of the battery 80 is lower than that in the first battery cooling mode.

In the second heat medium circuit 50, the second heat medium is circulated in the same manner as in the second battery cooling mode of the third embodiment. Consequently, in the second heat medium circuit 50, the heat absorbed by the second heat medium from the high-pressure refrigerant in the water-refrigerant heat exchanger 121 can be radiated to the outside air in the second radiator 51.

In the refrigeration cycle device 10, the refrigerant is circulated in the same manner as in the second battery cooling mode of the third embodiment. Consequently, in the refrigeration cycle device 10, the heat absorbed by the refrigerant from the first heat medium in the chiller 141 can be radiated to the second heat medium in the water-refrigerant heat exchanger 121.

Therefore, in the second battery cooling mode, the temperature of the first heat medium that has flowed into the coolant passage 80a of the battery 80 can be made lower than in the first battery cooling mode, and thus the battery 80 can be cooled with a higher cooling capacity than in the first battery cooling mode.

(c) Heating-Cooling Mode

The heating-cooling mode is executed when the battery temperature TB is equal to or higher than the first reference temperature KTB1 and the vehicle interior temperature Tr is lower than the set temperature.

In the heating-cooling mode, the control device 70 opens the first battery side open-close valve 45a and opens the first bypass passage side open-close valve 45b. The control device 70 operates the external blower 15 and the first battery side water pump 42.

The control device 70 adjusts the opening degree of the second radiator side flow rate regulation valve 54 and also opens the second heater core side open-close valve 55. The opening degree of the second radiator side flow rate regulation valve 54 is adjusted such that the vehicle interior temperature Tr comes close to the set temperature. The control device 70 operates the second heat exchanger side water pump 52 and the compressor 11.

Therefore, in the first heat medium circuit 40, in the same manner as in the second battery cooling mode, the first heat medium pumped from the first battery side water pump 42 is circulated in an order of the coolant passage 80a of the battery 80, the first heat medium passage 41a of the first radiator 41, the first battery side open-close valve 45a, and the intake port of the first battery side water pump 42. The first heat medium is circulated in an order of the heat medium passage 141b of the chiller 141, the first bypass passage side open-close valve 45b, and the intake port of the first battery side water pump 42.

Consequently, in the first heat medium circuit 40, part of the heat absorbed by the first heat medium from the battery 80 can be radiated to the outside air in the first radiator 41. The residual heat can be absorbed by the low-pressure refrigerant in the chiller 141.

In the second heat medium circuit 50, the second heat medium is circulated in the same manner as in the heating-cooling mode of the second embodiment. Consequently, in the second heat medium circuit 50, part of the heat absorbed by the second heat medium from the high-pressure refrigerant in the water-refrigerant heat exchanger 121 can be radiated to the ventilation air in the heater core 53. The residual heat can be radiated to the outside air in the second radiator 51.

In the refrigeration cycle device 10, the refrigerant is circulated in the same manner as in the second battery cooling mode. Consequently, in the refrigeration cycle device 10, the heat absorbed by the refrigerant from the first heat medium in the chiller 141 can be radiated to the second heat medium in the water-refrigerant heat exchanger 121.

Therefore, in the heating-cooling mode, the battery 80 can be cooled with a high cooling capacity in the same manner as in the second battery cooling mode. The ventilation air can be heated in the heater core 53 to heat the vehicle compartment.

As described above, in the temperature adjusting device 1 of the present embodiment, the first battery cooling mode and the second battery cooling mode can be switched. Therefore, in the same manner as in the second embodiment, it is possible to efficiently and reliably cool the battery 80 without consuming unnecessary energy in the refrigeration cycle device 10 and thus to restrict an increase in the temperature of the battery 80.

The temperature adjusting device 1 of the present embodiment includes the second heat medium circuit 50 having the water-refrigerant heat exchanger 121 and the heater core 53 as a heater. Therefore, in the same manner as in the third embodiment, the ventilation air can be heated in the heater core 53 to heat the vehicle compartment.

Fifth Embodiment

Figure 5:
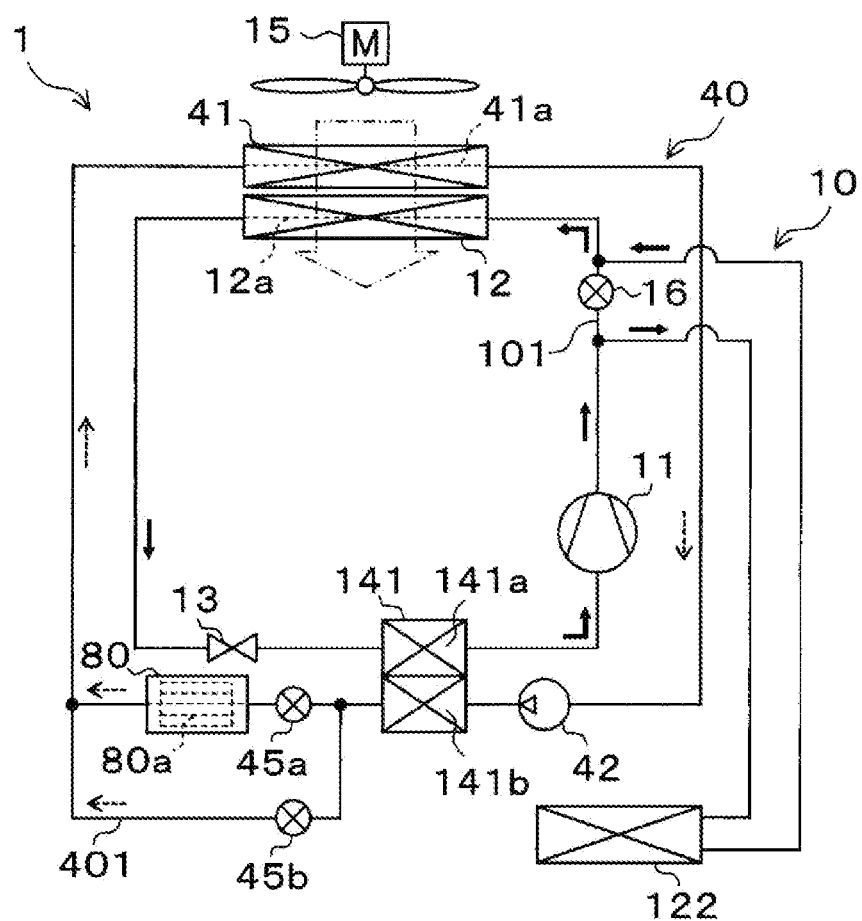
FIG. 5 is an overall configuration diagram of a temperature adjusting device of a fifth embodiment.

In the present embodiment, as illustrated in FIG. 5, a description will be made of an example in which the configuration of the refrigeration cycle device 10 is changed and a heater is added compared with the first embodiment. Specifically, the refrigeration cycle device 10 of the present embodiment has an internal condenser 122, a refrigeration cycle device bypass passage 101, an open-close valve 16, and a chiller 141 similar to that of the second embodiment.

The internal condenser 122 is a heating heat exchanger that heats the ventilation air by exchanging heat between the high-pressure refrigerant discharged from the compressor 11 and the ventilation air blown into the vehicle compartment from the internal blower (not illustrated). In other words, the internal condenser 122 is a heater that heats the ventilation air with the high-pressure refrigerant as a heat source. The inlet side of the refrigerant passage 12a of the condenser 12 is connected to a refrigerant outlet of the internal condenser 122.

The bypass passage 101 is a refrigerant passage that causes the high-pressure refrigerant discharged from the compressor 11 to bypass the internal condenser 122 to be guided to the inlet side of the refrigerant passage 12a of the condenser 12. The open-close valve 16 is an open-close valve that opens and closes the bypass passage 101. A fundamental configuration of the open-close valve 16 is the same as that of the second heater core side open-close valve 55 of the second heat medium circuit 50 or the like described in the third embodiment.

Here, a pressure loss that occurs when the refrigerant passes through the bypass passage 101 is extremely small compared with a pressure loss that occurs when the refrigerant passes through the refrigerant passage of the internal condenser 122. Therefore, when the open-close valve 16 is open, most of the high-pressure refrigerant discharged from the compressor 11 flows into the condenser 12 through the bypass passage 101. When the open-close valve 16 is closed, the entire high-pressure refrigerant discharged from the compressor 11 flows into the refrigerant passage of the internal condenser 122.

The first heat medium circuit 40 of the present embodiment has the same first battery bypass passage 401, first battery side open-close valve 45a, and first bypass passage side open-close valve 45b as in the third embodiment.

The first battery side open-close valve 45a of the present embodiment is disposed in a heat medium passage from a branch portion for branching a flow of the refrigerant flowing out of the heat medium passage 141b of the chiller 141 to the inlet of the coolant passage 80a of the battery 80. Of course, in the same manner as in the third embodiment, the first battery side open-close valve 45a may be disposed in the heat medium passage from the outlet of the coolant passage 80a of the battery 80 to a merging portion.

The merging portion is a portion where the flow of the refrigerant flowing out of the coolant passage 80a of the battery 80 and the flow of the refrigerant flowing through the first battery bypass passage 401 are merged. Remaining configurations of the temperature adjusting device 1 are the same as those in the first embodiment.

Next, an operation of the temperature adjusting device 1 of the present embodiment having the above configuration will be described. In the temperature adjusting device 1 of the present embodiment, the control device 70 controls an operation of the control target device such that the battery temperature TB is maintained within an appropriate temperature range. The control device 70 controls an operation of the control target device such that the vehicle interior temperature Tr comes close to a set temperature that is set by the temperature setting unit.

(a) First Battery Cooling Mode

The first battery cooling mode is executed when the battery temperature TB is equal to or higher than the first reference temperature KTB1 and the vehicle interior temperature Tr is higher than the set temperature.

In the first battery cooling mode, the control device 70 opens the first battery side open-close valve 45a and closes the first bypass passage side open-close valve 45b. The control device 70 operates the external blower 15 and the first battery side water pump 42. The control device 70 opens the open-close valve 16 and stops the compressor 11.

Therefore, in the first heat medium circuit 40, the first heat medium is circulated in the same manner as in the second embodiment. Consequently, in the first heat medium circuit 40, the exhaust heat of the battery 80 absorbed by the first heat medium when the first heat medium flows through the coolant passage 80a of the battery 80 can be radiated to the outside air in the first radiator 41. In the refrigeration cycle device 10, the compressor 11 is stopped, and thus the refrigerant is not circulated.

Therefore, in the first battery cooling mode, it is possible to restrict an increase in the temperature of the battery 80 in the same manner as in the first battery cooling mode described in the second embodiment.

(b) Second Battery Cooling Mode

The second battery cooling mode is executed when the battery temperature TB is equal to or higher than the second reference temperature KTB2 and the vehicle interior temperature Tr is higher than the set temperature.

In the second battery cooling mode, the control device 70 opens the first battery side open-close valve 45*a* and closes the first bypass passage side open-close valve 45*b*. The control device 70 operates the external blower 15 and the first battery side water pump 42. The control device 70 opens the open-close valve 16 and operates the compressor 11.

Therefore, in the first heat medium circuit 40, the first heat medium is circulated in the same manner as in the first battery cooling mode. Consequently, in the first heat medium circuit 40, the exhaust heat of the battery 80 absorbed by the first heat medium when the first heat medium flows through the coolant passage 80*a* of the battery 80 can be radiated to the outside air in the first radiator 41.

In the refrigeration cycle device 10, the high-pressure refrigerant discharged from the compressor 11 flows into the refrigerant passage 12*a* of the condenser 12 through the open-close valve 16. The refrigerant that has flowed into the refrigerant passage 12*a* passes through the radiator 41 radiates heat to the outside air that has passed through the radiator 41 to be condensed. The liquid phase high-pressure refrigerant condensed in the condenser 12 flows into the expansion valve 13 and is reduced in pressure. In this case, the throttle opening degree of the expansion valve 13 is adjusted such that the degree of superheat of the refrigerant on the outlet side of the internal evaporator 14 comes close to the reference degree of superheat.

The low-pressure refrigerant whose pressure is reduced in the expansion valve 13 flows into the refrigerant passage 141*a* of the chiller 141. The low-pressure refrigerant that has flowed into the refrigerant passage 141*a* of the chiller 141 absorbs heat from the first heat medium flowing through the heat medium passage 141*b* of the chiller 141 to be evaporated. Consequently, the first heat medium is cooled. The refrigerant flowing out of the refrigerant passage 141*a* of the chiller 141 is sucked into the compressor 11 and is compressed again.

Therefore, in the second battery cooling mode, the battery 80 can be cooled with a higher cooling capacity than in the first battery cooling mode, in the same manner as in the second battery cooling mode described in the second embodiment.

(c) Heating-Cooling Mode

The heating-cooling mode is executed when the battery temperature TB is equal to or higher than the first reference temperature KTB1 and the vehicle interior temperature Tr is lower than the set temperature.

In the heating-cooling mode, the control device 70 opens the first battery side open-close valve 45*a* and closes the first bypass passage side open-close valve 45*b*. The control device 70 operates the external blower 15 and the first battery side water pump 42. The control device 70 closes the open-close valve 16 and operates the compressor 11.

Therefore, in the first heat medium circuit 40, the first heat medium is circulated in the same manner as in the first battery cooling mode. Consequently, in the first heat medium circuit 40, the exhaust heat of the battery 80 absorbed by the first heat medium when the first heat medium flows through the coolant passage 80*a* of the battery 80 can be radiated to the outside air in the first radiator 41.

In the refrigeration cycle device 10, since the open-close valve 16 is closed, the high-pressure refrigerant discharged from the compressor 11 flows into the internal condenser 122. The high-pressure refrigerant that has flowed into the internal condenser 122 exchanges heat with the ventilation air blown from the internal blower to radiate heat. Consequently, the ventilation air is heated. The high-pressure refrigerant flowing out of the internal condenser 122 flows into the refrigerant passage 12*a* of the condenser 12. The subsequent operation of the refrigeration cycle device 10 is the same as that in the second battery cooling mode.

Therefore, in the heating-cooling mode, the battery 80 can be cooled with a high cooling capacity in the same manner as in the second battery cooling mode. The ventilation air can be heated in the internal condenser 122 to heat the vehicle compartment.

(d) Heating Operation Mode

The heating operation mode is executed when the battery temperature TB is lower than the first reference temperature KTB1 and the vehicle interior temperature Tr is lower than the set temperature.

In the heating operation mode, the control device 70 closes the first battery side open-close valve 45*a* and opens the first bypass passage side open-close valve 45*b*. The control device 70 operates the external blower 15 and the first battery side water pump 42. The control device 70 closes the open-close valve 16 and operates the compressor 11.

Therefore, in the first heat medium circuit 40, in the same manner as in the heating operation mode of the third embodiment, the first heat medium pumped from the first battery side water pump 42 is circulated in an order of the heat medium passage 141*b* of the chiller 141, the first battery bypass passage 401, the first heat medium passage 41*a* of the first radiator 41, and the intake port of the first battery side water pump 42. Consequently, in the first heat medium circuit 40, the heat absorbed by the first heat medium from the outside air in the first radiator 41 can be radiated to the low-pressure refrigerant in the chiller 141.

In the refrigeration cycle device 10, in the same manner as in the heating-cooling mode, the high-pressure refrigerant discharged from the compressor 11 is circulated in an order of the internal condenser 122, the refrigerant passage 12*a* of the condenser 12, the expansion valve 13, the refrigerant passage 141*a* of the chiller 141, and the intake port of the compressor 11. Consequently, in the refrigeration cycle device 10, the heat absorbed by the refrigerant from the first heat medium in the chiller 141 can be radiated to the ventilation air in the internal condenser 122.

Therefore, in the heating operation mode, the ventilation air can be heated in the internal condenser 122 without cooling the battery 80. Consequently, it is possible to heat the vehicle compartment.

As described above, in the temperature adjusting device 1 of the present embodiment, the first battery cooling mode and the second battery cooling mode can be switched. Therefore, in the same manner as in the second embodiment, it is possible to efficiently and reliably cool the battery 80 without consuming unnecessary energy in the refrigeration cycle device 10 and thus to restrict an increase in the temperature of the battery 80.

The temperature adjusting device 1 of the present embodiment includes the internal condenser 122 as a heater. In the refrigeration cycle device 10, the low-pressure refrigerant that absorbs heat from the first heat medium to be evaporated in the chiller 141 is compressed to become a high-pressure refrigerant in the compressor 11 and is then discharged.

Therefore, in the heater of the present embodiment, the ventilation air can be directly heated in the internal condenser 122 with the high-pressure refrigerant discharged from the compressor 11 as a heat source to heat the vehicle compartment.

In the temperature adjusting device 1 of the present embodiment, the first radiator 41 exchanges heat between the first heat medium and the outside air before passing through the second radiator 51.

Thus, the temperature of the first heat medium flowing out of the first heat medium passage 41a can be made to come close to the outside air temperature regardless of the temperature of the first heat medium that has flowed into the first heat medium passage 41a of the first radiator 41. That is, even if the heating-cooling mode and the heating operation mode are switched, the temperature of the first heat medium that has flowed into the heat medium passage 141b of the chiller 141 can be made to come close to the outside air temperature.

Therefore, even if the heating-cooling mode and the heating operation mode are switched, it is possible to restrict the fluctuation in an amount of heat absorbed by the refrigerant from the first heat medium in the chiller 141. That is, even if the heating-cooling mode and the heating operation mode are switched, it is possible to restrict the fluctuation of a heat radiation amount radiated by the refrigerant to the ventilation air in the internal condenser 122.

As a result, according to the temperature adjusting device 1 of the present embodiment, stable heating performance can be exhibited even if the heating-cooling mode and the heating operation mode are switched.

Sixth Embodiment

Figure 6:
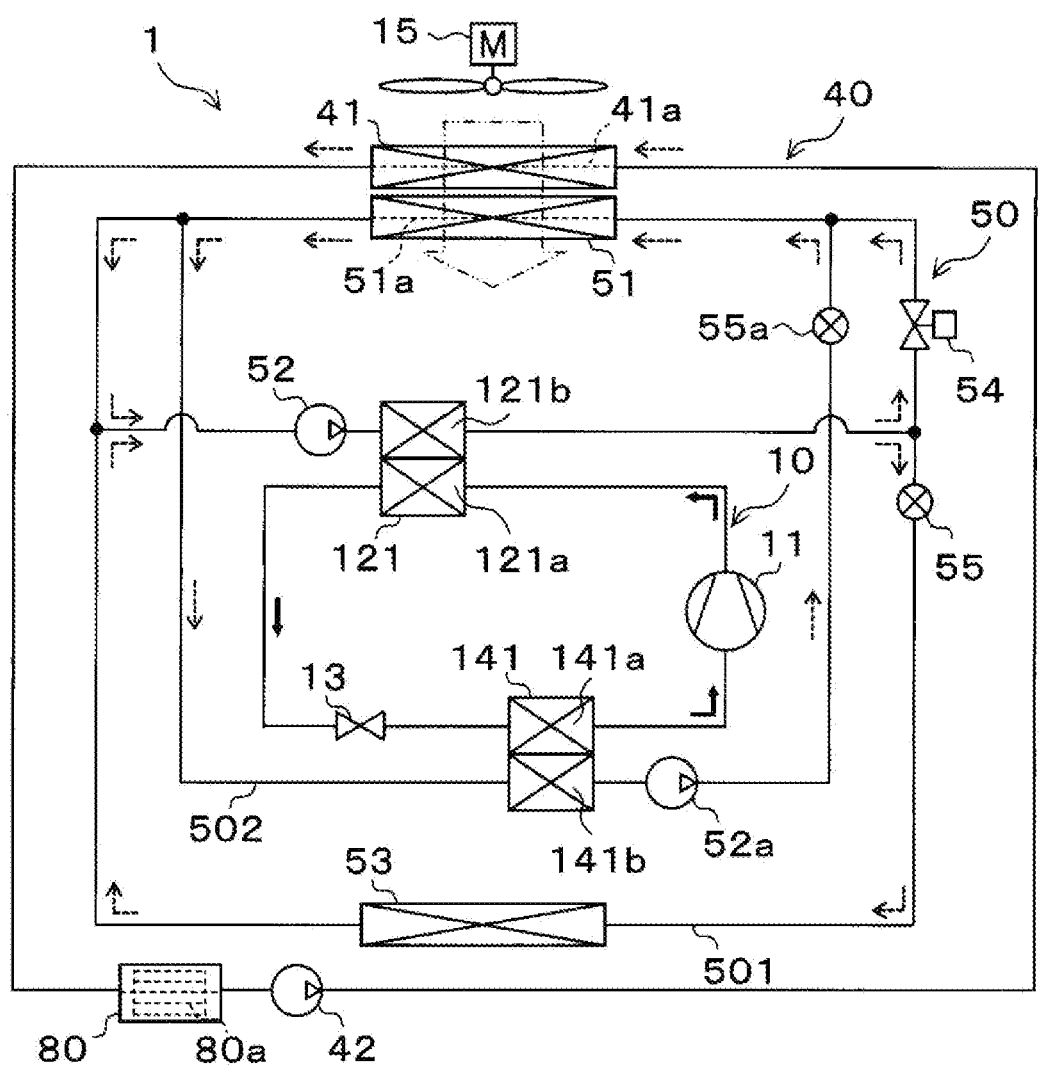
FIG. 6 is an overall configuration diagram of a temperature adjusting device of a sixth embodiment.

In the present embodiment, as illustrated in FIG. 6, a description will be made of an example in which the configuration of the first heat medium circuit 40 and the configuration of the second heat medium circuit 50 are changed and a heater is added compared with the second embodiment.

Specifically, in the first heat medium circuit 40 of the present embodiment, the inlet side of the first heat medium passage 41a of the first radiator 41 is connected to the discharge port of the first battery side water pump 42. The inlet side of the coolant passage 80a of the battery 80 is connected to the outlet of the first heat medium passage 41a. The outlet side of the coolant passage 80a is connected to the intake port side of the first battery side water pump 42.

That is, the heat medium passage 141b of the chiller 141 is not connected to the first heat medium circuit 40 of the present embodiment. Thus, the first heat medium does not flow through the heat medium passage 141b of the chiller 141.

The second heat medium circuit 50 of the present embodiment has a second heater core bypass passage 502 compared with the second heat medium circuit 50 described in the third embodiment. The second heat medium circuit 50 of the present embodiment has a second chiller side water pump 52a and a second chiller side open-close valve 55a.

The second heater core medium bypass passage 502 is a heat medium passage that causes the second heat medium flowing out of the second heat medium passage 51a of the second radiator 51 to bypass the heater core 53 to be guided to the inlet side of the second heat medium passage 51a of the second radiator 51. The heat medium passage 141b of the chiller 141 is connected to the second heater core bypass passage 502.

The second chiller side water pump 52a pumps the second heat medium flowing out of the heat medium passage 141b of the chiller 141 to the inlet side of the second heat medium passage 51a of the second radiator 51. A fundamental configuration of the second chiller side water pump 52a is the same as that of the second heat exchanger side water pump 52.

The second chiller side open-close valve 55a is disposed in a heat medium passage that guides the second heat medium flowing out of the heat medium passage 141b of the chiller 141 to the second radiator 51. A fundamental configuration of the second chiller side open-close valve 55a is the same as that of the second heater core side open-close valve 55. Remaining configurations are the same as those in the second embodiment.

Next, an operation of the temperature adjusting device 1 of the present embodiment having the above configuration will be described. In the present embodiment, the control device 70 control operations of the external blower 15 and the first battery side water pump 42 such that the battery temperature TB is maintained within an appropriate temperature range in the same manner as in the first embodiment.

The control device 70 adjusts the opening degree of the second radiator side flow rate regulation valve 54 such that the vehicle interior temperature Tr comes close to the set temperature that is set by the temperature setting unit in the same manner as in the heating-cooling mode or the like of the third embodiment. The second heater core side open-close valve 55 and the second chiller side open-close valve 55a are opened. The control device 70 operates the second heat exchanger side water pump 52 and the compressor 11.

Therefore, in the first heat medium circuit 40, the heat medium pumped from the first battery side water pump 42 flows into the first heat medium passage 41a of the first radiator 41. The first heat medium that has flowed into the first heat medium passage 41a of the first radiator 41 exchanges heat with the outside air blown from the external blower 15. Consequently, the temperature of the first heat medium comes close to the outside air temperature.

The first heat medium flowing out of the first heat medium passage 41a flows into the coolant passage 80a of the battery 80. The heat medium that has flowed into the coolant passage 80a absorbs the exhaust heat of the battery 80 when the heat medium flows through the coolant passage 80a. Consequently, the battery 80 is cooled. The heat medium flowing out of the coolant passage 80a is sucked into the first battery side water pump 42 and is pumped to the first heat medium passage 41a again.

In the second heat medium circuit 50, the second heat medium is circulated in the same manner as in the heating-cooling mode of the second embodiment. In the second heat medium circuit 50 of the present embodiment, the second heat medium pumped from the second chiller side water pump 52a flows out of the second heater core bypass passage 502 through the second chiller side open-close valve 55a. The second heat medium flowing out of the second heater core bypass passage 502 merges with the second heat medium flowing out of the second radiator side flow rate regulation valve 54 and flows into the second heat medium passage 51a of the second radiator 51.

The second heat medium that has flowed into the second heat medium passage 51a exchanges heat with the outside air that has passed through the first radiator 41 and absorbs heat of the outside air. A part of the second heat medium flowing out of the second heat medium passage 51a flows into the second heater core bypass passage 502 and is guided to the heat medium passage 141b of the chiller 141. The second heat medium that has flowed into the heat medium passage 141*b* is cooled by exchanging heat with the low-pressure refrigerant flowing through the refrigerant passage 141*a* of the chiller 141.

Consequently, in the second heat medium circuit 50 of the present embodiment, part of the heat absorbed by the second heat medium from the high-pressure refrigerant in the water-refrigerant heat exchanger 121 can be radiated to the ventilation air in the heater core 53.

In the refrigeration cycle device, the refrigerant is circulated in the same manner as in the second battery cooling mode of the second embodiment. Consequently, in the refrigeration cycle device 10, the heat absorbed by the refrigerant from the second heat medium in the chiller 141 can be radiated to the second heat medium in the water-refrigerant heat exchanger 121.

As described above, in the temperature adjusting device 1 of the present embodiment, the battery 80 can be cooled without being affected by an operation state of the refrigeration cycle device 10 in the same manner as in the first embodiment. Therefore, the battery 80 can be cooled efficiently without consuming unnecessary energy in the refrigeration cycle device 10.

The temperature adjusting device 1 of the present embodiment includes the second heat medium circuit 50 having the water-refrigerant heat exchanger 121 and the heater core 53 as a heater. In the refrigeration cycle device 10, the heat absorbed from the second heat medium in the chiller 141 is radiated to the second heat medium in the water-refrigerant heat exchanger 121. Therefore, in the heater core 53, the ventilation air can be heated with the high-pressure refrigerant as a heat source via the second heat medium.

In this case, the second radiator 51 exchanges heat between the second heat medium and the outside air that has passed through the first radiator 41. That is, the second radiator 51 exchanges heat between the second heat medium and the exhaust heat of the outside air heated by the exhaust heat of the battery 80. Therefore, the temperature of the second heat medium that has flowed into the heat medium passage 141*b* of the chiller 141 can be made higher than in a case of heat exchange between the second heat medium and the outside air before passing through the first radiator 41.

Consequently, an amount of heat absorbed by the refrigerant from the second heat medium in the chiller 141 can be increased, and a heat radiation amount radiated to the second heat medium in the water-refrigerant heat exchanger can be increased. As a result, the heating capacity of the ventilation air in the heater core 53 can be improved.

Seventh Embodiment

Figure 7:
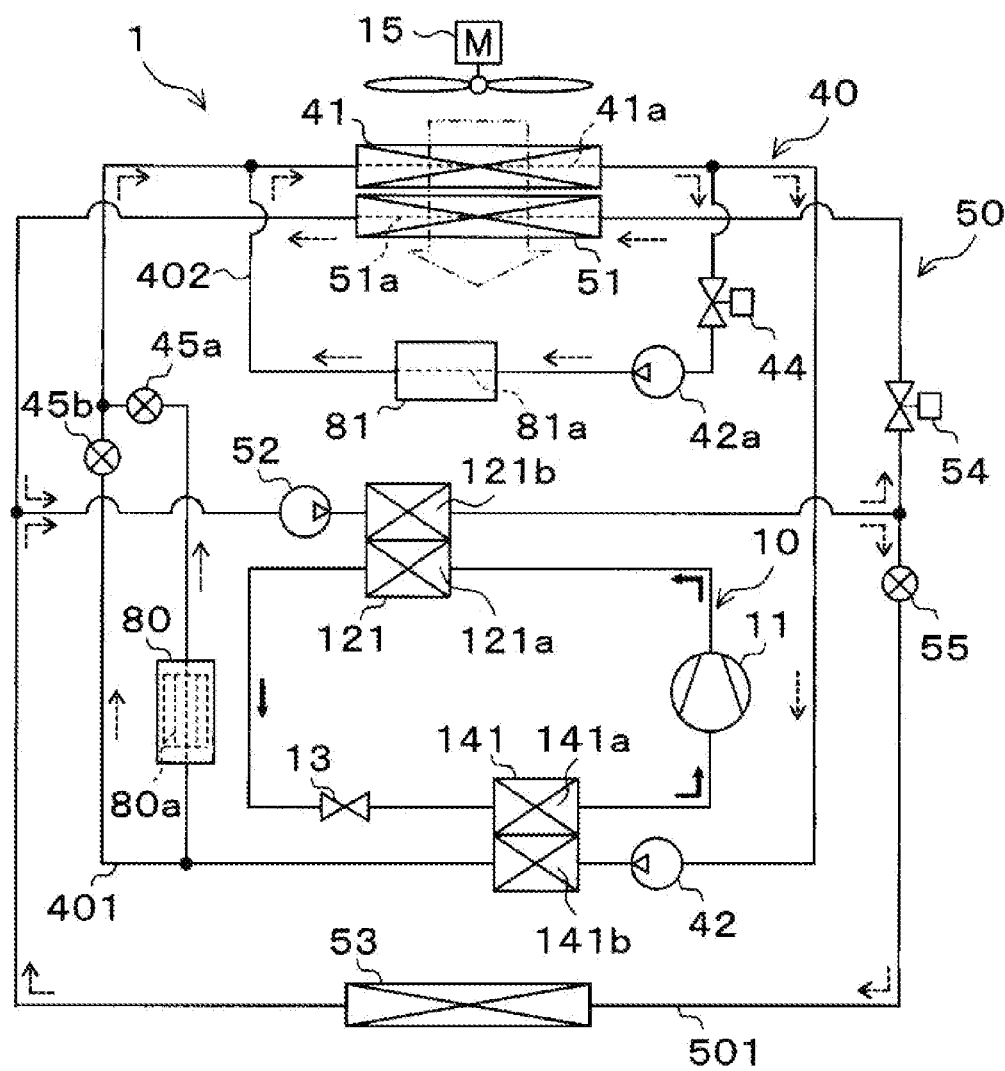
FIG. 7 is an overall configuration diagram of a temperature adjusting device of a seventh embodiment.

In the present embodiment, as illustrated in FIG. 7, a description will be made of an example in which the configuration of the first heat medium circuit 40 is changed and an outside-air-side target-object heat exchanger is added compared with the third embodiment. The outside-air-side target-object heat exchanger of the present embodiment exchanges heat between the first heat medium and an outside-air-side target object, and thus causes heat of the outside-air-side target object (that is, exhaust heat of the outside-air-side target object) to be absorbed by the first heat medium. The outside-air-side target object is included in a target object on which the temperature adjusting device 1 performs temperature adjustment.

The outside-air-side target object of the present embodiment is a vehicle-mounted device 81 that generates heat during operation. Specifically, as the vehicle-mounted device 81, an electric motor, an inverter, an advanced driving system control device, or the like may be employed. The electric motor is a vehicle-mounted device that outputs traveling driving force. The inverter is a vehicle-mounted device that supplies power to an electric motor. The advanced driving system control device is a so-called ADAS control device.

In order to appropriately operate the vehicle-mounted device 81, it is desirable that the vehicle-mounted device 81 is maintained within an appropriate temperature range in the same manner as the battery 80. However, the appropriate temperature range of the battery 80 and the appropriate temperature range of the vehicle-mounted device 81 are different from each other. In the present embodiment, an upper limit value of the appropriate temperature range of the vehicle-mounted device 81 is greater than an upper limit value of the appropriate temperature range of the battery 80.

A coolant passage 81*a* through which the first heat medium flows is provided inside a housing portion or a case that forms an outer shell of the vehicle-mounted device 81. The coolant passage 81*a* is an outside-air-side target-object heat exchanger that causes heat of the vehicle-mounted device 81 (that is, exhaust heat of the vehicle-mounted device 81) to be absorbed by the first heat medium.

The first heat medium circuit 40 of the present embodiment has a first vehicle-mounted device bypass passage 402. The first vehicle-mounted device bypass passage 402 is a heat medium passage that causes the first heat medium flowing out of the first heat medium passage 41*a* of the first radiator 41 to bypass the heat medium passage 141*b* of the chiller 141 and the coolant passage 80*a* of the battery 80 to be guided to the inlet side of the first heat medium passage 41*a*. The coolant passage 81*a* of the vehicle-mounted device 81 is connected to the first vehicle-mounted device bypass passage 402.

The first heat medium circuit 40 of the present embodiment has a first radiator side water pump 42*a* and a first vehicle-mounted device side flow rate regulation valve 44. The first radiator side water pump 42*a* and the first vehicle-mounted device side flow rate regulation valve 44 are disposed in the first vehicle-mounted device bypass passage 402.

The first radiator side water pump 42*a* pumps a part of the first heat medium flowing out of the first heat medium passage 41*a* of the first radiator 41 to the coolant passage 81*a* of the vehicle-mounted device 81. A fundamental configuration of the first radiator side water pump 42*a* is the same as that of the first battery side water pump 42.

The first vehicle-mounted device side flow rate regulation valve 44 adjusts a flow rate of the first heat medium flowing out of the first heat medium passage 41*a* of the first radiator 41 and that has flowed into the first vehicle-mounted device bypass passage 402. A fundamental configuration of the first vehicle-mounted device side flow rate regulation valve 44 is the same as that of the second radiator side flow rate regulation valve 54.

The input side of the control device 70 of the present embodiment is connected to a vehicle-mounted device temperature detection unit (not illustrated) that detects the vehicle-mounted device temperature TM, which is the temperature of the vehicle-mounted device 81, as a control sensor group. Remaining configurations are the same as those in the third embodiment.

Next, an operation of the temperature adjusting device 1 of the present embodiment having the above configuration will be described. In the temperature adjusting device 1 of the present embodiment, in the same manner as in the third embodiment, the control device 70 controls an operation of the control target device such that the battery temperature TB is maintained within an appropriate temperature range. The control device 70 controls an operation of the control target device such that the vehicle interior temperature Tr comes close to a set temperature that is set by the temperature setting unit. The control device 70 controls an operation of the control target device such that the vehicle-mounted device temperature TM is maintained within an appropriate temperature range.

Specifically, when the vehicle-mounted device temperature TM is lower than a predetermined reference temperature KTM, the control device 70 stops the first radiator side water pump 42a and brings the first vehicle-mounted device side flow rate regulation valve 44 into a fully closed state.

Thus, the first heat medium flowing out of the first heat medium passage 41a of the first radiator 41 does not flow into the first vehicle-mounted device bypass passage 402. That is, the temperature adjusting device 1 has exactly the same configuration as that in the third embodiment when the vehicle-mounted device temperature TM is lower than the reference temperature KTM. Therefore, in the same manner as in the third embodiment, it is possible to execute operations in the first battery cooling mode, the second battery cooling mode, the heating-cooling mode, and the heating operation mode.

When the vehicle-mounted device temperature TM is equal to or higher than the reference temperature KTM, the control device 70 operates the first radiator side water pump 42a and adjusts the valve opening degree of the first vehicle-mounted device side flow rate regulation valve 44. In this case, the opening degree of the first vehicle-mounted device side flow rate regulation valve 44 is adjusted such that the vehicle-mounted device temperature TM is maintained within an appropriate temperature range.

Therefore, in any of the operation modes, when the vehicle-mounted device temperature TM is equal to or higher than the reference temperature KTM, a part of the first heat medium cooled in the first heat medium passage 41a of the first radiator 41 is sucked into the first radiator side water pump 42a. The first heat medium pumped from the first radiator side water pump 42a flows into the coolant passage 81a of the vehicle-mounted device 81.

The first heat medium that has flowed into the coolant passage 81a of the vehicle-mounted device 81 absorbs heat from the vehicle-mounted device 81. Consequently, the vehicle-mounted device 81 is cooled. The first heat medium flowing out of the coolant passage 81a merges with the first heat medium pumped from the first battery side water pump 42 and flows into the first heat medium passage 41a of the first radiator 41.

The first heat medium that has flowed into the first heat medium passage 41a exchanges heat with the outside air blown from the external blower 15. Consequently, the temperature of the first heat medium comes close to the outside air temperature. Remaining operations are the same as in the third embodiment.

Therefore, in the temperature adjusting device 1 of the present embodiment, in the same manner as in the third embodiment, the battery 80 is efficiently and reliably cooled without consuming unnecessary energy in the refrigeration cycle device 10, and thus it is possible to restrict an increase in the temperature of the battery 80. The ventilation air can be heated to heat the vehicle compartment.

In addition thereto, since the coolant passage 81a of the vehicle-mounted device 81 that is an outside-air-side target-object heat exchanger is connected to the first vehicle-mounted device bypass passage 402, the exhaust heat of the vehicle-mounted device 81 can be absorbed by the first heat medium. Therefore, it is possible to cool the vehicle-mounted device 81 and thus to restrict an increase in the vehicle-mounted device temperature TM.

In the temperature adjusting device 1 of the present embodiment, when the battery 80 and the vehicle-mounted device 81 are cooled, the coolant passage 80a of the battery 80 the coolant passage 81a of the vehicle-mounted device 81 are connected in parallel to each other with respect to a flow of the first heat medium flowing out of the first heat medium passage 41a. Therefore, it is easy to respectively maintain the temperature of the battery 80 and the vehicle-mounted device temperature TM within different temperature ranges.

Eighth Embodiment

Figure 8:
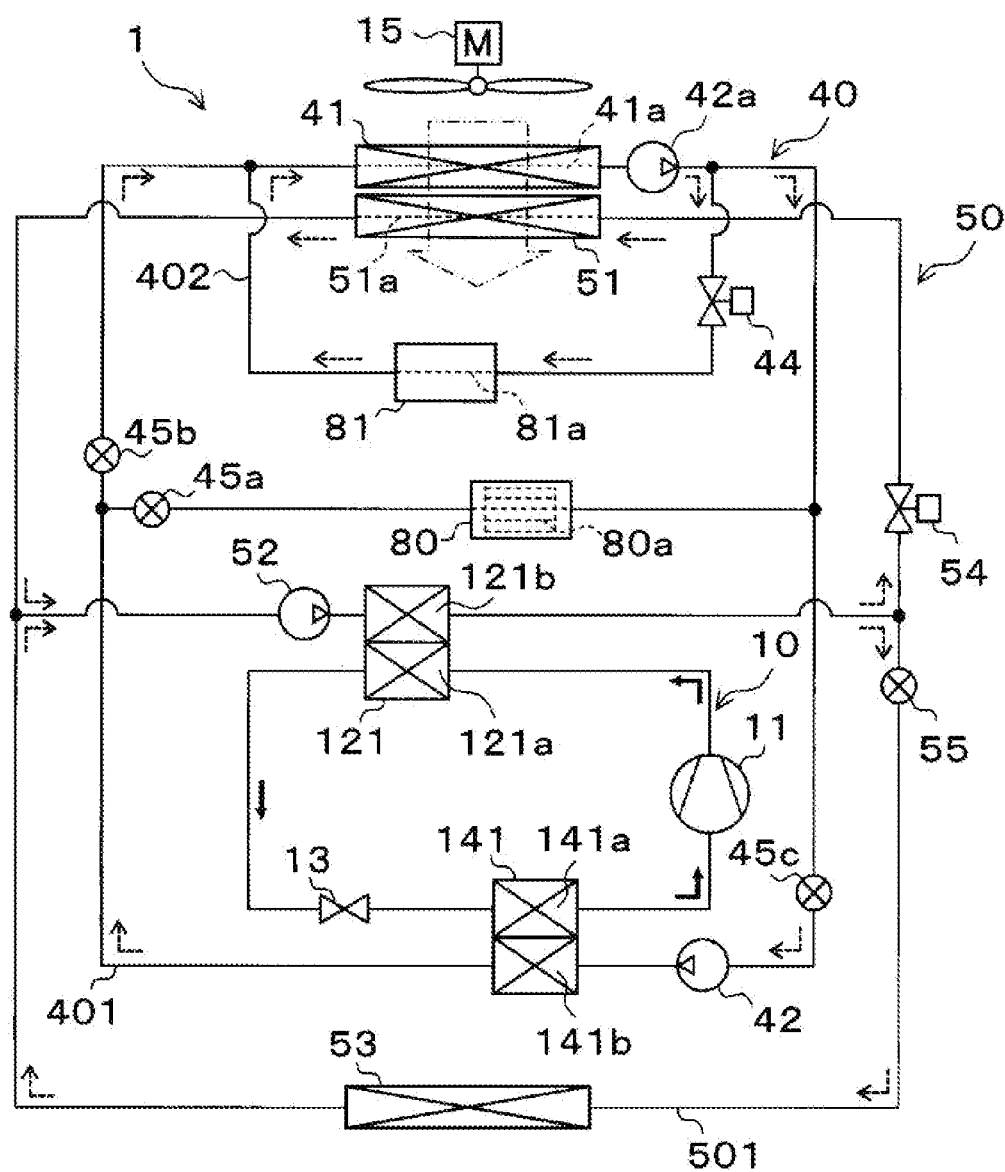
FIG. 8 is an overall configuration diagram of a temperature adjusting device of an eighth embodiment.

In the present embodiment, as illustrated in FIG. 8, an example in which the configuration of the first heat medium circuit 40 is changed and an outside-air-side target-object heat exchanger is added compared with the fourth embodiment.

The first heat medium circuit 40 of the present embodiment has a first vehicle-mounted device bypass passage 402 in the same manner as in the seventh embodiment. The first vehicle-mounted device bypass passage 402 is connected to the coolant passage 81a of the vehicle-mounted device 81. The first vehicle-mounted device side flow rate regulation valve 44 is disposed in the first vehicle-mounted device bypass passage 402.

The first radiator side water pump 42a of the present embodiment is disposed in a refrigerant passage from the first heat medium passage 41a of the first radiator 41 to a branch portion. The branch portion branches a flow of the refrigerant pumped from the first radiator side water pump 42a into a flow that is guided to the intake side of the first battery side water pump 42 and a flow that flows into the first battery side water pump 42.

In the second heat medium circuit 50 of the present embodiment, the first battery side water pump 42 is disposed on the upstream side of the heat medium passage 141b of the chiller 141 with respect to the heat medium flow compared with the fourth embodiment. The first chiller side open-close valve 45c is disposed on the upstream side of the first battery side water pump 42 of the first battery bypass passage 401 with respect to the heat medium flow. The first chiller side open-close valve 45c opens and closes the first battery bypass passage 401.

A fundamental configuration of the first chiller side open-close valve 45c is the same as that of the first battery side open-close valve 45a and the first bypass passage side open-close valve 45b. The first chiller side open-close valve 45c is a switching unit that switches circuit configurations of the first heat medium circuit 40 along with the first battery side open-close valve 45a and the first bypass passage side open-close valve 45b.

Next, an operation of the temperature adjusting device 1 of the present embodiment having the above configuration will be described. In the temperature adjusting device 1 of the present embodiment, respective operation modes may be switched in the same manner as in the fourth embodiment. The control device 70 controls an operation of the control target device such that the vehicle-mounted device temperature TM is maintained within an appropriate temperature range. Each operation mode will be described below.

(a) First Battery Cooling Mode

In the first battery cooling mode, the control device 70 opens the first battery side open-close valve 45*a*, opens the first bypass passage side open-close valve 45*b*, and closes the first chiller side open-close valve 45*c*. The control device 70 operates the external blower 15 and the first radiator side water pump 42*a*. The control device 70 stops the first battery side water pump 42, the second heat exchanger side water pump 52, and the compressor 11.

Therefore, in the first heat medium circuit 40, the first heat medium pumped from the first radiator side water pump 42*a* is circulated in an order of the coolant passage 80*a* of the battery 80 and the first heat medium passage 41*a* of the first radiator 41. That is, substantially, the first heat medium is circulated in the same manner as in the first battery cooling mode of the fourth embodiment. Consequently, in the first heat medium circuit 40, the exhaust heat absorbed by the first heat medium from the battery 80 can be radiated to the outside air in the first radiator 41.

In the second heat medium circuit 50, since the second heat exchanger side water pump 52 is stopped, the second heat medium is not circulated. In the refrigeration cycle device 10, the compressor 11 Is stopped, and the refrigerant is not circulated.

Therefore, in the first battery cooling mode, it is possible to restrict an increase in the temperature of the battery 80 in the same manner as in the first battery cooling mode of the fourth embodiment.

(b) Second Battery Cooling Mode

In the second battery cooling mode, the control device 70 opens the first battery side open-close valve 45*a*, closes the first bypass passage side open-close valve 45*b*, and opens the first chiller side open-close valve 45*c*. The control device 70 operates the first battery side water pump 42 and stops the first radiator side water pump 42*a*.

The control device 70 fully opens the second radiator side flow rate regulation valve 54 and closes the second heater core side open-close valve 55. The control device 70 operates the second heat exchanger side water pump 52 and the compressor 11.

Therefore, in the first heat medium circuit 40, the first heat medium pumped from the first battery side water pump 42 flows into the heat medium passage 141*b* of the chiller 141. The first heat medium that has flowed into the heat medium passage 141*b* of the chiller 141 is cooled by the heat thereof being absorbed by the refrigerant flowing through the refrigerant passage 141*a* of the chiller 141.

The first heat medium flowing out of the heat medium passage 141*b* flows into the coolant passage 80*a* of the battery 80. The first heat medium that has flowed into the coolant passage 80*a* of the battery 80 absorbs the exhaust heat of the battery 80 and thus increases in temperature. Consequently, the battery 80 is cooled. The first heat medium flowing out of the coolant passage 80*a* is sucked into the first battery side water pump 42 and is pumped to the heat medium passage 141*b* again.

In the second heat medium circuit 50, the second heat medium is circulated in the same manner as in the second battery cooling mode of the third embodiment. Consequently, in the second heat medium circuit 50, the heat absorbed by the second heat medium from the high-pressure refrigerant in the water-refrigerant heat exchanger 121 can be radiated to the outside air in the second radiator 51.

In the refrigeration cycle device 10, the refrigerant is circulated in the same manner as in the second battery cooling mode of the third embodiment. Consequently, in the refrigeration cycle device 10, the heat absorbed by the refrigerant from the first heat medium in the chiller 141 can be radiated to the second heat medium in the water-refrigerant heat exchanger 121.

Therefore, in the second battery cooling mode, it is possible to restrict an increase in the temperature of the battery 80. In the second battery cooling mode, the temperature of the first heat medium that has flowed into the coolant passage 80*a* of the battery 80 can be made lower than in the first battery cooling mode. Therefore, in the second battery cooling mode, the battery 80 can be cooled with a higher cooling capacity than in the first battery cooling mode.

(c) Heating-Cooling Mode

In the second battery cooling mode, the control device 70 opens the first battery side open-close valve 45*a*, opens the first bypass passage side open-close valve 45*b*, and opens the first chiller side open-close valve 45*c*. The control device 70 operates the external blower 15, the first battery side water pump 42, and the first radiator side water pump 42*a*. In this case, the control device 70 sets the pumping capacity of the first battery side water pump 42 to be higher than the pumping capacity of the first radiator side water pump 42*a*.

The control device 70 adjusts the opening degree of the second radiator side flow rate regulation valve 54 and also opens the second heater core side open-close valve 55 in the same manner as in the heating-cooling mode of the fourth embodiment. The control device 70 operates the second heat exchanger side water pump 52 and the compressor 11.

Therefore, in the first heat medium circuit 40, the first heat medium pumped from the first battery side water pump 42 flows into the heat medium passage 141*b* of the chiller 141. The first heat medium that has flowed into the heat medium passage 141*b* is cooled by the heat thereof being absorbed by the low-pressure refrigerant flowing through the refrigerant passage 141*a* of the chiller 141.

A part of the first heat medium flowing out of the heat medium passage 141*b* of the chiller 141 flows into the coolant passage 80*a* of the battery 80. Here, in the present embodiment, the pumping capacity of the first battery side water pump 42 is higher than the pumping capacity of the first radiator side water pump 42*a*. Therefore, the first heat medium pumped from the first radiator side water pump 42*a* does not flow backward to the first battery side open-close valve 45*a* through the coolant passage 80*a* of the battery 80.

The first heat medium that has flowed into the coolant passage 80*a* of the battery 80 absorbs the exhaust heat of the battery 80 and thus increases in temperature. Consequently, the battery 80 is cooled. The first heat medium flowing out of the coolant passage 80*a* merges with the first heat medium pumped from the first radiator side water pump 42*a*.

The residual first heat medium flowing out of the heat medium passage 141*b* of the chiller 141 flows into the first heat medium passage 41*a* of the first radiator 41. The first heat medium that has flowed into the first heat medium passage 41*a* exchanges heat with the outside air blown from the external blower 15. Consequently, the temperature of the first heat medium comes close to the outside air temperature.

The first heat medium flowing out of the first heat medium passage 41*a* is sucked into the first radiator side water pump 42*a* and is pumped. The first heat medium pumped from the first radiator side water pump 42*a* merges with the first heat medium flowing out of the coolant passage 80*a* of the battery 80. The first heat medium that has merged is sucked into the first battery side water pump 42 and is pumped to the heat medium passage 141*b* again.

In the second heat medium circuit 50, the second heat medium is circulated in the same manner as in the heating-cooling mode of the fourth embodiment. Consequently, in the second heat medium circuit 50, part of the heat absorbed by the second heat medium from the high-pressure refrigerant in the water-refrigerant heat exchanger 121 can be radiated to the ventilation air in the heater core 53. The residual heat is radiated to the outside air in the second radiator 51.

In the refrigeration cycle device 10, the refrigerant is circulated in the same manner as in the second battery cooling mode. Consequently, in the refrigeration cycle device 10, the heat absorbed by the refrigerant from the first heat medium in the chiller 141 can be radiated to the second heat medium in the water-refrigerant heat exchanger 121.

Therefore, in the heating-cooling mode, the battery 80 can be cooled with a high cooling capacity in the same manner as in the second battery cooling mode. The ventilation air can be heated in the heater core 53 to heat the vehicle compartment.

In the temperature adjusting device 1 of the present embodiment, in each of the above-described operation modes, the control device 70 controls an operation of the control target device such that the vehicle-mounted device temperature TM is maintained within an appropriate temperature range in the same manner as in the seventh embodiment.

Specifically, when the vehicle-mounted device temperature TM is lower than the predetermined reference temperature KTM, the control device 70 stops the first radiator side water pump 42*a* and brings the first vehicle-mounted device side flow rate regulation valve 44 into a fully closed state. When the vehicle-mounted device temperature TM is equal to or higher than the reference temperature KTM, the control device 70 operates the first radiator side water pump 42*a* and brings the first vehicle-mounted device side flow rate regulation valve 44 into an open state (that is, a flow rate adjustment state).

Therefore, in the temperature adjusting device 1 of the present embodiment, in the same manner as in the fourth embodiment, the battery 80 can be efficiently and reliably cooled without consuming unnecessary energy in the refrigeration cycle device 10, and thus it is possible to restrict an increase in the temperature of the battery 80. The ventilation air can be heated in the heater core 53 to heat the vehicle compartment.

In addition thereto, since the coolant passage 81*a* of the vehicle-mounted device 81 that is an outside-air-side target-object heat exchanger is connected to the first vehicle-mounted device bypass passage 402, the exhaust heat of the vehicle-mounted device 81 can be absorbed by the first heat medium. Therefore, it is possible to cool the vehicle-mounted device 81 and thus to restrict an increase in the vehicle-mounted device temperature TM in the same manner as in the seventh embodiment.

The temperature adjusting device 1 of the present embodiment includes the first battery side open-close valve 45*a*, the first bypass passage side open-close valve 45*b*, and the first chiller side open-close valve 45*c*, which is a switching unit.

Therefore, as in the first battery cooling mode, it is possible to perform switching to a circuit configuration in which the first heat medium flowing out of the first radiator 41 flows into the coolant passage 80*a* of the battery 80 by bypassing the heat medium passage 141*b* of the chiller 141. Thus, the first radiator 41 may be used as a heat radiation heat exchanger that radiates the exhaust heat of the battery 80 to the outside air via the first heat medium.

As in the heating-cooling mode, it is possible to switch a circuit configuration in which the first heat medium flowing out of the first radiator flows into the heat medium passage 141*b* of the chiller 141 without passing through the coolant passage 80*a* of the battery 80. Thus, the first radiator 41 may be used as a heat-absorbing heat exchanger that causes heat to be absorbed by the first heat medium from the outside air.

Ninth Embodiment

Figure 9:
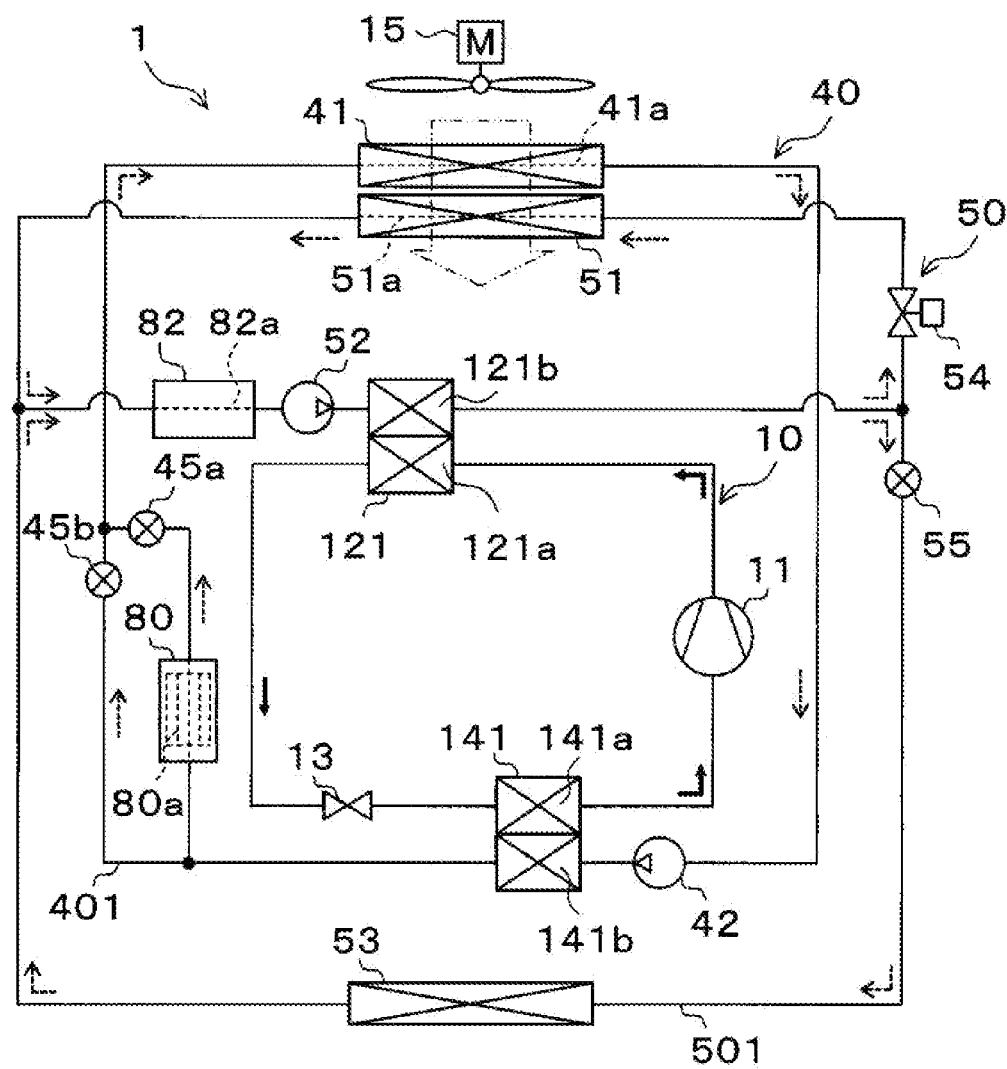
FIG. 9 is an overall configuration diagram of a temperature adjusting device of a ninth embodiment.

In the present embodiment, as illustrated in FIG. 9, a description will be made of an example in which the configuration of the second heat medium circuit 50 is changed and an outside-air-side target-object heat exchanger is added compared with the third embodiment. The outside-air-side target-object heat exchanger of the present embodiment exchanges heat between the second heat medium and an outside-air-side target object, and causes heat of the outside-air-side target object (that is, the exhaust heat of the outside-air-side target object) absorbed by the second heat medium.

The outside-air-side target object of the present embodiment is a vehicle-mounted device 82 that generates heat during operation. As the vehicle-mounted device 82, the same device as in the seventh embodiment may be employed. A coolant passage 82*a* through which the second heat medium flows is provided inside a housing portion or a case that forms an outer shell of the vehicle-mounted device 82. The coolant passage 82*a* is an outside-air-side target-object heat exchanger that causes heat of the vehicle-mounted device 82 (that is, exhaust heat of the vehicle-mounted device 82) to be absorbed by the second heat medium.

The coolant passage 82*a* is connected to the second heat medium circuit 50. More specifically, the coolant passage 82*a* is disposed in a heat medium passage from a merging portion of the second heat medium to the intake port side of the second heat exchanger side water pump 52. The merging portion of the second heat medium is a portion where a flow of the second heat medium flowing out of the second heat medium passage 51*a* of the second radiator 51 merges with a flow of the second heat medium flowing out of the heater core 53. Remaining configurations are the same as those in the third embodiment.

Thus, when the temperature adjusting device 1 of the present embodiment is operated, the respective operation modes can be switched in the same manner as in the third embodiment. The second heat medium can be caused to flow through the coolant passage 82*a* during the second battery cooling mode, the heating-cooling mode, and the heating operation mode in which the second heat exchanger side water pump 52 is operated.

Therefore, in the temperature adjusting device 1 of the present embodiment, in the same manner as in the third embodiment, the battery 80 can be efficiently and reliably cooled without consuming unnecessary energy in the refrigeration cycle device 10, and thus it is possible to restrict an increase in the temperature of the battery 80. The ventilation air can be heated in the heater core 53 to heat the vehicle compartment.

In the temperature adjusting device 1 of the present embodiment, the second heat medium can be caused to flow into the coolant passage 82*a* of the vehicle-mounted device 82 during the second battery cooling mode, the heating-cooling mode, and the heating operation mode.

Here, the second heat medium that has flowed into the coolant passage 82*a* of the vehicle-mounted device 82 is the second heat medium that exchanges heat with the outside air in the second heat medium passage 51*a* of the second radiator 51, the second heat medium that exchanges heat with the ventilation air in the heater core 53, or the second heat medium obtained through merging thereof. Thus, the temperature of the second heat medium that flows into the coolant passage 82a of the vehicle-mounted device 82 comes close to the outside air temperature.

Therefore, in the second battery cooling mode, the heating-cooling mode, and the heating operation mode, the second heat medium having the outside air temperature can be caused to flow into the coolant passage 82a of the vehicle-mounted device 82 to cool the vehicle-mounted device 82. Consequently, it is possible to restrict an increase in the temperature of the vehicle-mounted device 82.

In the present embodiment, the coolant passage 80a of the battery 80 is connected to the first heat medium circuit 40, and the coolant passage 82a of the vehicle-mounted device 82 is connected to the second heat medium circuit 50. Therefore, it is easy to maintain the temperature of the battery 80 and the temperature of the vehicle-mounted device 82 within different temperature ranges.

Tenth Embodiment

Figure 10:
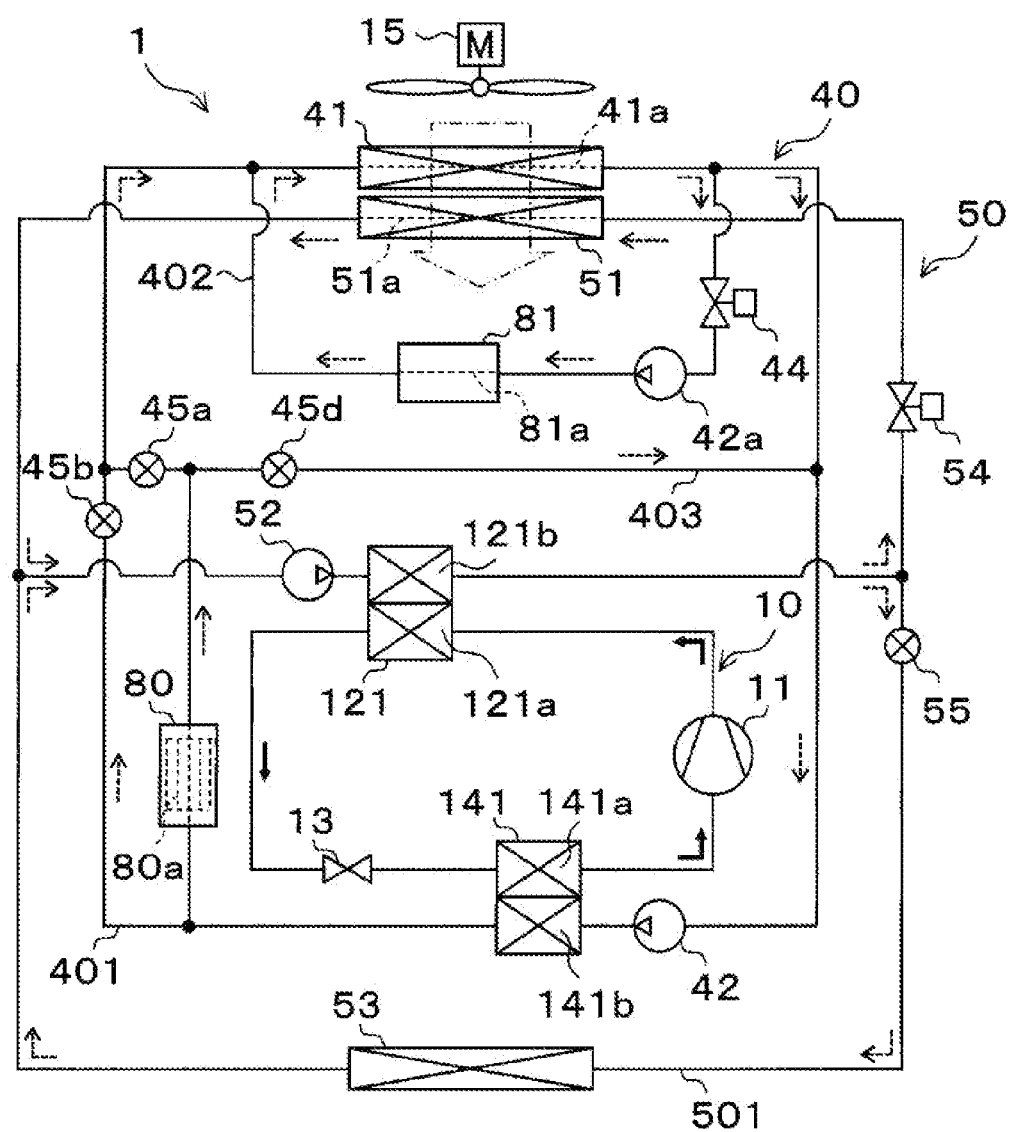
FIG. 10 is an overall configuration diagram of a temperature adjusting device of a tenth embodiment.

In the present embodiment, as illustrated in FIG. 10, a description will be made of an example in which the configuration of the first heat medium circuit 40 is changed compared with the seventh embodiment.

Specifically, the first heat medium circuit 40 of the present embodiment has a first radiator bypass passage 403. The first radiator bypass passage 403 is a heat medium passage that causes the first heat medium flowing out of the coolant passage 80a of the battery 80 to bypass the first heat medium passage 41a of the first radiator 41 to be guided to the intake port side of the first battery side water pump 42.

A first radiator side open-close valve 45d that opens and closes the first radiator bypass passage 403 is disposed in the first radiator bypass passage 403. A fundamental configuration of the first radiator side open-close valve 45d is the same as that of the first battery side open-close valve 45a or the like. Remaining configurations are the same as those in the seventh embodiment.

Thus, in the temperature adjusting device 1 of the present embodiment, when the first radiator side open-close valve 45d closes the first radiator bypass passage 403, this configuration is exactly the same as that in the seventh embodiment. Therefore, the temperature adjusting device 1 of the present embodiment is operated exactly in the same manner as in the seventh embodiment, and can thus achieve the same effect as in the seventh embodiment.

In the temperature adjusting device 1 of the present embodiment, a strong heating-cooling mode may be executed when the heating capacity of the ventilation air decreases during the heating-cooling mode.

In the strong heating-cooling mode, the control device 70 closes the first battery side open-close valve 45a, closes the first bypass passage side open-close valve 45b, and opens the first radiator side open-close valve 45d. The control device 70 operates the first battery side water pump 42. The control device 70 brings the second radiator side flow rate regulation valve 54 into a fully closed state and opens the second heater core side open-close valve 55. The control device 70 operates the second heat exchanger side water pump 52 and the compressor 11.

Therefore, in the first heat medium circuit 40, the first heat medium pumped from the first battery side water pump 42 flows into the heat medium passage 141b of the chiller 141. The first heat medium that has flowed into the heat medium passage 141b of the chiller 141 is cooled by the heat thereof being absorbed by the low-pressure refrigerant flowing through the refrigerant passage 141a of the chiller 141.

The first heat medium flowing out of the refrigerant passage 141a flows into the coolant passage 80a of the battery 80. The first heat medium that has flowed into the coolant passage 80a absorbs the exhaust heat of the battery 80 and thus increases in temperature. Consequently, the battery 80 is cooled.

Since the first radiator side open-close valve 45d is open, the first heat medium flowing out of the coolant passage 80a is sucked into the first battery side water pump 42 through the first radiator bypass passage 403 and is pumped to the heat medium passage 141b again.

In the second heat medium circuit 50, the second heat medium pumped from the second heat exchanger side water pump 52 flows into the heat medium passage 121b of the water-refrigerant heat exchanger 121. The second heat medium that has flowed into the heat medium passage 121b absorbs heat from the high-pressure refrigerant flowing through the refrigerant passage 121a and thus increases in temperature.

The second heat medium flowing out of the heat medium passage 121b flows into the heater core 53 because the second radiator side flow rate regulation valve 54 is in a fully closed state. The second heat medium that has flowed into the heater core 53 exchanges heat with the ventilation air blown from the internal blower to radiate heat. Consequently, the ventilation air is heated. The second heat medium flowing out of the heater core 53 is sucked into the second heat exchanger side water pump 52 and is pumped to the heat medium passage 121b again.

In the refrigeration cycle device 10, the refrigerant is circulated in the same manner as in the heating-cooling mode. Consequently, in the refrigeration cycle device 10, the heat absorbed by the refrigerant from the first heat medium in the chiller 141 can be radiated to the second heat medium in the water-refrigerant heat exchanger 121.

That is, in the first heat medium circuit 40 in the strong heating-cooling mode, the overall exhaust heat absorbed by the first heat medium from the battery 80 can be radiated to the refrigerant in the chiller 141. In the refrigeration cycle device 10, the heat absorbed by the refrigerant from the first heat medium in the chiller 141 can be radiated to the second heat medium in the water-refrigerant heat exchanger 121. In the second heat medium circuit 50, the heat absorbed by the second heat medium from the second heat medium in the water-refrigerant heat exchanger 121 can be radiated to the ventilation air in the heater core 53.

Therefore, according to the temperature adjusting device 1 of the present embodiment, in the same manner as in the seventh embodiment, the battery 80 can be efficiently and reliably cooled without consuming unnecessary energy in the refrigeration cycle device 10, and thus it is possible to restrict an increase in the temperature of the battery 80. The ventilation air can be heated to heat the vehicle compartment. The vehicle-mounted device 81 can be cooled to restrict an increase in the vehicle-mounted device temperature TM.

In addition thereto, in the temperature adjusting device 1 of the present embodiment, an operation in the strong heating-cooling mode can be executed. In the strong heating-cooling mode, the ventilation air can be heated by using the overall exhaust heat absorbed from the battery 80 by the first heat medium as a heat source. Therefore, it is possible to efficiently secure a heat source for heating the ventilation air without consuming unnecessary energy in the refrigeration cycle device 10. It is possible to heat the vehicle compartment with a higher heating capacity than in the heating-cooling mode.

Eleventh Embodiment

Figure 11:
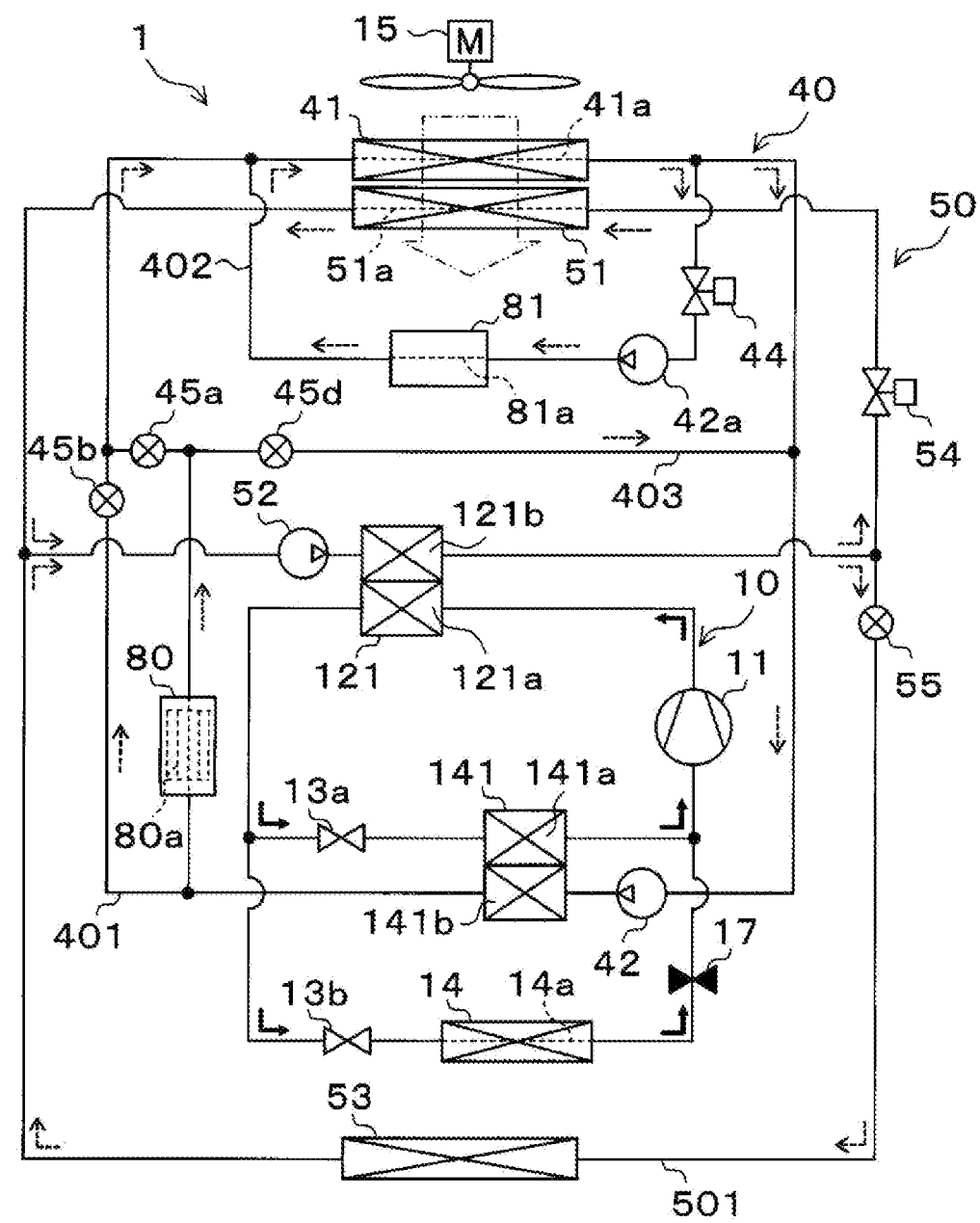
FIG. 11 is an overall configuration diagram of a temperature adjusting device of an eleventh embodiment.

In the present embodiment, as illustrated in FIG. 11, a description will be made of an example in which the configuration of the refrigeration cycle device 10 is changed compared with the tenth embodiment. In the refrigeration cycle device 10 of the present embodiment, an internal evaporator 14 is as a fluid-side evaporator compared with the tenth embodiment. The ventilation air blown to the internal evaporator 14 is a cooling target fluid. The cooling target fluid is included in a target object on which the temperature adjusting device 1 performs temperature adjustment.

More specifically, in the refrigeration cycle device 10 of the present embodiment, the refrigerant passage 141*a* of the chiller 141 and the refrigerant passage 14*a* of the internal evaporator 14 are connected in parallel to each other with respect to a flow of the refrigerant flowing out of the refrigerant passage 121*a* of the water-refrigerant heat exchanger 121.

A chiller side expansion valve 13*a* as a pressure reducing portion is disposed in a refrigerant passage from the branch portion that branches the flow of the refrigerant flowing out of the refrigerant passage 121*a* of the water-refrigerant heat exchanger 121 to the inlet side of the refrigerant passage 141*a* of the chiller 141. An evaporator side expansion valve 13*b* as a fluid-side pressure reducing portion is disposed in a refrigerant passage from the branch portion to the inlet side of the refrigerant passage 14*a* of the internal evaporator 14.

The chiller side expansion valve 13*a* and the evaporator side expansion valve 13*b* are of an electrical type expansion valve having a valve body configured to be capable of changing the throttle opening degree and an electric actuator changing the opening degree of the valve body. The chiller side expansion valve 13*a* and the evaporator side expansion valve 13*b* have a fully open function and a fully closed function. Operations of the chiller side expansion valve 13*a* and the evaporator side expansion valve 13*b* are controlled according to a control signal output from the control device 70.

An evaporation pressure regulation valve 17 is disposed in the refrigerant passage from the refrigerant passage 14*a* of the internal evaporator 14 to a merging portion. The merging portion is a portion where the flow of the refrigerant flowing out of the refrigerant passage 141*a* of the chiller 141 merges with the flow of the refrigerant flowing out of the refrigerant passage 14*a* of the internal evaporator 14.

The evaporation pressure regulation valve 17 maintains the refrigerant pressure on the upstream side to be equal to or higher than a predetermined reference pressure. In other words, the evaporation pressure regulation valve 17 maintains the refrigerant evaporating pressure in the internal evaporator 14 to be equal to or higher than the reference pressure.

The evaporation pressure regulation valve 17 is configured with a mechanical variable throttle mechanism that increases the valve opening degree as the pressure of the refrigerant on the outlet side of the internal evaporator 14 rises. The evaporation pressure regulation valve 17 maintains the refrigerant evaporation temperature in the internal evaporator 14 to be equal to or higher than a frost suppression temperature (1° C. in the present embodiment) at which a frost in the internal evaporator 14 is suppressed.

Next, a disposition aspect of the internal evaporator 14 and the heater core 53 of the present embodiment will be described with reference to FIG. 12. The internal evaporator 14 and the heater core 53 are housed in a casing 31 of an internal air conditioning unit 30. The internal air conditioning unit 30 is a unit for blowing temperature-adjusted ventilation air to an appropriate location in the vehicle compartment. The internal air conditioning unit 30 is disposed inside an instrument panel at the foremost portion of the vehicle compartment.

The casing 31 forms an air passage for the ventilation air blown into the vehicle compartment. An inside-outside air switch device 33 is disposed on the most upstream side of the ventilation air flow in the casing 31. The inside-outside air switch device 33 is an inside-outside air switch unit that switches and introduces the inside air (vehicle interior air) and the outside air (vehicle exterior air) into the casing 31. An operation of the inside-outside air switch device 33 is controlled according to a control signal output from the control device 70.

An internal blower 32 is disposed on the ventilation air flow downstream side in the inside-outside air switch device 33. The internal blower 32 blows the air sucked through the inside-outside air switch device 33 toward the vehicle compartment. The internal blower 32 is an electric blower whose rotation speed (that is, an air blowing capacity) is controlled according to a control voltage output from the control device 70.

The internal evaporator 14 and the heater core 53 are disposed in this order with respect to the flow of the ventilation air on the ventilation air flow downstream side of the internal blower 32. That is, the internal evaporator 14 is disposed further toward the ventilation air flow upstream side than the heater core 53. A cold air bypass passage 35 that causes the ventilation air that has passed through the internal evaporator 14 to bypass the heater core 53 and to flow to the downstream side is provided in the casing 31.

An air mix door 34 is disposed on the ventilation air flow downstream side of the internal evaporator 14 and on the ventilation air flow upstream side of the heater core 53. The air mix door 34 adjusts an air volume ratio between an air volume of the ventilation air passing through the heater core 53 and an air volume of the ventilation air passing through the cold air bypass passage 35 with respect to the ventilation air that has passed through the internal evaporator 14. An operation of the electric actuator for driving the air mix door is controlled according to a control signal output from the control device 70.

A mixing space 36 that mixes the ventilation air that has been heated in the heater core 53 with the ventilation air that has passed through the cold air bypass passage 35 and has not been heated in the heater core 53 is disposed on the ventilation air flow downstream side of the heater core 53. An opening hole (not illustrated) that blows the ventilation air (air conditioning wind) mixed in the mixing space 36 into the vehicle compartment is disposed at the most downstream portion of the ventilation air flow of the casing 31.

Therefore, the air mix door 34 adjusts the air volume ratio between the air volume of the ventilation air passing through the heater core 53 and the air volume of the ventilation air passing through the cold air bypass passage 35 and thus the temperature of the air conditioning wind mixed in the mixing space 36 is adjusted. Consequently, the temperature of the ventilation air blown from each blowing port into the vehicle compartment is adjusted. Remaining configurations are the same as those in the tenth embodiment.

Thus, when the chiller side expansion valve 13a is in a fully closed state, a configuration of the temperature adjusting device 1 of the present embodiment is the same as that in the tenth embodiment. Therefore, the temperature adjusting device 1 of the present embodiment is operated in the same manner as in the tenth embodiment, and the same effect as in the tenth embodiment can be achieved.

The temperature adjusting device 1 of the present embodiment includes an internal evaporator 14. Therefore, the ventilation air can be cooled in the internal evaporator 14 during an operation mode in which the compressor 11 of the refrigeration cycle device 10 is operated, such as the second battery cooling mode, the heating-cooling mode, or the heating operation mode.

More specifically, during the operation mode in which the compressor 11 of the refrigeration cycle device 10 is operated, the evaporator side expansion valve 13b is brought into a throttle state in which a refrigerant pressure reducing action is exhibited. Consequently, the low-pressure refrigerant can be made to flow into the refrigerant passage 14a of the internal evaporator 14. The ventilation air can be cooled by evaporating the low-pressure refrigerant in the refrigerant passage 14a of the internal evaporator 14 to exert a heat absorbing action.

Therefore, according to the temperature adjusting device 1 of the present embodiment, the same effect as that in the tenth embodiment can be achieved, and the ventilation air can be cooled in the internal evaporator 14 to cool the vehicle compartment.

In this case, the throttle opening degree of the chiller side expansion valve 13a and the evaporator side expansion valve 13b is adjusted, and thus it is possible to adjust a flow rate ratio between a flow rate of the refrigerant flowing into the refrigerant passage 141a of the chiller 141 and a flow rate of the refrigerant flowing into the refrigerant passage 14a of the internal evaporator 14. Consequently, it is possible to adjust the cooling capacity of the first heat medium exhibited in the chiller 141 and the cooling capacity of the ventilation air exerted in the internal evaporator 14.

The temperature adjusting device 1 of the present embodiment includes the internal air conditioning unit 30. In the internal air conditioning unit 30, the ventilation air cooled in the internal evaporator 14 can be reheated in the heater core 53 by adjusting the opening degree of the air mix door 34. Therefore, dehumidification and heating can be performed by reheating the cooled and dehumidified ventilation air and blowing the ventilation air into the vehicle compartment.

In other words, during an operation mode in which the ventilation air is heated in the heater core 53, such as the heating-cooling mode, the strong heating-cooling mode, or the heating operation mode, the low-pressure refrigerant is made to flow into the internal evaporator 14 to cool the ventilation air, and thus the vehicle compartment can be dehumidified and heated.

Figure 12:
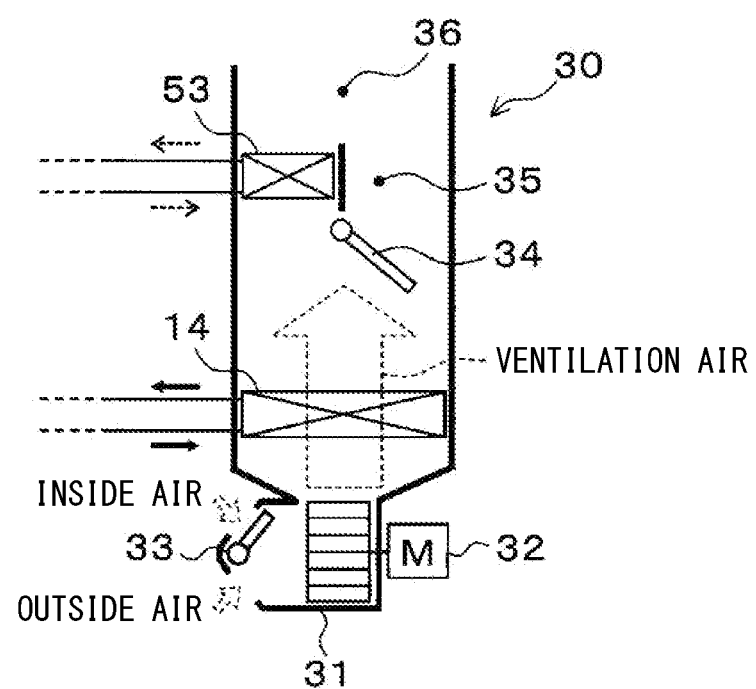
FIG. 12 is a schematic configuration diagram of an internal air conditioning unit.

The internal air conditioning unit 30 of the present embodiment has the inside-outside air switch device 33 as illustrated in FIG. 12. Therefore, when an operation mode in which the ventilation air is cooled is switched to an operation mode in which both the ventilation air and the battery 80 are cooled, an operation of the inside-outside air switch device 33 may be controlled to increase an introduction ratio of the outside air in the ventilation air flowing into the internal evaporator 14.

Here, the operation mode in which the ventilation air is cooled is an operation mode in which the low-pressure refrigerant is supplied to the internal evaporator 14 to cool the ventilation air. That is, the operation mode in which the ventilation air is cooled is an operation mode in which the vehicle compartment is cooled or is dehumidified and heated.

In the operation mode in which both the ventilation air and the battery 80 are cooled, low-pressure refrigerant is supplied to both the internal evaporator 14 and the chiller 141 to cool the ventilation air in the internal evaporator 14. This operation mode is an operation mode in which the first heat medium cooled in the chiller 141 flows into the coolant passage 80a of the battery 80.

Immediately after switching from the operation mode in which the ventilation air is cooled to the operation mode in which both the ventilation air and the battery 80 are cooled, the first heat medium with a relatively high temperature that has absorbed the exhaust heat of the battery 80 flows into the heat medium passage 141b of the chiller 141. Thus, the pressure of the low-pressure refrigerant flowing through the refrigerant passage 141a of the chiller 141 tends to increase. Due to this, the refrigerant evaporating pressure in the internal evaporator 14 also tends to increase.

Therefore, by increasing an introduction ratio of the outside air, a heat load on the refrigeration cycle device 10 can be reduced, and an increase in the refrigerant evaporating pressure in the internal evaporator 14 can be restricted.

Twelfth Embodiment

Figure 13:
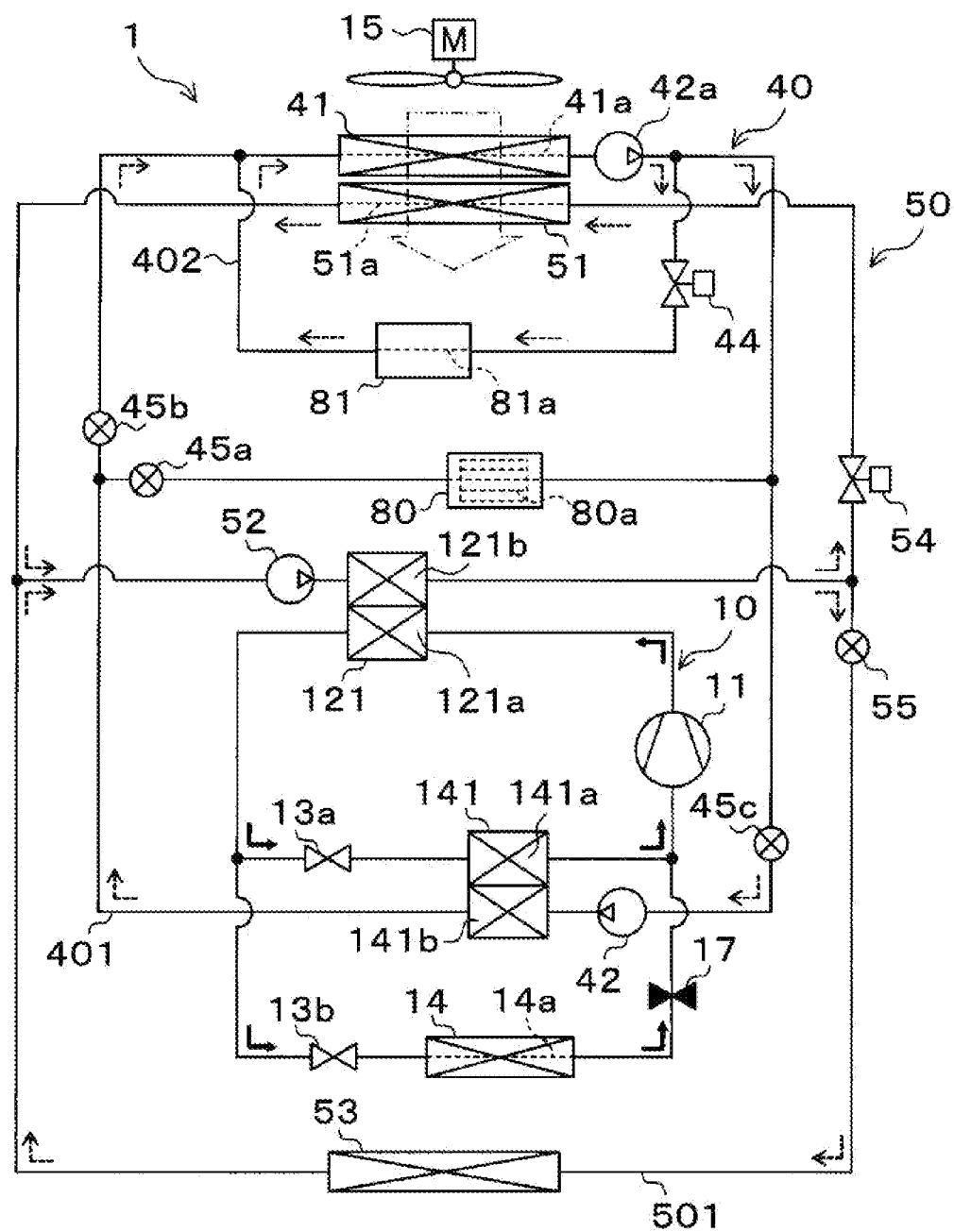
FIG. 13 is an overall configuration diagram of a temperature adjusting device of a twelfth embodiment.

In the present embodiment, as illustrated in FIG. 13, a description will be made of an example in which the configuration of the refrigeration cycle device 10 is changed compared with the eighth embodiment. In the refrigeration cycle device 10 of the present embodiment, in the same manner as in the eleventh embodiment, the internal evaporator 14, the chiller side expansion valve 13a, the evaporator side expansion valve 13b, and the evaporation pressure regulation valve 17 are added.

The internal evaporator 14 and the heater core 53 of the present embodiment are also housed in the casing 31 of the internal air conditioning unit 30 in the same manner as in the eleventh embodiment. This is also the same for a temperature adjusting device including both of the internal evaporator 14 and the heater core 53 or a temperature adjusting device including both of the internal evaporator 14 and the internal condenser 122. Remaining configurations are the same as those in the eighth embodiment.

Thus, when the chiller side expansion valve 13a is in a fully closed state, a configuration of the temperature adjusting device 1 of the present embodiment is the same as that in the eighth embodiment. Therefore, the temperature adjusting device 1 of the present embodiment is operated in the same manner as in the eighth embodiment, and the same effect as in the tenth embodiment can be achieved. In the same manner as in the eleventh embodiment, the vehicle compartment can be cooled or can be dehumidified and heated.

Thirteenth Embodiment

In the eighth embodiment or twelfth embodiments described above, for example, a flowing direction of the first heat medium flowing through the coolant passage 80a of the battery 80 during the first battery cooling mode is different from a flowing direction of the first heat medium flowing through the coolant passage 80a of the battery 80 during the second battery cooling mode. Such a change in the flowing direction may adversely affect the cooling performance for the battery 80.

Figure 14:
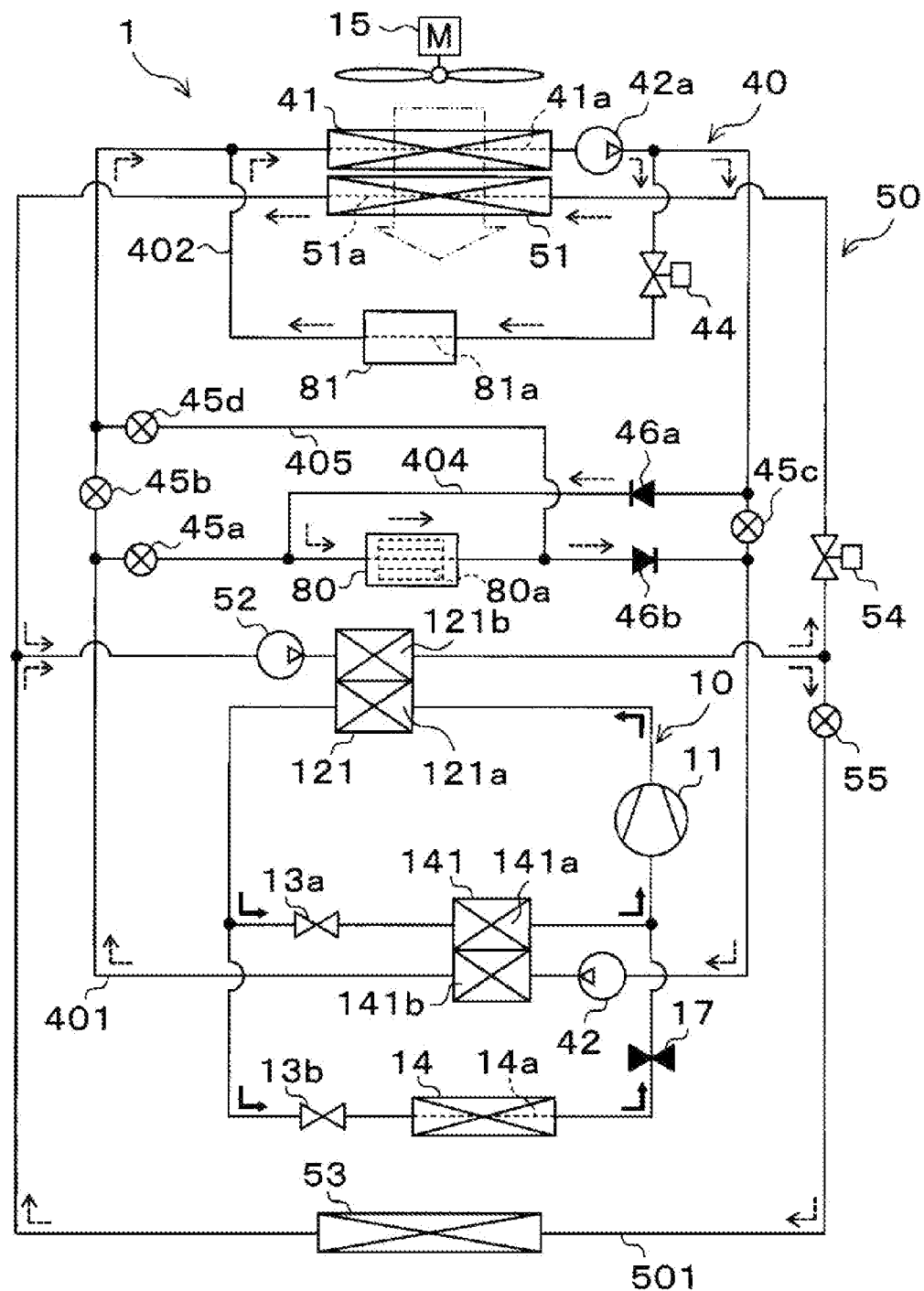
FIG. 14 is an overall configuration diagram of a temperature adjusting device of a thirteenth embodiment.

Therefore, in the present embodiment, as illustrated in FIG. 14, a description will be made of an example in which the configuration of the first heat medium circuit 40 is changed compared with the twelfth embodiment.

Specifically, the first heat medium circuit 40 of the present embodiment has a first radiator outlet side passage 404 that guides the first heat medium flowing out of the first heat medium passage 41a of the first radiator 41 to the inlet side of the coolant passage 80a of the battery 80. The first radiator outlet side passage 404 guides the first heat medium on the upstream side of the first chiller side open-close valve 45c to the inlet side of the coolant passage 80a.

A first radiator outlet side check valve 46a is disposed in the first radiator outlet side passage 404. The first radiator outlet side check valve 46a allows the first heat medium flowing out of the first heat medium passage 41a to flow to the inlet side of the coolant passage 80a and prohibits backward flow.

The first heat medium circuit 40 has a first radiator inlet side passage 405 that guides the first heat medium flowing out of the coolant passage 80a of the battery 80 to the inlet side of the first heat medium passage 41a of the first radiator 41. A first radiator side open-close valve 45d is disposed in the first radiator inlet side passage 405.

A first battery outlet side check valve 46b is provided in a heat medium passage from the outlet side of the coolant passage 80a of the battery 80 to the intake port side of the first battery side water pump 42 on the downstream side of the first chiller side open-close valve 45c. The first battery outlet side check valve 46b allows the first heat medium flowing out of the coolant passage 80a to flow to the intake port side of the first battery side water pump 42, and prohibits backward flow. Remaining configurations are the same as those in the twelfth embodiment.

Next, an operation of the temperature adjusting device 1 of the present embodiment having the above configuration will be described. A fundamental operation of the temperature adjusting device 1 of the present embodiment is the same as that in the twelfth embodiment. Each operation mode will be described.

(a) First Battery Cooling Mode

In the first battery cooling mode, the control device 70 closes the first battery side open-close valve 45a, opens the first bypass passage side open-close valve 45b, closes the first chiller side open-close valve 45c, and closes the first radiator side open-close valve 45d. The control device 70 operates the external blower 15 and the first radiator side water pump 42a. The control device 70 operates the first battery side water pump 42 and the second heat exchanger side water pump 52, and stops the compressor 11.

Therefore, in the first heat medium circuit 40, the first heat medium pumped from the first radiator side water pump 42a flows into the coolant passage 80a of the battery 80 through the first radiator outlet side passage 404. The first heat medium that has flowed into the coolant passage 80a absorbs heat from the battery 80 and increases in temperature. Consequently, the battery 80 is cooled.

The first heat medium flowing out of the coolant passage 80a of the battery 80 is sucked into the first battery side water pump 42. The first heat medium pumped from the first battery side water pump 42 flows into the heat medium passage 141b of the chiller 141. The first heat medium that has flowed into the heat medium passage 141b flows out of the heat medium passage 141b without exchanging heat with the refrigerant because the compressor 11 is not operated.

The first heat medium flowing out of the heat medium passage 141b flows into the first heat medium passage 41a of the first radiator 41. The first heat medium that has flowed into the first heat medium passage 41a exchanges heat with the outside air blown from the external blower 15 and radiates heat. Consequently, the first heat medium is cooled. The first heat medium flowing out of the first heat medium passage 41a is sucked into the first radiator side water pump 42a and is pumped to the inlet side of coolant passage 80a again.

(b) Second Battery Cooling Mode

In the second battery cooling mode, the control device 70 opens the first battery side open-close valve 45a, closes the first bypass passage side open-close valve 45b, closes the first chiller side open-close valve 45c, and closes the first radiator side open-close valve 45d. The control device 70 operates the first battery side water pump 42 and stops the first radiator side water pump 42a.

The control device 70 fully opens the second radiator side flow rate regulation valve 54 and closes the second heater core side open-close valve 55. The control device 70 operates the second heat exchanger side water pump 52 and the compressor 11. Therefore, the temperature adjusting device 1 in the second battery cooling mode is operated in the same manner as in the second battery cooling mode of the eighth embodiment.

(c) Heating-Cooling Mode

In the heating-cooling mode, the control device 70 opens the first battery side open-close valve 45a, opens the first bypass passage side open-close valve 45b, opens the first chiller side open-close valve 45c, and closes the first radiator side open-close valve 45d. The control device 70 operates the first battery side water pump 42 and the first radiator side water pump 42a. In this case, the control device 70 sets the pumping capacity of the first battery side water pump 42 to be higher than the pumping capacity of the first radiator side water pump 42a.

The control device 70 adjusts the opening degree of the second radiator side flow rate regulation valve 54 and opens the second heater core side open-close valve 55 in the same manner as in the heating-cooling mode of the eighth embodiment. The control device 70 operates the second heat exchanger side water pump 52 and the compressor 11. Therefore, the temperature adjusting device 1 in the heating-cooling mode of the present embodiment is operated in the same manner as in the heating-cooling mode of the eighth embodiment.

As described above, the temperature adjusting device 1 of the present embodiment is operated in the same manner as in the eighth embodiment, and the same effect as in the eighth embodiment can be achieved. In the present embodiment, even if the operation modes are switched, the flowing direction of the first heat medium flowing through the coolant passage 80a of the battery 80 does not change. Therefore, it is possible to restrict the fluctuation in the cooling performance of the battery 80 due to the change in the flowing direction of the first heat medium.

Fourteenth Embodiment

Figure 15:
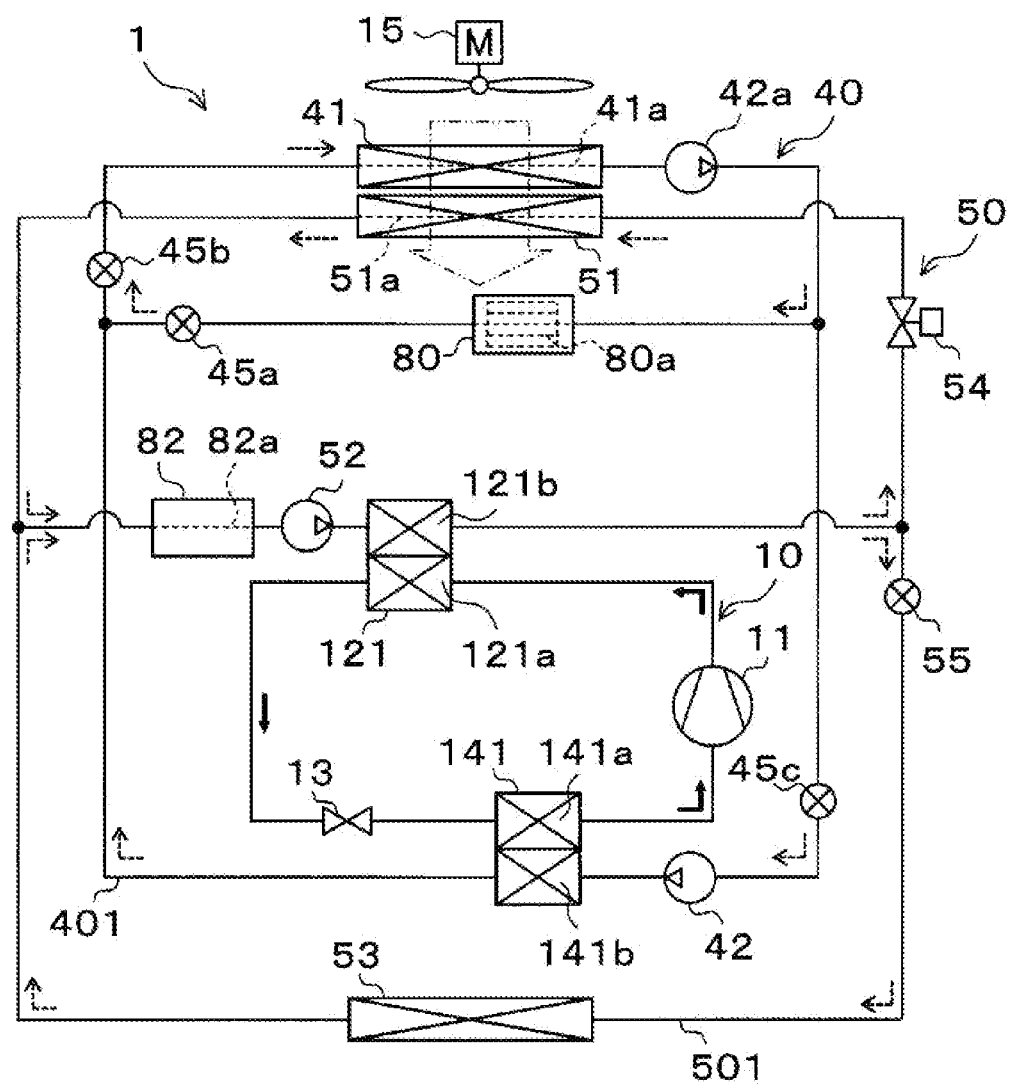
FIG. 15 is an overall configuration diagram of a temperature adjusting device of a fourteenth embodiment.

In the present embodiment, as illustrated in FIG. 15, a description will be made of an example in which the configuration of the second heat medium circuit 50 is changed and an outside-air-side target-object heat exchanger is added compared with the fourth embodiment. In the same manner as the ninth embodiment, the coolant passage 82a of the vehicle-mounted device 82 that is an outside-air-side target-object heat exchanger is connected to the second heat medium circuit 50 of the present embodiment.

The first heat medium circuit 40 of the present embodiment has a first radiator side water pump 42a. The first radiator side water pump 42a pumps the first heat medium flowing out of the first heat medium passage 41a of the first radiator 41 to the coolant passage 80a side of the battery 80 or the intake port side of the first battery side water pump 42. Remaining configurations are the same as those in the eighth embodiment.

Next, an operation of the temperature adjusting device 1 of the present embodiment having the above configuration will be described. A fundamental operation of the temperature adjusting device 1 of the present embodiment is the same as that in the fourth embodiment. In the same manner as in the fourth embodiment, the battery 80 can be efficiently and reliably cooled without consuming unnecessary energy in the refrigeration cycle device 10, and thus it is possible to restrict an increase in the temperature of the battery 80.

The air ventilation air can be heated in the heater core 53 to heat the vehicle compartment. Since the first battery side open-close valve 45a, the first bypass passage side open-close valve 45b, and the first chiller side open-close valve 45c, which is a switching unit, are provided, the first radiator 41 can be effectively used as a heat radiation heat exchanger or a heat-absorbing heat exchanger in the same manner as in the eighth embodiment.

In addition thereto, in the second battery cooling mode and the heating-cooling mode, the second heat medium flowing out of the second heat medium passage 51a of the second radiator 51 can be made to flow into the coolant passage 82a of the vehicle-mounted device 82. The temperature of the second heat medium flowing out of the second heat medium passage 51a is about the same as that of the outside air that has passed through the first radiator 41. Consequently, the vehicle-mounted device 82 can be cooled to restrict an increase in the temperature of the vehicle-mounted device 82.

Fifteenth Embodiment

Figure 16:
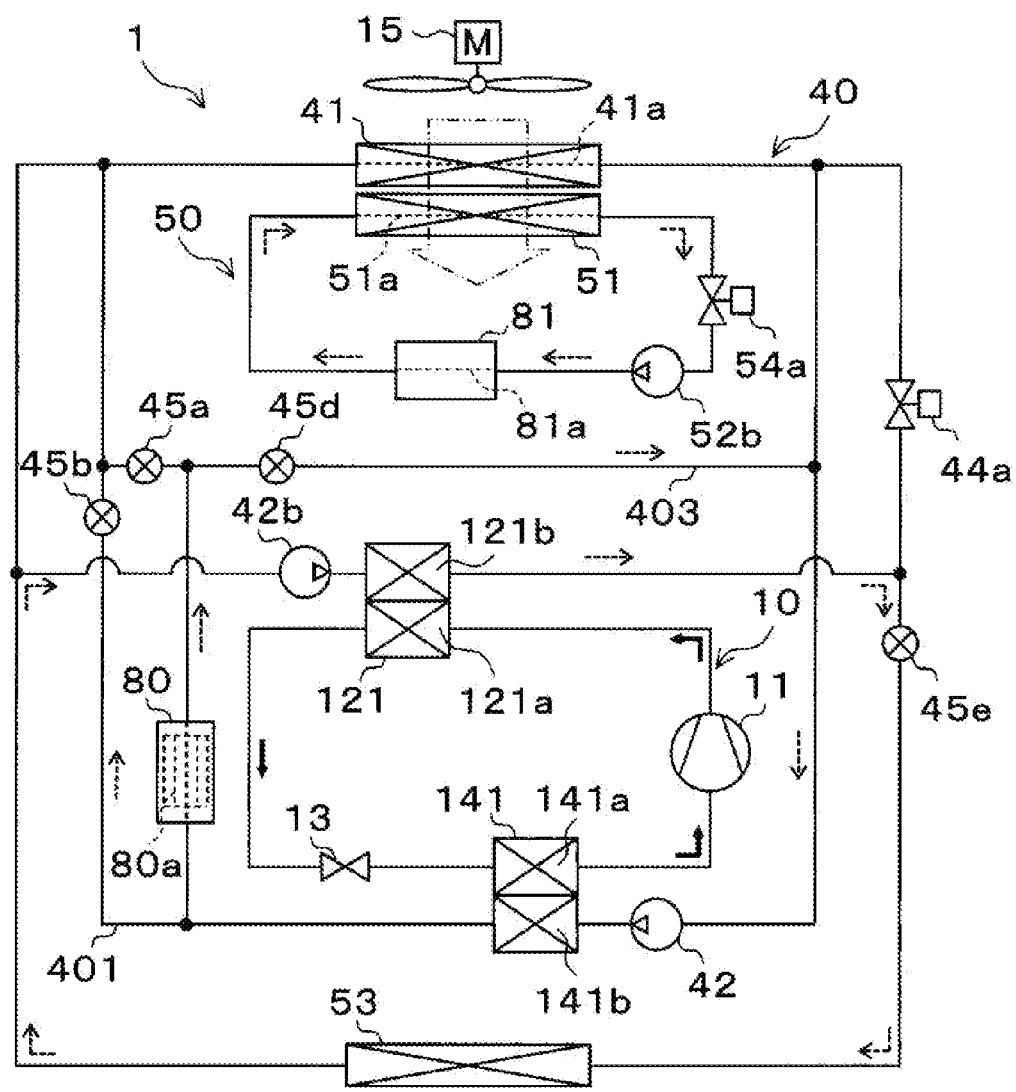
FIG. 16 is an overall configuration diagram of a temperature adjusting device of a fifteenth embodiment.

In the present embodiment, as illustrated in FIG. 16, a description will be made of an example in which the configurations of the first heat medium circuit 40 and the second heat medium circuit 50 are changed compared with the tenth embodiment.

Specifically, the first heat medium circuit 40 of the present embodiment has a first heat exchanger side water pump 42b that pumps the first heat medium to the heat medium passage 121b of the water-refrigerant heat exchanger 121. A fundamental configuration of the first heat exchanger side water pump 42b is the same as that of the first battery side water pump 42. A branch portion that branches a flow of the first heat medium flowing out of the heat medium passage 121b is connected to the outlet side of the heat medium passage 121b.

One gateway side of the first heat medium passage 41a of the first radiator 41 is connected to one outflow port of the branch portion. The intake port side of the first heat exchanger side water pump 42b is connected to the other gateway of the first radiator side flow rate regulation valve 44a. The heat medium inlet side of the heater core 53 is connected to the other outflow port of the branch portion. The intake port side of the first heat exchanger side water pump 42b is connected to the heat medium outlet of the heater core 53.

The first radiator side flow rate regulation valve 44a is disposed in a heat medium passage from the branch portion to one of the gateways of the first heat medium passage 41a.

The first radiator side flow rate regulation valve 44a adjusts a flow rate of the first heat medium flowing into the first heat medium passage 41a of the first radiator 41. A fundamental configuration of the first radiator side flow rate regulation valve 44a is same as that of the first vehicle-mounted device side flow rate regulation valve 44, the second radiator side flow rate regulation valve 54, or the like.

A first heater core side open-close valve 45e is disposed in a heat medium passage from the branch portion to the heater core 53. The first heater core side open-close valve 45e is an electromagnetic valve that opens and closes the heat medium passage from the branch portion to the heater core 53. A fundamental configuration of the first heater core side open-close valve 45e is the same as that of the first battery side open-close valve 45a or the like.

In the present embodiment, the first battery side open-close valve 45a, the first bypass passage side open-close valve 45b, the first radiator side open-close valve 45d, the first heater core side open-close valve 45e, and the first radiator side flow rate regulation valve 44a are a switching unit that switches circuit configurations of the first heat medium circuit 40.

The switching unit of the present embodiment can perform switching to a circuit configuration in which the first heat medium flowing out of the heat medium passage 141b of the chiller 141 flows into the first heat medium passage 41a of the first radiator 41 through the coolant passage 80a of the battery 80. It is possible to switch a circuit configuration in which the first heat medium flowing out of the heat medium passage 141b bypasses the coolant passage 80a and flows into the first heat medium passage 41a.

The switching unit can perform switching to a circuit configuration in which the first heat medium flowing out of the coolant passage 80a of the battery 80 flows into the heat medium passage 141b of the chiller 141 through the first heat medium passage 41a of the first radiator 41. It is possible to switch a circuit configuration in which the first heat medium flowing out of the coolant passage 80a bypasses the first heat medium passage 41a and flows into the heat medium passage 141b.

The second heat medium circuit 50 of the present embodiment circulates the second heat medium between the second heat medium passage 51a of the second radiator 51 and the coolant passage 81a of the vehicle-mounted device 81. The second heat medium circuit 50 has a second radiator side water pump 52b and a second vehicle-mounted device side flow rate regulation valve 54a.

The second radiator side water pump 52b pumps the second heat medium to the coolant passage 81a. A fundamental configuration of the second radiator side water pump 52b is the same as that of the second heat exchanger side water pump 52 or the like. The second vehicle-mounted device side flow rate regulation valve 54a regulates a circulation flow rate of the second heat medium circulated in the second heat medium circuit 50. A fundamental configuration of the second vehicle-mounted device side flow rate regulation valve 54a is same as that of the second radiator side flow rate regulation valve 54 or the like. Remaining configurations are the same as those in the tenth embodiment.

Thus, the coolant passage 80a of the battery 80 is an evaporation-side target-object heat exchanger that causes the first heat medium to flow and to exchange heat with the battery 80. The coolant passage 81a of the vehicle-mounted device 81 is an outside-air-side target-object heat exchanger that causes the second heat medium to flow and to exchange heat with the vehicle-mounted device 81.

Next, an operation of the temperature adjusting device 1 of the present embodiment having the above configuration will be described. In the present embodiment, the control device 70 switches various operation modes such that the battery temperature TB is maintained within an appropriate temperature range, the vehicle-mounted device temperature TM is maintained within an appropriate temperature range, and heating of the vehicle compartment can be realized as needed. Each operation mode will be described below.

(a) First Battery Cooling Mode

The first battery cooling mode is executed when the battery temperature TB is equal to or higher than the first reference temperature KTB1 and the vehicle interior temperature Tr is higher than the set temperature.

In the first battery cooling mode, the control device 70 opens the first battery side open-close valve 45*a*, closes the first bypass passage side open-close valve 45*b*, and closes the first radiator side open-close valve 45*d*. The control device 70 operates the external blower 15 and the first battery side water pump 42. The control device 70 brings the first radiator side flow rate regulation valve 44*a* into a fully closed state. The control device 70 stops the first heat exchanger side water pump 42*b*. The control device 70 stops the compressor 11.

Therefore, in the first heat medium circuit 40, the first heat medium pumped from the first battery side water pump 42 is circulated in an order of the heat medium passage 141*b* of the chiller 141, the coolant passage 80*a* of the battery 80, the first heat medium passage 41*a* of the first radiator 41, and the intake side of the first battery side water pump 42.

Consequently, the exhaust heat of the battery 80 absorbed by the first heat medium when the first heat medium flows through the coolant passage 80*a* of the battery 80 can be radiated to the outside air blown from the external blower 15 in the first radiator 41.

In the refrigeration cycle device 10, since the compressor 11 is stopped, the refrigerant is not circulated. Thus, the first heat medium is not cooled by the heat thereof being absorbed by the refrigerant in the chiller 141.

Therefore, in the first battery cooling mode, it is possible to cool the battery 80 and thus to restrict an increase in the temperature of the battery 80.

(b) Second Battery Cooling Mode

The second battery cooling mode is executed when the battery temperature TB is equal to or higher than the second reference temperature KTB2 and the vehicle interior temperature Tr is higher than the set temperature.

In the second battery cooling mode, the control device 70 closes the first battery side open-close valve 45*a*, closes the first bypass passage side open-close valve 45*b*, and opens the first radiator side open-close valve 45*d*. The control device 70 operates the external blower 15 and the first battery side water pump 42. The control device 70 brings the first radiator side flow rate regulation valve 44*a* in a fully opened state and closes the first heater core side open-close valve 45*e*. The first heat exchanger side water pump 42*b* is operated. The control device 70 operates the compressor 11.

Therefore, in the first heat medium circuit 40, the first heat medium pumped from the first battery side water pump 42 is circulated in an order of the heat medium passage 141*b* of the chiller 141, the coolant passage 80*a* of the battery 80, and the intake side of the first battery side water pump 42.

The first heat medium pumped from the first heat exchanger side water pump 42*b* is circulated in an order of the heat medium passage 121*b* of the water-refrigerant heat exchanger 121, the first heat medium passage 41*a* of the first radiator 41, and the intake side of the first battery side water pump 42.

Consequently, the exhaust heat of the battery 80 absorbed by the first heat medium when the first heat medium flows through the coolant passage 80*a* of the battery 80 can be absorbed in the refrigerant in the chiller 141. The heat absorbed by the first heat medium from the high-pressure refrigerant in the water-refrigerant heat exchanger 121 can be radiated to the outside air in the first radiator 41.

In the refrigeration cycle device 10, the refrigerant discharged from the compressor 11 is circulated in an order of the refrigerant passage 121*a* of the water-refrigerant heat exchanger 121, the expansion valve 13, the refrigerant passage 141*a* of the chiller 141, and the intake side of the compressor 11. Consequently, in the refrigeration cycle device 10, the heat absorbed by the refrigerant from the first heat medium in the chiller 141 can be radiated to the first heat medium in the water-refrigerant heat exchanger 121.

Therefore, in the second battery cooling mode, the exhaust heat of the battery 80 absorbed by the first heat medium can be radiated to the outside air via the refrigeration cycle device 10. In the second battery cooling mode, since the first heat medium cooled in the heat medium passage 141*b* of the chiller 141 flows into the coolant passage 80*a* of the battery 80, the battery 80 can be cooled with a higher cooling capacity than in the first battery cooling mode.

(c) Heating-Cooling Mode

The heating-cooling mode is executed when the battery temperature TB is equal to or higher than the first reference temperature KTB1 and the vehicle interior temperature Tr is lower than the set temperature.

In the heating-cooling mode, the control device 70 closes the first battery side open-close valve 45*a*, closes the first bypass passage side open-close valve 45*b*, and opens the first radiator side open-close valve 45*d*. The control device 70 operates the external blower 15 and the first battery side water pump 42.

The control device 70 adjusts the opening degree of the first radiator side flow rate regulation valve 44*a* and opens the first heater core side open-close valve 45*e*. The opening degree of the first radiator side flow rate regulation valve 44*a* is adjusted such that the vehicle interior temperature Tr comes close to the set temperature. The first heat exchanger side water pump 42*b* is operated. The control device 70 operates the compressor 11.

Therefore, in the first heat medium circuit 40, the first heat medium pumped from the first battery side water pump 42 is circulated in an order of the heat medium passage 141*b* of the chiller 141, the coolant passage 80*a* of the battery 80, and the intake side of the first battery side water pump 42 in the same manner as in the second battery cooling mode.

The first heat medium pumped from the first heat exchanger side water pump 42*b* is circulated in an order of the heat medium passage 121*b* of the water-refrigerant heat exchanger 121, the first heat medium passage 41*a* of the first radiator 41, and the intake side of the first battery side water pump 42. The first heat medium is also circulated in an order of the heat medium passage 121*b* of the water-refrigerant heat exchanger 121, the heater core 53, and the intake side of the first battery side water pump 42.

Consequently, the exhaust heat of the battery 80 absorbed by the first heat medium when the first heat medium flows through the coolant passage 80*a* of the battery 80 can be absorbed by the refrigerant in the chiller 141. The heat absorbed by the first heat medium from the high-pressure refrigerant in the water-refrigerant heat exchanger 121 can be radiated to the outside air in the first radiator 41 and also radiated to the ventilation air blown from the internal blower in the heater core 53 to heat the ventilation air.

In the refrigeration cycle device 10, the refrigerant is circulated in the same manner as in the second battery cooling mode. Consequently, in the refrigeration cycle device 10, the heat absorbed by the refrigerant from the first heat medium in the chiller 141 can be radiated to the first heat medium in the water-refrigerant heat exchanger 121.

Therefore, in the heating-cooling mode, the exhaust heat of the battery 80 absorbed by the first heat medium can be radiated to the outside air and the ventilation air via the refrigeration cycle device 10. In the same manner as in the second battery cooling mode, the battery 80 can be cooled with a higher cooling capacity than in the first battery cooling mode.

(d) Heating Operation Mode

The heating operation mode is executed when the battery temperature TB is lower than the first reference temperature KTB1 and the vehicle interior temperature Tr is lower than the set temperature.

In the heating operation mode, the control device 70 closes the first battery side open-close valve 45a, opens the first bypass passage side open-close valve 45b, and closes the first radiator side open-close valve 45d. The control device 70 operates the external blower 15 and the first battery side water pump 42. The control device 70 brings the first radiator side flow rate regulation valve 44a into a fully closed state and opens the first heater core side open-close valve 45e. The first heat exchanger side water pump 42b is operated. The control device 70 operates the compressor 11.

Therefore, in the first heat medium circuit 40, the first heat medium pumped from the first battery side water pump 42 is circulated in an order of the heat medium passage 141b of the chiller 141, the first heat medium passage 41a of the first radiator 41, and the intake side of the first battery side water pump 42.

The first heat medium pumped from the first heat exchanger side water pump 42b is circulated in an order of the heat medium passage 121b of the water-refrigerant heat exchanger 121, the first heat medium passage 41a of the first radiator 41, and the intake side of the first battery side water pump 42.

Consequently, the heat absorbed by the first heat medium from the outside air in the first radiator 41 can be absorbed by the refrigerant in the chiller 141. The heat absorbed by the first heat medium from the high-pressure refrigerant in the water-refrigerant heat exchanger 121 can be radiated to the ventilation air blown from the internal blower in the heater core 53 to heat the ventilation air.

In the refrigeration cycle device 10, the refrigerant is circulated in the same manner as in the second battery cooling mode. Consequently, in the refrigeration cycle device 10, the heat absorbed by the refrigerant from the first heat medium in the chiller 141 can be radiated to the first heat medium in the water-refrigerant heat exchanger 121.

Therefore, in the heating-cooling mode, the heat absorbed by the first heat medium from the outside air can be radiated to the ventilation air via the refrigeration cycle device 10.

In the temperature adjusting device 1 of the present embodiment, in the same manner as in the seventh embodiment, the control device 70 controls an operation of the control target device such that the vehicle-mounted device temperature TM is maintained within an appropriate temperature range.

Specifically, when the vehicle-mounted device temperature TM is lower than the predetermined reference temperature KTM, the control device 70 stops the second radiator side water pump 52b and brings the second vehicle-mounted device side flow rate regulation valve 54a into a fully closed state. Thus, the second heat medium flowing out of the second heat medium passage 51a of the second radiator 51 does not flow into the coolant passage 81a of the vehicle-mounted device 81.

When the vehicle-mounted device temperature TM is equal to or higher than the reference temperature KTM, the control device 70 operates the second radiator side water pump 52b and adjusts the valve opening degree of the second vehicle-mounted device side flow rate regulation valve 54a. In this case, the valve opening degree of the second vehicle-mounted device side flow rate regulation valve 54a is adjusted such that the vehicle-mounted device temperature TM is maintained within an appropriate temperature range.

Therefore, in any operation mode, when the vehicle-mounted device temperature TM is equal to or higher than the reference temperature KTM, the second heat medium cooled in the second heat medium passage 51a of the second radiator 51 is sucked into the second radiator side water pump 52b. The first heat medium pumped from the second radiator side water pump 52b flows into the coolant passage 81a of the vehicle-mounted device 81.

The first heat medium that has flowed into the coolant passage 81a of the vehicle-mounted device 81 absorbs heat from the vehicle-mounted device 81. Consequently, the vehicle-mounted device 81 is cooled. The second heat medium flowing out of the coolant passage 81a flows into the second heat medium passage 51a of the second radiator 51. The second heat medium that has flowed into the second heat medium passage 51a exchanges heat with the outside air that has passed through the first radiator 41. Consequently, the temperature of the second heat medium comes close to the temperature of the outside air that has passed through the first radiator 41.

As described above, in the temperature adjusting device 1 of the present embodiment, the first battery cooling mode and the second battery cooling mode can be switched. Therefore, in the same manner as in the second embodiment or the like, the battery 80 can be efficiently and reliably cooled without consuming unnecessary energy in the refrigeration cycle device 10, and thus it is possible to restrict an increase in the temperature of the battery 80.

Since the second heat medium circuit 50 having the second radiator 51 is provided, the exhaust heat of the vehicle-mounted device 81 can be radiated to the outside air via the second heat medium. Thus, even if the compressor 11 is stopped and the refrigeration cycle device 10 does not exhibit the cooling capacity thereof, it is possible to cool the vehicle-mounted device 81 and thus to restrict an increase in the temperature of the vehicle-mounted device 81.

In the first radiator 41 of the present embodiment, the outside air exchanges heat with the first heat medium flowing out of one of the coolant passage 80a of the battery 80, the heat medium passage 121b of the water-refrigerant heat exchanger 121, and the heat medium passage 141b of the chiller 141. Therefore, the exhaust heat of the battery 80 can be radiated to the outside air via the first heat medium, or the outside air can be used as a heat absorption source or a heat radiation destination of the refrigerant according to an operation state of the refrigeration cycle device 10.

In this case, the first radiator 41 exchanges heat between the first heat medium and the outside air before heat exchange in the second radiator 51. Therefore, in the first radiator 41, the exhaust heat of the battery 80 can be stably radiated to the outside air, or the outside air can be stably used as a heat absorption source or a heat radiation destination of the refrigerant, without being affected by a heat exchange amount exchanged between the second heat medium and the outside air in the second radiator 51.

As a result, the battery 80 or the vehicle-mounted device 81 can be efficiently cooled without causing inefficient energy consumption in the refrigeration cycle device 10.

In the present embodiment, the first battery side open-close valve 45a, the first bypass passage side open-close valve 45b, the first radiator side open-close valve 45d, the first heater core side open-close valve 45e, and the first radiator side flow rate regulation valve 44a used as a switching unit are provided. Consequently, heat medium circuits can be easily switched. That is, the first battery cooling mode, the second battery cooling mode, the heating-cooling mode, and the independent cooling mode can be easily switched.

Sixteenth Embodiment

Meanwhile, in the temperature adjusting device 1 that cools or heats the ventilation air as in the eleventh embodiment, it is desirable to efficiently operate the refrigeration cycle device 10 both when cooling and heating the ventilation air.

However, an operation point of the refrigeration cycle device 10 during the cooling operation mode in which the ventilation air is cooled is different from an operation point of the refrigeration cycle device 10 during the heating operation mode in which the ventilation air is heated. Therefore, it is difficult for the refrigeration cycle device 10 to exhibit high operation efficiency in either operation mode.

Therefore, in the present embodiment, a description will be made of the temperature adjusting device 1 capable of efficiently adjusting the temperature of the ventilation air in both the cooling operation mode and the heating operation mode. In the present embodiment, as illustrated in FIGS. 17 to 20, the configuration of the first heat medium circuit 40 is changed compared with the eleventh embodiment.

Specifically, in the present embodiment, a pumping direction of the first heat medium in the first radiator side water pump 42a of the first heat medium circuit 40 is different from that in the eleventh embodiment. That is, the first radiator side water pump 42a of the present embodiment sucks and pumps the first heat medium flowing out of the coolant passage 81a of the vehicle-mounted device 81.

In the present embodiment, so-called tank-and-tube type heat exchangers are employed as the first radiator 41 and the second radiator 51. Fundamental configurations of the first radiator 41 and the second radiator 51 are the same. The tank-and-tube type heat exchanger has multiple heat medium tubes and a pair of heat medium tanks.

The heat medium tube is a tube through which a heat medium flows and which forms a first heat medium passage 41a. In the present embodiment, a flat tube having a flat cross section is used as the heat medium tube. The multiple heat medium tubes extend vertically.

The multiple heat medium tubes are stacked and arranged in the horizontal direction at regular intervals such that flat surfaces are different from each other and parallel to each other. Consequently, an outside air passage through which the outside air blown from the external blower 15 flows is provided between the heat medium tubes adjacent to each other. A heat exchanging fin (not illustrated) that promotes heat exchange between the heat medium and the outside air is disposed in the outside air passage.

A pair of heat medium tanks form a space for distributing a heat medium to multiple heat medium tubes and a space for collecting the heat media flowing out of the multiple heat medium tubes. The pair of heat medium tanks are connected to both end portions of the multiple heat medium tubes. Therefore, in the first radiator 41 and the second radiator 51 of the present embodiment, each of the first heat medium and the second heat medium flows from the lower side to the upper side or from the upper side to the lower side.

Remaining configurations are the same as those in the eleventh embodiment. In the present embodiment, the vehicle-mounted device 81 is an outside-air-side target object, and the coolant passage 81a of the vehicle-mounted device 81 is an outside-air-side target-object heat exchanger. The battery 80 is an evaporation-side target object, and the coolant passage 80a of the battery 80 is an evaporation-side target-object heat exchanger.

The first battery side open-close valve 45a, the first bypass passage side open-close valve 45b, and the first radiator side open-close valve 45d are a first switching unit. The second heater core side open-close valve 55 and the second radiator side flow rate regulation valve 54 are a second switching unit.

Next, an operation of the temperature adjusting device 1 of the present embodiment having the above configuration will be described. A fundamental operation of the temperature adjusting device 1 of the present embodiment is the same as that in the eleventh embodiment. Therefore, in the present embodiment, a cooling operation mode, a heating operation mode, a battery device cooling mode, and a battery priority cooling mode will be described.

(a) Cooling Operation Mode

In the cooling operation mode, the control device 70 closes the first battery side open-close valve 45a, closes the first bypass passage side open-close valve 45b, and closes the first radiator side open-close valve 45d. The control device 70 stops the first battery side water pump 42, operates the first radiator side water pump 42a, and brings the first vehicle-mounted device side flow rate regulation valve 44 into an open state.

The control device 70 closes the second heater core side open-close valve 55. The control device 70 operates the second heat exchanger side water pump 52 and brings the second radiator side flow rate regulation valve 54 into an open state. The control device 70 operates the compressor 11 while bringing the evaporator side expansion valve 13b into a throttle state.

Figure 17:
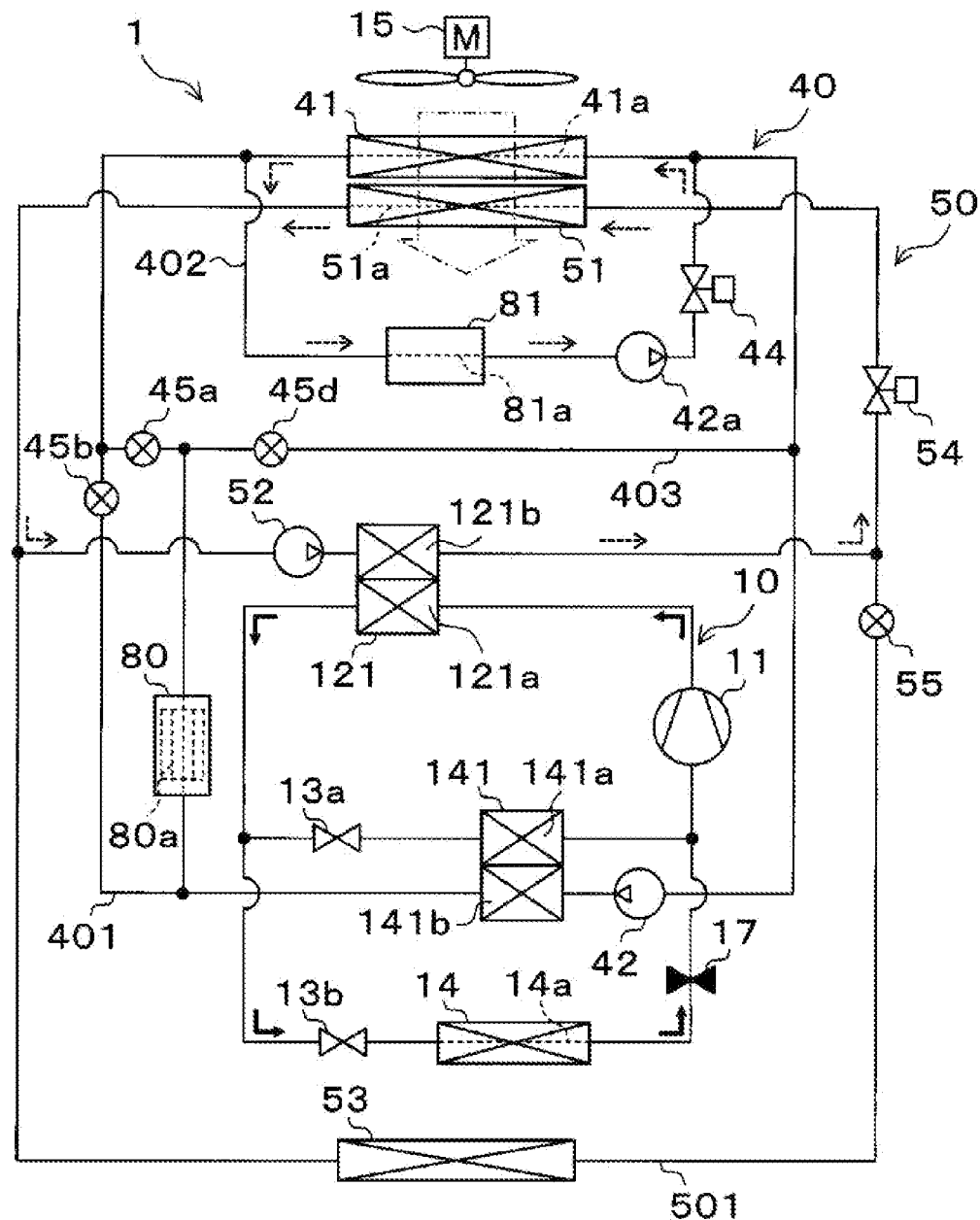
FIG. 17 is an overall configuration diagram of a temperature adjusting device during a cooling operation mode in a sixteenth embodiment.

Therefore, as illustrated in FIG. 17, in the first heat medium circuit 40 in the cooling operation mode, the first heat medium pumped from the first radiator side water pump 42a is circulated in an order of the first heat medium passage 41a of the first radiator 41, the coolant passage 81a of the vehicle-mounted device 81, and the intake side of the first radiator side water pump 42a.

Consequently, in the first heat medium circuit 40, the exhaust heat of the vehicle-mounted device 81 absorbed by the first heat medium can be radiated to the outside air blown from the external blower 15 in the first radiator 41. In this case, in the first heat medium passage 41a of the first radiator 41, the first heat medium flows from the upper side to the lower side.

In the second heat medium circuit 50, the second heat medium pumped from the second heat exchanger side water pump 52 is circulated in an order of the heat medium passage 121b of the water-refrigerant heat exchanger 121, the second heat medium passage 51a of the second radiator 51, and the intake side of the second heat exchanger side water pump 52.

Consequently, in the second heat medium circuit 50, the heat of the high-pressure refrigerant absorbed by the second heat medium in the water-refrigerant heat exchanger 121 can be radiated to the outside air that has passed through the first radiator 41 in the second radiator 51.

In this case, in the second heat medium passage 51a of the second radiator 51, the second heat medium flows from the upper side to the lower side. That is, a flowing direction of the first heat medium flowing through the first heat medium passage 41a of the first radiator 41 is the same as a flowing direction of the second heat medium flowing through the second heat medium passage 51a of the second radiator 51.

In the refrigeration cycle device 10, the high-pressure refrigerant discharged from the compressor 11 is circulated in an order of the refrigerant passage 121a of the water-refrigerant heat exchanger 121, the evaporator side expansion valve 13b, the internal evaporator 14, and the intake side of the compressor 11. Consequently, in the refrigeration cycle device 10, the heat absorbed by the refrigerant from the ventilation air in the internal evaporator 14 can be radiated to the second heat medium in the water-refrigerant heat exchanger 121.

Therefore, in the cooling operation mode, the ventilation air can be cooled in the internal evaporator 14 to cool the vehicle compartment. The vehicle-mounted device 81 can be cooled without being affected by an operation state of the refrigeration cycle device 10.

(b) Heating Operation Mode

In the heating operation mode, the control device 70 closes the first battery side open-close valve 45a, opens the first bypass passage side open-close valve 45b, and closes the first radiator side open-close valve 45d. The control device 70 operates the first battery side water pump 42, operates the first radiator side water pump 42a, and brings the first vehicle-mounted device side flow rate regulation valve 44 into an open state.

The control device 70 opens the second heater core side open-close valve 55. The control device 70 operates the second heat exchanger side water pump 52 and brings the second radiator side flow rate regulation valve 54 into a fully closed state. The control device 70 operates the compressor 11 while bringing at least the chiller side expansion valve 13a into a throttle state.

Figure 18:
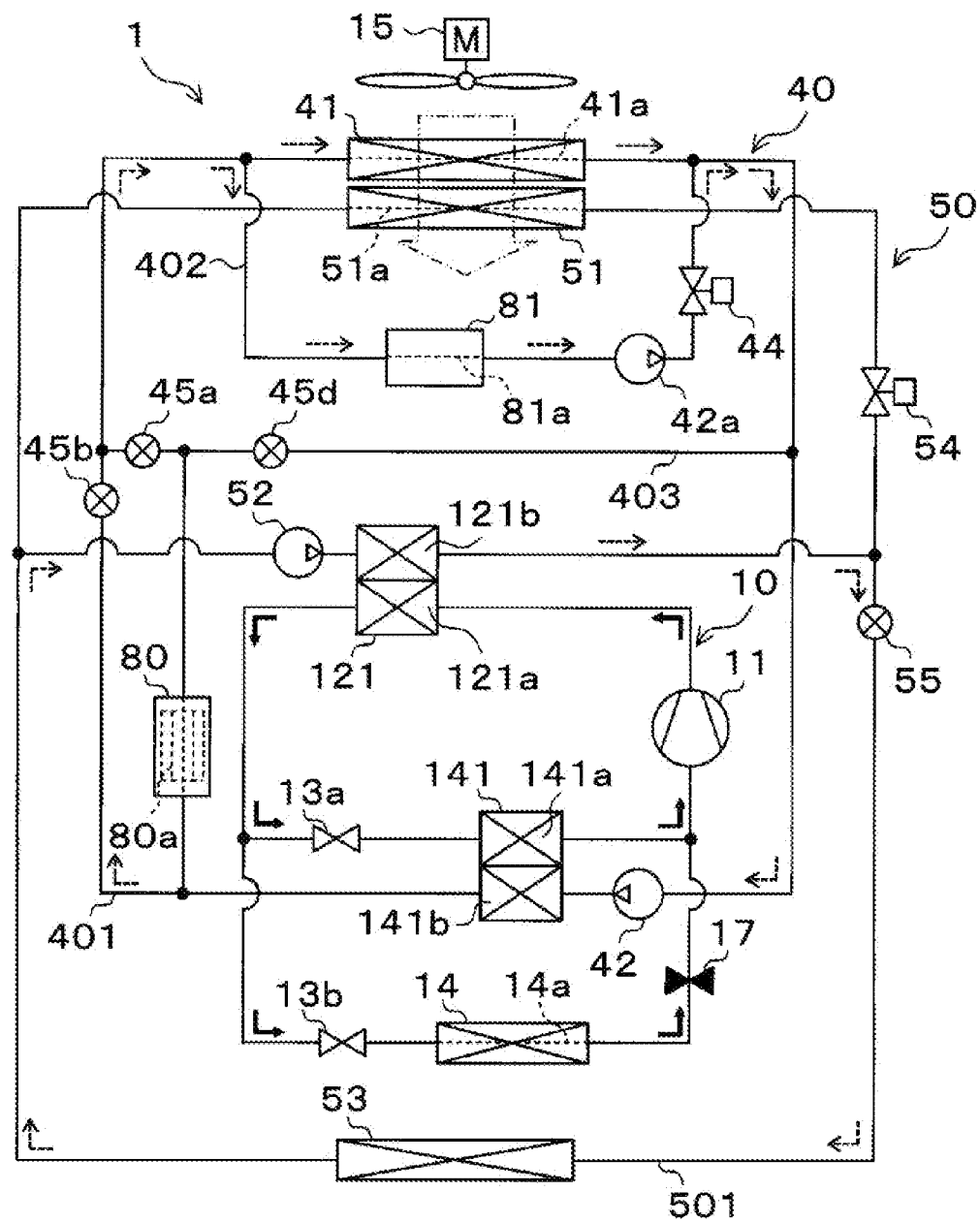
FIG. 18 is an overall configuration diagram of the temperature adjusting device during a heating operation mode in the sixteenth embodiment.

Therefore, as illustrated in FIG. 18, in the first heat medium circuit 40 in the heating operation mode, the first heat medium pumped from the first battery side water pump 42 is circulated in an order of the heat medium passage 141b of the chiller 141, the first heat medium passage 41a of the first radiator 41, and the intake side of the first battery side water pump 42. The heat medium is also circulated in an order of the heat medium passage 141b of the chiller 141, the coolant passage 81a of the vehicle-mounted device 81, and the intake side of the first battery side water pump 42.

That is, the first heat medium passage 41a of the first radiator 41 and the coolant passage 81a of the vehicle-mounted device 81 are connected in parallel to each other with respect to the flow of the first heat medium flowing out of the heat medium passage 141b of the chiller 141.

Consequently, in the first heat medium circuit 40, a part of the first heat medium cooled in the heat medium passage 141b of the chiller 141 flows into the coolant passage 81a and absorbs the exhaust heat of the vehicle-mounted device 81. Consequently, the vehicle-mounted device 81 is cooled. The residual first heat medium absorbs heat from the outside air in the first radiator 41. The heat absorbed by the first heat medium from the vehicle-mounted device 81 and the outside air can be absorbed by the low-pressure refrigerant in the chiller 141.

In this case, in the first heat medium passage 41a of the first radiator 41, the first heat medium flows from the lower side to the upper side. That is, a flowing direction of the first heat medium flowing through the first heat medium passage 41a of the first radiator 41 during the cooling operation mode is different from a flowing direction of the first heat medium flowing through the first heat medium passage 41a of the first radiator 41 during the heating operation mode.

A flowing direction of the first heat medium flowing through the coolant passage 81a of the vehicle-mounted device 81 of the first radiator 41 during the cooling operation mode is the same as a flowing direction of the first heat medium flowing through the coolant passage 81a during the heating operation mode.

In the second heat medium circuit 50, the second heat medium pumped from the second heat exchanger side water pump 52 is circulated in an order of the heat medium passage 121b of the water-refrigerant heat exchanger 121, the heater core 53, and the intake side of the second heat exchanger side water pump 52. Consequently, in the second heat medium circuit 50, the heat of the high-pressure refrigerant absorbed by the second heat medium in the water-refrigerant heat exchanger 121 can be radiated to the ventilation air in the heater core 53.

In the refrigeration cycle device 10, the high-pressure refrigerant discharged from the compressor 11 is circulated in an order of at least the refrigerant passage 121a of the water-refrigerant heat exchanger 121, the chiller side expansion valve 13a, the refrigerant passage 141a of the chiller 141, and the intake side of the compressor 11. Consequently, in the refrigeration cycle device 10, at least the heat absorbed by the refrigerant from the first heat medium in the chiller 141 can be radiated to the second heat medium in the water-refrigerant heat exchanger 121.

Therefore, in the heating operation mode, the ventilation air can be heated in the heater core 53 to heat the vehicle compartment. During the heating operation mode, as illustrated in FIG. 18, the low-pressure refrigerant may flow into the internal evaporator 14 while bringing the evaporator side expansion valve 13b into a throttle state. Thus, the vehicle compartment can be dehumidified and heated.

(c) Battery Device Cooling Mode

The battery device cooling mode is an operation mode in which both the battery 80 and the vehicle-mounted device 81 are cooled.

In the battery device cooling mode, the control device 70 opens the first battery side open-close valve 45a, closes the first bypass passage side open-close valve 45b, and closes the first radiator side open-close valve 45d. The control device 70 operates the first battery side water pump 42, operates the first radiator side water pump 42a, and brings the first vehicle-mounted device side flow rate regulation valve 44 into an open state.

The control device 70 closes the second heater core side open-close valve 55. The control device 70 operates the second heat exchanger side water pump 52 and brings the second radiator side flow rate regulation valve 54 into an open state. The control device 70 operates the compressor 11 while bringing at least the chiller side expansion valve 13a into a throttle state.

Figure 19:
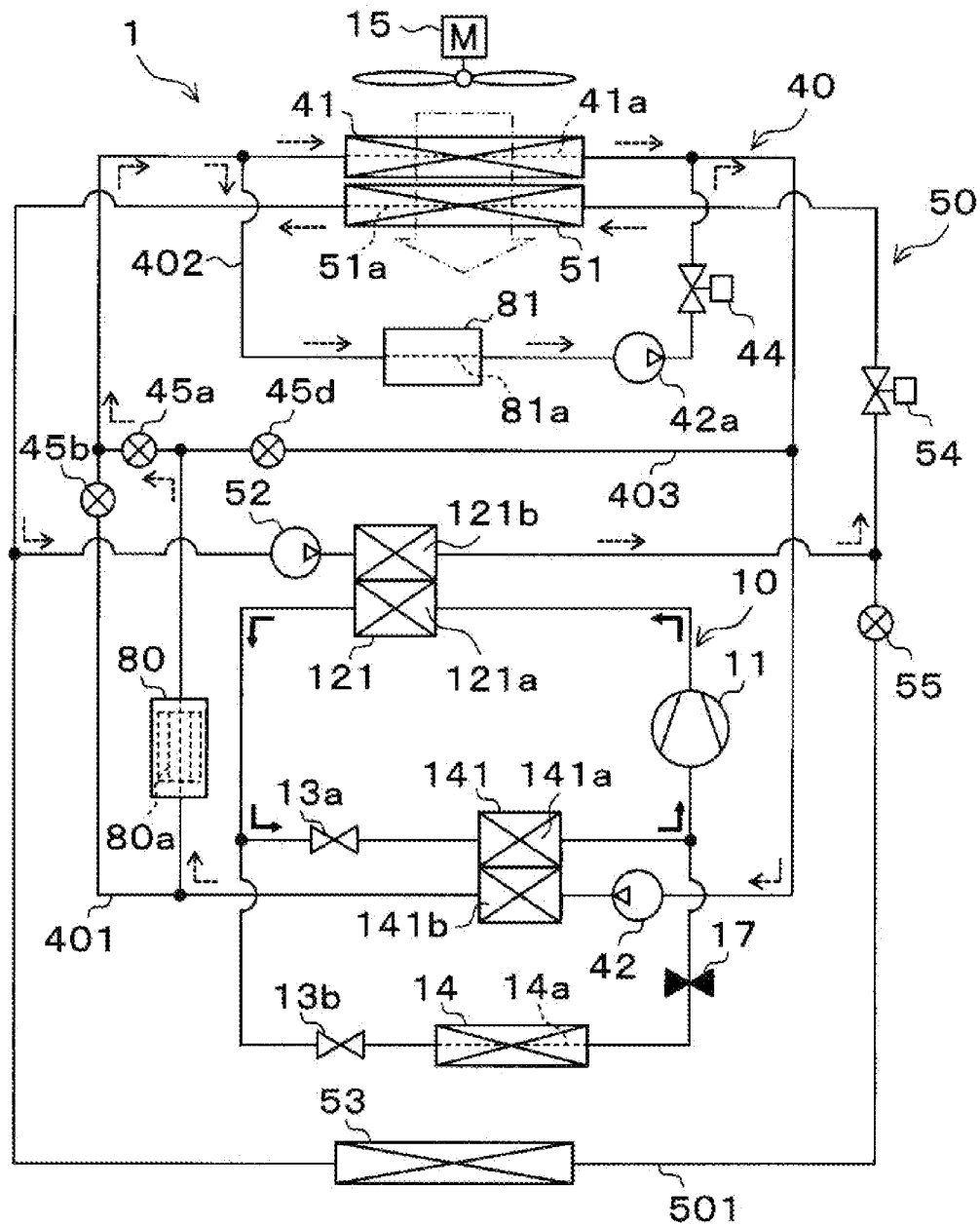
FIG. 19 is an overall configuration diagram of the temperature adjusting device during a battery device cooling mode in the sixteenth embodiment.

Therefore, as illustrated in FIG. 19, in the first heat medium circuit 40 in the battery device cooling mode, the first heat medium pumped from the first battery side water pump 42 is circulated in an order of the heat medium passage 141b of the chiller 141, the coolant passage 80a of the battery 80, the first heat medium passage 41a of the first radiator 41, and the intake side of the first battery side water pump 42. The first heat medium is also circulated in an order of the heat medium passage 141b of the chiller 141, the coolant passage 80a of the battery 80, the coolant passage 81a of the vehicle-mounted device 81, and the intake side of the first battery side water pump 42.

That is, the coolant passage 80a of the battery 80 and the coolant passage 81a of the vehicle-mounted device 81 are connected in series to each other with respect to the flow of the first heat medium.

Consequently, in the first heat medium circuit 40, the first heat medium pumped from the first battery side water pump 42 flows into the heat medium passage 141b of the chiller 141. The first heat medium that has flowed into the heat medium passage 141b is cooled by the heat thereof being absorbed by the low-pressure refrigerant.

The first heat medium cooled in the heat medium passage 141b flows into the coolant passage 80a of the battery 80. The first heat medium that has flowed into the coolant passage 80a absorbs the exhaust heat of the battery 80. Consequently, the battery 80 is cooled.

A part of the first heat medium flowing out of the coolant passage 80a flows into the coolant passage 81a of the vehicle-mounted device 81. The first heat medium that has flowed into the coolant passage 81a absorbs the exhaust heat of the vehicle-mounted device 81. Consequently, the vehicle-mounted device 81 is cooled. In this case, the opening degree of the first vehicle-mounted device side flow rate regulation valve 44 is adjusted such that the vehicle-mounted device 81 is sufficiently cooled.

The first heat medium flowing out of the coolant passage 81a is sucked into the first radiator side water pump 42a and is pumped. The first heat medium pumped from the first radiator side water pump 42a merges with the first heat medium flowing out of the first heat medium passage 41a of the first radiator 41.

On the other hand, the residual first heat medium flowing out of the coolant passage 80a flows into the first heat medium passage 41a of the first radiator 41. The first heat medium that has flowed into the first heat medium passage 41a exchanges heat with the outside air blown from the external blower 15 and thus radiates heat. The first heat medium flowing out of the first heat medium passage 41a merges with the first heat medium flowing out of the coolant passage 81a to be sucked into the first battery side water pump 42 and is pumped to the heat medium passage 141b of the chiller 141 again.

In the second heat medium circuit 50, the second heat medium is circulated in the same manner as in the cooling operation mode. Consequently, in the second heat medium circuit 50, the heat of the high-pressure refrigerant absorbed by the second heat medium in the water-refrigerant heat exchanger 121 can be radiated to the outside air that has passed through the first radiator 41 in the second radiator 51.

In the refrigeration cycle device 10, the refrigerant is circulated in the same manner as in the heating operation mode. Consequently, in the refrigeration cycle device 10, at least the heat absorbed by the refrigerant from the first heat medium in the chiller 141 can be radiated to the second heat medium in the water-refrigerant heat exchanger 121.

Therefore, in the battery device cooling mode, the first heat medium cooled in the chiller 141 can be made to flow into the coolant passage 80a of the battery 80 to cool the battery 80. The first heat medium flowing out of the coolant passage 80a can be made to flow into the coolant passage 81a of the vehicle-mounted device 81 to cool the vehicle-mounted device 81.

By the way, in the battery device cooling mode, the coolant passage 80a of the battery 80 and the coolant passage 81a of the vehicle-mounted device 81 are connected in series to each other with respect to the flow of the first heat medium. It is difficult to adjust both of the temperature of the battery 80 and the temperature of the vehicle-mounted device 81 within respective appropriate temperature ranges.

In other words, when the temperature of the battery 80 disposed on the upstream side in the flow of the first heat medium is to be maintained within an appropriate temperature range, there is concern that the vehicle-mounted device 81 may be insufficiently cooled. When the temperature of the vehicle-mounted device 81 disposed on the downstream side in the flow of the first heat medium is to be maintained within an appropriate temperature range, there is concern that the temperature of the battery 80 may become too low.

Therefore, the temperature adjusting device 1 of the present embodiment may execute the battery priority cooling mode. The battery priority cooling mode is an operation mode in which the temperature of the battery 80 is maintained within an appropriate temperature range while restricting an increase in the temperature of the vehicle-mounted device 81. The battery priority cooling mode is an evaporation-side target object cooling mode in which at least the battery 80 that is an evaporation-side target object is cooled. The battery priority cooling mode will be described below.

(d) Battery Priority Cooling Mode

In the battery priority cooling mode, the control device 70 closes the first battery side open-close valve 45a, closes the first bypass passage side open-close valve 45b, and opens the first radiator side open-close valve 45d. The control device 70 operates the first battery side water pump 42, operates the first radiator side water pump 42a, and brings the first vehicle-mounted device side flow rate regulation valve 44 into an open state.

The control device 70 closes the second heater core side open-close valve 55. The control device 70 operates the second heat exchanger side water pump 52 and brings the second radiator side flow rate regulation valve 54 into an open state. The control device 70 operates the compressor 11 while bringing at least the chiller side expansion valve 13a into a throttle state.

Figure 20:
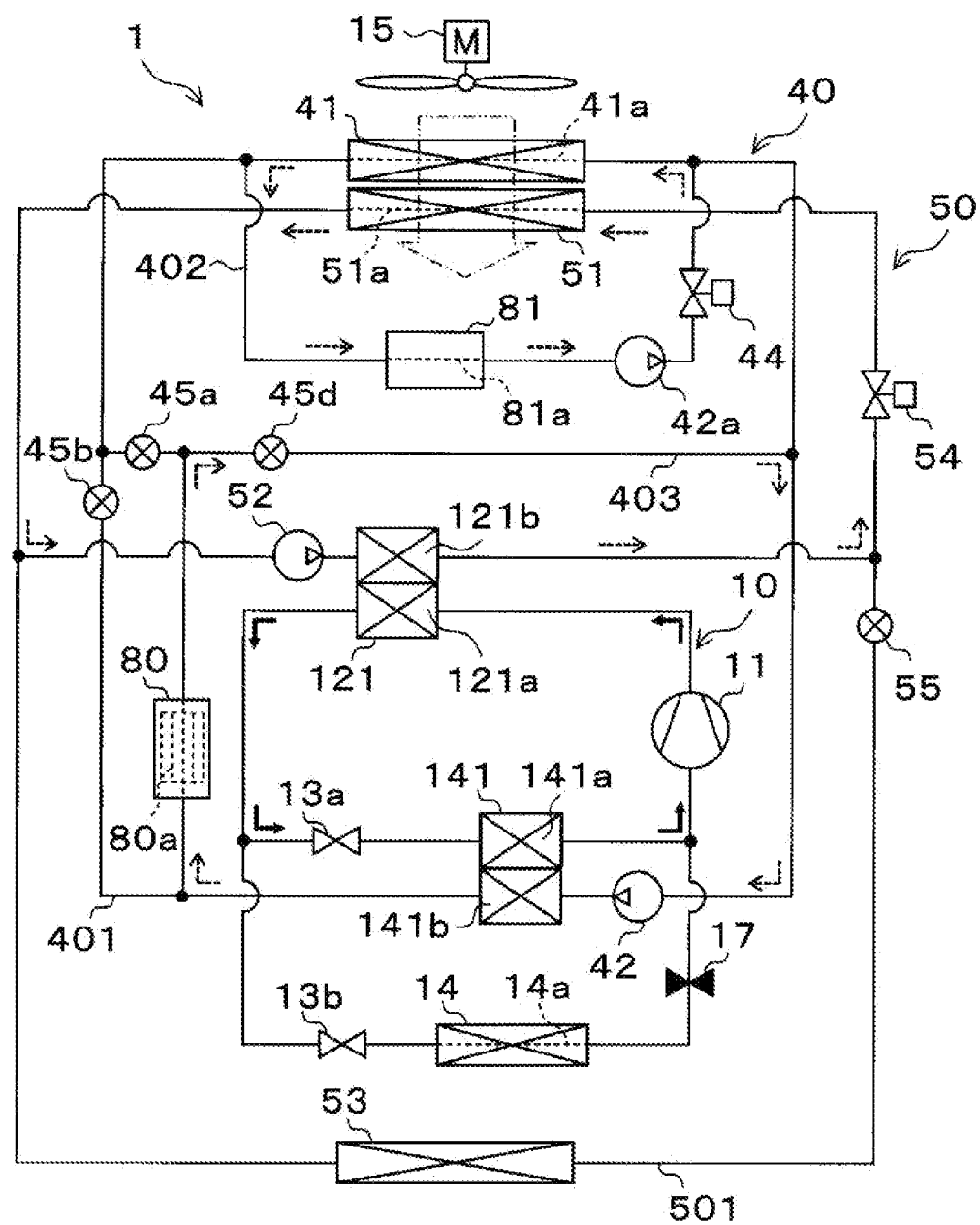
FIG. 20 is an overall configuration diagram of the temperature adjusting device during a battery priority cooling mode in the sixteenth embodiment.

Therefore, as illustrated in FIG. 20, in the first heat medium circuit 40 in the battery priority cooling mode, the first heat medium pumped from the first battery side water pump 42 is circulated in an order of the heat medium passage 141b of the chiller 141, the coolant passage 80a of the battery 80, and the intake side of the first battery side water pump 42. The first heat medium pumped from the first radiator side water pump 42a is circulated in an order of the first heat medium passage 41a of the first radiator 41, the coolant passage 81a of the vehicle-mounted device 81, and the intake side of the first radiator side water pump 42a.

That is, in the battery priority cooling mode, the first switching unit causes the first heat medium cooled in the heat medium passage 141a of the chiller 141 to flow into the heat medium passage 141a of the chiller 141. The first switching unit is configured to switch a circuit configuration in which the first heat medium flowing out of the heat medium passage 141a bypasses the coolant passage 81a of the vehicle-mounted device 81 to be guided to the inlet side of the heat medium passage 141a.

Consequently, in the first heat medium circuit 40, the heat absorbed by the first heat medium from the battery 80 can be absorbed by the refrigerant in the chiller 141. The heat absorbed by the first heat medium from the vehicle-mounted device 81 can be radiated to the outside air in the first radiator 41.

In the second heat medium circuit 50, the second heat medium is circulated in the same manner as in the cooling operation mode. Consequently, in the second heat medium circuit 50, the heat of the high-pressure refrigerant absorbed by the second heat medium in the water-refrigerant heat exchanger 121 can be radiated to the outside air that has passed through the first radiator 41 in the second radiator 51.

In the refrigeration cycle device 10, the refrigerant is circulated in the same manner as in the heating operation mode. Consequently, in the refrigeration cycle device 10, at least the heat absorbed by the refrigerant from the first heat medium in the chiller 141 can be radiated to the second heat medium in the water-refrigerant heat exchanger 121.

Therefore, in the battery priority cooling mode, the first heat medium cooled in the heat medium passage 141*b* of the chiller 141 can be made to flow into the coolant passage 80*a* of the battery 80 to cool the battery 80. The first heat medium cooled to come close to the outside air temperature in the first heat medium passage 41*a* of the first radiator 41 can be made to flow into the coolant passage 81*a* of the vehicle-mounted device 81 to cool the vehicle-mounted device 81.

As described above, according to the temperature adjusting device 1 of the present embodiment, the battery 80 and the vehicle-mounted device 81 can be cooled to restrict increases in the temperatures of the battery 80 and the vehicle-mounted device 81. The temperature of the ventilation air can be adjusted to cool, heat, and dehumidify and heat the vehicle compartment.

According to the temperature adjusting device 1 of the present embodiment, during cooling operation mode, a flowing direction of the first heat medium flowing through the first heat medium passage 41*a* of the first radiator 41 is the same as a flowing direction of the second heat medium flowing through the second heat medium passage 51*a* of the second radiator 51. That is, the flow of the first heat medium flowing through the first heat medium passage 41*a* and the flow of the second heat medium flowing through the second heat medium passage 51*a* are so-called parallel flows.

Therefore, even if a temperature distribution occurs in the outside air that has passed through the first radiator 41, it is possible to restrict expansion of a temperature difference between the outside air that has passed through the first radiator 41 and the second heat medium flowing through the second radiator 51.

As a result, during the cooling operation mode, the heat exchange efficiency between the second heat medium flowing through the second radiator 51 and the outside air can be improved, and the heat of the second heat medium can be efficiently radiated to the outside air. The refrigeration cycle device 10 can efficiently cool the ventilation air that is a cooling target fluid.

A flowing direction of the first heat medium flowing through the first heat medium passage 41*a* of the first radiator 41 during the cooling operation mode is different from a flowing direction of the first heat medium flowing through the first heat medium passage 41*a* during the heating operation mode. A flowing direction of the first heat medium flowing through the coolant passage 81*a* of the vehicle-mounted device 81 during the cooling operation mode is the same as a flowing direction of the first heat medium flowing through the coolant passage 81*a* of the vehicle-mounted device 81 during the heating operation mode.

Consequently, during the cooling operation mode, it is possible to provide a circuit configuration in which the first heat medium passage 41*a* of the first radiator 41 and the coolant passage 81*a* of the vehicle-mounted device 81 are connected in series to each other. During the heating operation mode, it is possible to provide a circuit configuration in which the first heat medium passage 41*a* and the coolant passage 81*a* are connected in parallel to each other with respect to the flow of the first heat medium flowing out of the heat medium passage 141*b* of the chiller 141.

Therefore, during the heating operation mode, it is possible to adjust a flow rate ratio between a flow rate of the first heat medium flowing into the first radiator 41 and a flow rate of the first heat medium flowing into the coolant passage 81*a* of the vehicle-mounted device 81 by adjusting the pumping capacity of the first radiator side water pump 42*a*. Consequently, during the heating operation mode, an amount of heat absorbed by the first heat medium from the vehicle-mounted device 81 is appropriately adjusted, and thus it is possible to efficiently heat the ventilation air.

In the temperature adjusting device 1 of the present embodiment, a flowing direction of the first heat medium flowing through the first radiator 41 is a direction of a flow from the upper side to the lower side during the cooling operation mode. The first radiator 41 during the cooling operation mode is a heat radiation heat exchanger that radiates the exhaust heat of the vehicle-mounted device 81 absorbed by the first heat medium to the outside air.

The flow velocity of a flow from the upper side to the lower side is higher than that of a flow from the lower side to the upper side due to the action of gravity. Therefore, a sudden temperature change in the first heat medium can be restricted, and thus a sudden temperature change in the first radiator 41 or the vehicle-mounted device 81 can be restricted.

On the other hand, in the temperature adjusting device 1 of the present embodiment, a flowing direction of the first heat medium flowing through the first radiator 41 during the heating operation mode is a direction of a flow from the lower side to the upper side. The first radiator 41 during the cooling operation mode is a heat-absorbing heat exchanger that causes heat of the outside air to be absorbed by the first heat medium.

The flow velocity of a flow from the lower side to the upper side is lower than that of a flow from the upper side to the lower side due to the action of gravity. Therefore, heat of the outside air can be efficiently absorbed by the first heat medium in the first radiator 41.

In the temperature adjusting device 1 of the present embodiment, during the battery priority cooling mode, the first switching unit is configured to switch a circuit configuration in which the first heat medium cooled in the heat medium passage 141*a* of the chiller 141 flows into the coolant passage 80*a* of the battery 80. The first switching unit is configured to switch a circuit configuration in which the first heat medium flowing out of the coolant passage 80*a* bypasses the coolant passage 81*a* of the vehicle-mounted device 81 to be guided to the inlet side of the heat medium passage 141*a*.

Thus, two independent circuits are provided in the first heat medium circuit 40 during the battery priority cooling mode. Specifically, a circuit that circulates the first heat medium between the heat medium passage 141*a* of the chiller 141 and the coolant passage 80*a* of the battery 80 and a circuit that circulates the first heat medium between the first heat medium passage 41a of the first radiator 41 and the coolant passage 81a of the vehicle-mounted device 81 are provided.

Therefore, during the battery priority cooling mode, the battery 80 can be cooled by the first heat medium cooled in the chiller 141 without being affected by the exhaust heat of the vehicle-mounted device 81.

Seventeenth Embodiment

Figure 21:
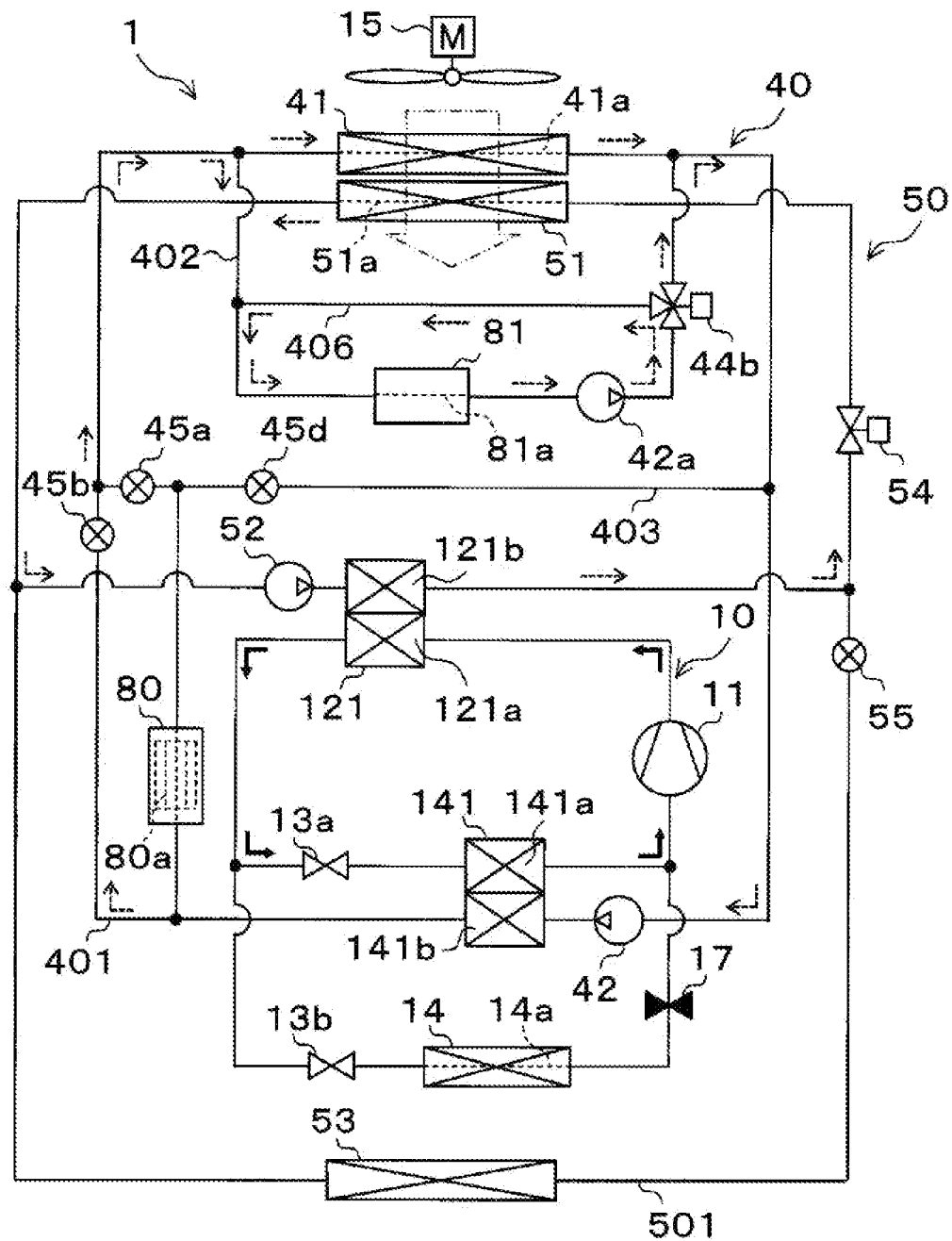
FIG. 21 is an overall configuration diagram of a temperature adjusting device during a device independent cooling mode in a seventeenth embodiment.
Figure 22:
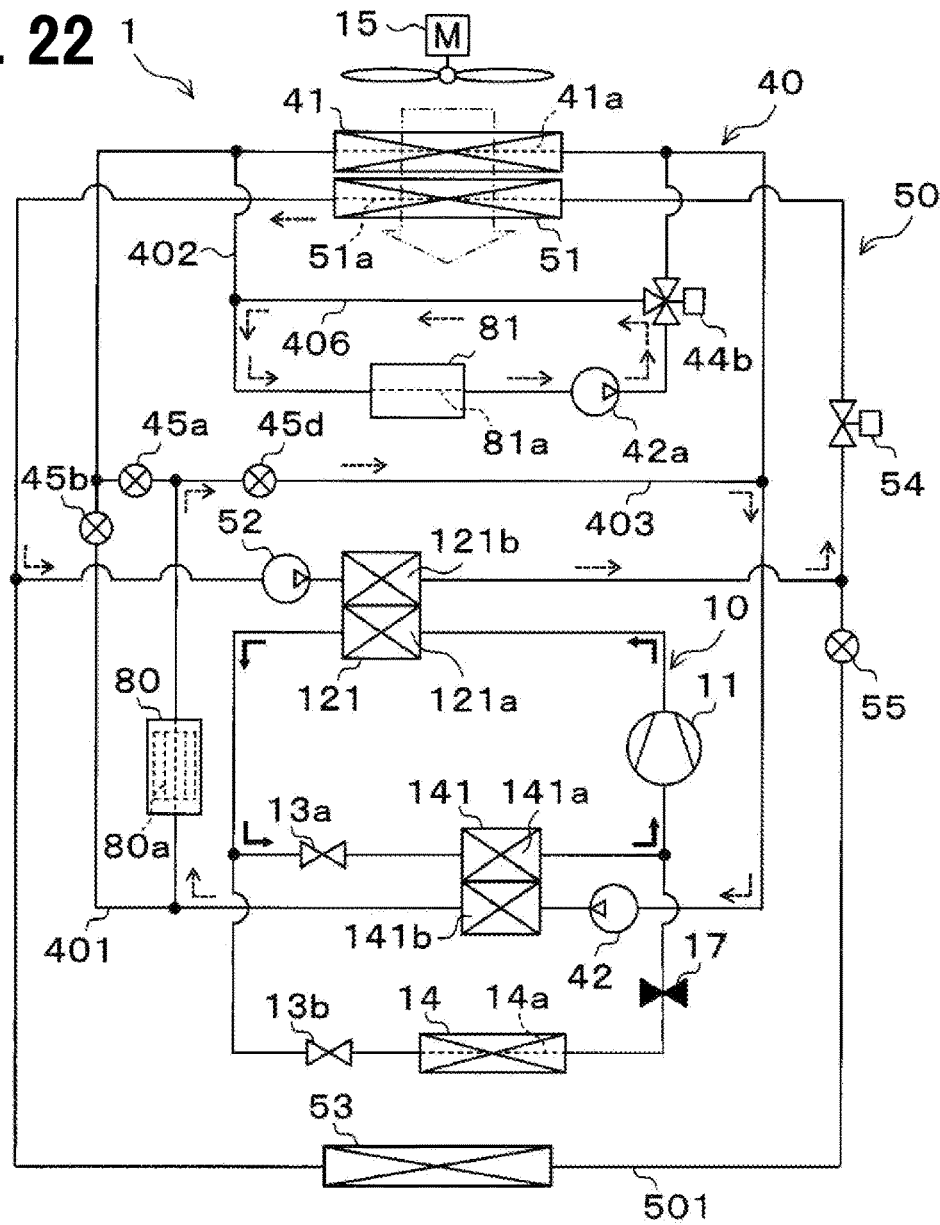
FIG. 22 is an overall configuration diagram of the temperature adjusting device during a battery independent cooling mode in the seventeenth embodiment.

In the present embodiment, as illustrated in FIGS. 21 and 22, a description will be made of an example in which the configuration of the first heat medium circuit 40 is changed compared with the sixteenth embodiment.

Specifically, in the first heat medium circuit 40 of the present embodiment, an auxiliary bypass passage 406 is added to the first vehicle-mounted device bypass passage 402. A three-way type auxiliary flow rate regulation valve 44b is connected to the auxiliary bypass passage 406.

The auxiliary bypass passage 406 is a heat medium passage that returns the first heat medium pumped from the first radiator side water pump 42a to the inlet side of the coolant passage 81a of the vehicle-mounted device 81 during the battery device cooling mode. The auxiliary flow rate regulation valve 44b adjusts a flow rate ratio between a flow rate of the first heat medium flowing out toward the auxiliary bypass passage 406 side and a flow rate of the first heat medium flowing out toward the intake side of the first battery side water pump 42 with respect to the first heat medium pumped from the first radiator side water pump 42a.

The auxiliary flow rate regulation valve 44b can switch circuit configurations of the first heat medium circuit 40 by fully closing either the inflow port on the auxiliary bypass passage 406 side or the outflow port on the intake side of the first battery side water pump 42. Therefore, the auxiliary flow rate regulation valve 44b is included in the first switching unit. An operation of the auxiliary flow rate regulation valve 44b is controlled according to a control signal output from the control device 70. Remaining configurations are the same as those in the sixteenth embodiment.

Next, an operation of the temperature adjusting device 1 of the present embodiment having the above configuration will be described. When the auxiliary flow rate regulation valve 44b causes the entire flow rate of the first heat medium pumped from the first radiator side water pump 42a to flow out toward the intake side of the first battery side water pump 42, the temperature adjusting device 1 of the present embodiment has the exactly same configuration as that in the sixteenth embodiment. Therefore, the temperature adjusting device 1 of the present embodiment is operated in the same manner as in the sixteenth embodiment, and the same effect as in the sixteenth embodiment can be achieved.

The temperature adjusting device 1 of the present embodiment may execute a device independent cooling mode in which the vehicle-mounted device 81 is cooled without cooling the battery 80 and a battery independent cooling mode in which the battery 80 is cooled without cooling the vehicle-mounted device 81. These operation modes will be described below.
(a) Device Independent Cooling Mode The device independent cooling mode is executed, for example, when the battery temperature TB becomes low and the battery 80 is not required to be cooled during the device independent cooling mode described in the sixteenth embodiment.

In the battery device cooling mode, the control device 70 closes the first battery side open-close valve 45a, opens the first bypass passage side open-close valve 45b, and closes the first radiator side open-close valve 45d. The control device 70 operates the first battery side water pump 42 and operates the first radiator side water pump 42a.

The control device 70 closes the second heater core side open-close valve 55. The control device 70 operates the second heat exchanger side water pump 52 and brings the second radiator side flow rate regulation valve 54 into an open state. The control device 70 operates the compressor 11 while bringing at least the chiller side expansion valve 13a into a throttle state. The control device 70 brings the auxiliary flow rate regulation valve 44b into an open state.

Therefore, as illustrated in FIG. 21, in the first heat medium circuit 40 in the device independent cooling mode, the first heat medium pumped from the first battery side water pump 42 is circulated in an order of the heat medium passage 141b of the chiller 141, the first heat medium passage 41a of the first radiator 41, and the intake side of the first battery side water pump 42. The first heat medium is circulated in an order of the heat medium passage 141b of the chiller 141, the coolant passage 81a of the vehicle-mounted device 81, and the intake side of the first battery side water pump 42.

A part of the first heat medium pumped from the first radiator side water pump 42a is returned to the inlet side of the coolant passage 81a of the vehicle-mounted device 81 through the auxiliary bypass passage 406. The first heat medium returned to the inlet side of the coolant passage 81a of the vehicle-mounted device 81 merges with the first heat medium cooled in the heat medium passage 141b of the chiller 141.

Consequently, in the first heat medium circuit 40, the heat absorbed by the first heat medium from the outside air in the first radiator 41 and the exhaust heat absorbed from the vehicle-mounted device 81 can be radiated to the low-pressure refrigerant in the chiller 141.

In the second heat medium circuit 50, the second heat medium is circulated in the same manner as in the cooling operation mode of the sixteenth embodiment. Consequently, in the second heat medium circuit 50, heat of the high-pressure refrigerant absorbed by the second heat medium in the water-refrigerant heat exchanger 121 can be radiated to the outside air that has passed through the first radiator 41 in the second radiator 51.

In the refrigeration cycle device 10, the refrigerant is circulated in the same manner as in the cooling operation mode of the sixteenth embodiment. Consequently, in the refrigeration cycle device 10, at least the heat absorbed by the refrigerant from the first heat medium in the chiller 141 can be radiated to the second heat medium in the water-refrigerant heat exchanger 121.

Therefore, in the device independent cooling mode, the first heat medium cooled in the chiller 141 can be made to flow into the coolant passage 81a of the vehicle-mounted device 81 to cool the vehicle-mounted device 81.
(b) Battery Independent Cooling Mode In the battery independent cooling mode, the control device 70 closes the first battery side open-close valve 45a, closes the first bypass passage side open-close valve 45b, and opens the first radiator side open-close valve 45d. The control device 70 operates the first battery side water pump 42 and operates the first radiator side water pump 42a.

The control device 70 closes the second heater core side open-close valve 55. The control device 70 operates the second heat exchanger side water pump 52 and brings the second radiator side flow rate regulation valve 54 into an open state. The control device 70 operates the compressor 11 while bringing at least the chiller side expansion valve 13*a* into a throttle state.

The control device 70 brings the auxiliary flow rate regulation valve 44*b* into a fully opened state. When the auxiliary flow rate regulation valve 44*b* is in a fully opened state, the entire flow rate of the first heat medium pumped from the first radiator side water pump 42*a* flows into the auxiliary bypass passage 406.

Therefore, as illustrated in FIG. 22, in the first heat medium circuit 40 in the device independent cooling mode, the first heat medium pumped from the first battery side water pump 42 is circulated in an order of the heat medium passage 141*b* of the chiller 141, the coolant passage 80*a* of the battery 80, and the intake side of the first battery side water pump 42. The first heat medium pumped from the first radiator side water pump 42*a* is circulated in an order of the first heat medium passage 41*a* of the first radiator 41 and the intake side of the first radiator side water pump 42*a*.

Consequently, in the first heat medium circuit 40, the exhaust heat of the battery 80 absorbed by the first heat medium can be absorbed by the refrigerant in the chiller 141.

In the second heat medium circuit 50, the second heat medium is circulated in the same manner as in the device independent cooling mode. Consequently, in the second heat medium circuit 50, the heat of the high-pressure refrigerant absorbed by the second heat medium in the water-refrigerant heat exchanger 121 can be radiated to the outside air that has passed through the first radiator 41 in the second radiator 51.

In the refrigeration cycle device 10, the refrigerant is circulated in the same manner as in the device independent cooling mode. Consequently, in the refrigeration cycle device 10, at least the heat absorbed by the refrigerant from the first heat medium in the chiller 141 can be radiated to the second heat medium in the water-refrigerant heat exchanger 121.

Therefore, in the battery independent cooling mode, the first heat medium cooled by the chiller 141 can be made to flow into the coolant passage 80*a* of the battery 80 to cool the battery 80.

As described above, according to the temperature adjusting device 1 of the present embodiment, the battery 80 and the vehicle-mounted device 81 can be cooled to restrict increases in the temperatures of the battery 80 and the vehicle-mounted device 81. The temperature of the ventilation air can be adjusted to cool, heat, and dehumidify and heat the vehicle compartment.

In addition thereto, the temperature adjusting device 1 of the present embodiment includes the auxiliary bypass passage 406 and the auxiliary flow rate regulation valve 44*b*, and thus a sudden fluctuation in the temperature of the vehicle-mounted device 81 can be restricted when operation modes are switched.

More specifically, for example, it is assumed that the battery temperature TB becomes low and thus it is not necessary to cool the battery 80 when an operation is performed in the same manner as in the battery device cooling mode described in the sixteenth embodiment. In such a case, it is conceivable to switch to the device independent cooling mode.

In order to switch the battery device cooling mode to the device independent cooling mode, the first battery side open-close valve 45*a* corresponding to the first switching unit may be closed, and the first bypass passage side open-close valve 45*b* may be opened. Consequently, it is possible to restrict unnecessary cooling of the battery 80.

However, if the first battery side open-close valve 45*a* is simply closed and the first bypass passage side open-close valve 45*b* is opened, the first heat medium cooled in the heat medium passage 141*b* of the chiller 141 flows into the coolant passage 81*a* of the vehicle-mounted device 81 without absorbing the exhaust heat of the battery 80.

Figure 23:
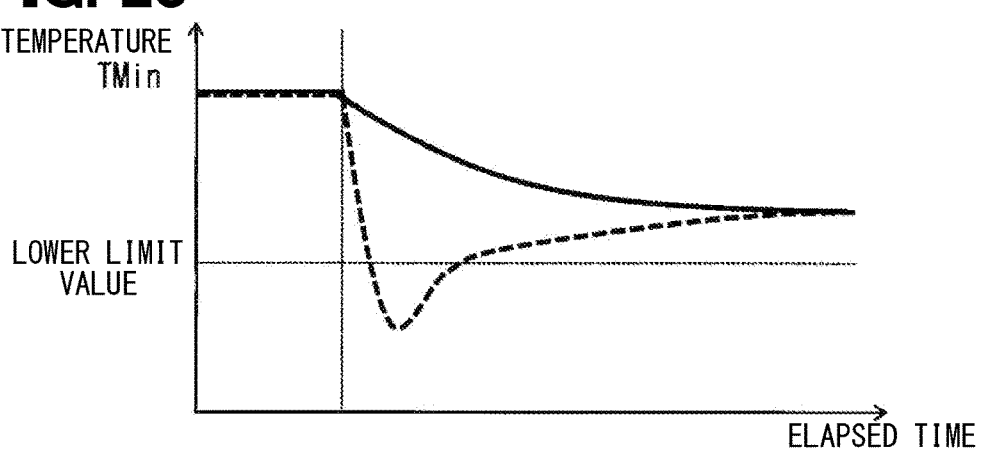
FIG. 23 is a graph illustrating a change in a temperature on an inlet side of a vehicle-mounted device during the device independent cooling mode in the seventeenth embodiment.

Thus, as indicated by a thick dashed line in FIG. 23, there is concern that a vehicle-mounted device inlet side temperature TMin that is the temperature of the first heat medium flowing into the coolant passage 81*a* of the vehicle-mounted device 81 may suddenly decrease to be lower than a lower limit value of an appropriate temperature range of the vehicle-mounted device 81.

In contrast, the temperature adjusting device 1 of the present embodiment includes the auxiliary bypass passage 406 and the auxiliary flow rate regulation valve 44*b*. Therefore, the opening degree of the auxiliary flow rate regulation valve 44*b* is adjusted, and, thus, with respect to the first heat medium flowing out of the coolant passage 81*a* of the vehicle-mounted device 81, a flow rate of the first heat medium that is returned to the inlet side of the coolant passage 81*a* of the vehicle-mounted device 81 can be changed. Consequently, the vehicle-mounted device inlet side temperature TMin can be adjusted.

Therefore, as indicated by a thick solid line in FIG. 23, a flow rate of the first heat medium returned to the inlet side of the coolant passage 81*a* can be adjusted such that the vehicle-mounted device inlet side temperature TMin is more than the lower limit value of the appropriate temperature range of the vehicle-mounted device 81. As a result, it is possible to restrict the vehicle-mounted device 81 from being excessively cooled and thus to maintain the temperature of the vehicle-mounted device 81 within the appropriate temperature range.

In the temperature adjusting device 1 of the present embodiment, the auxiliary flow rate regulation valve 44*b* causes the entire flow rate of the first heat medium pumped from the first radiator side water pump 42*a* to flow into the auxiliary bypass passage 406 during the battery independent cooling mode.

Thus, two independent circuits are provided in the first heat medium circuit 40 during the battery independent cooling mode. Specifically, a circuit that circulates the first heat medium between the heat medium passage 141*a* of the chiller 141 and the coolant passage 80*a* of the battery 80 and a circuit that causes the first heat medium flowing out of the coolant passage 81*a* of the vehicle-mounted device 81 to flow into the coolant passage 81*a* again are provided.

Therefore, in the battery independent cooling mode, the temperature of the battery 80 can be reliably maintained within an appropriate temperature range without being affected by the exhaust heat of the vehicle-mounted device 81.

Eighteenth Embodiment

Figure 24:
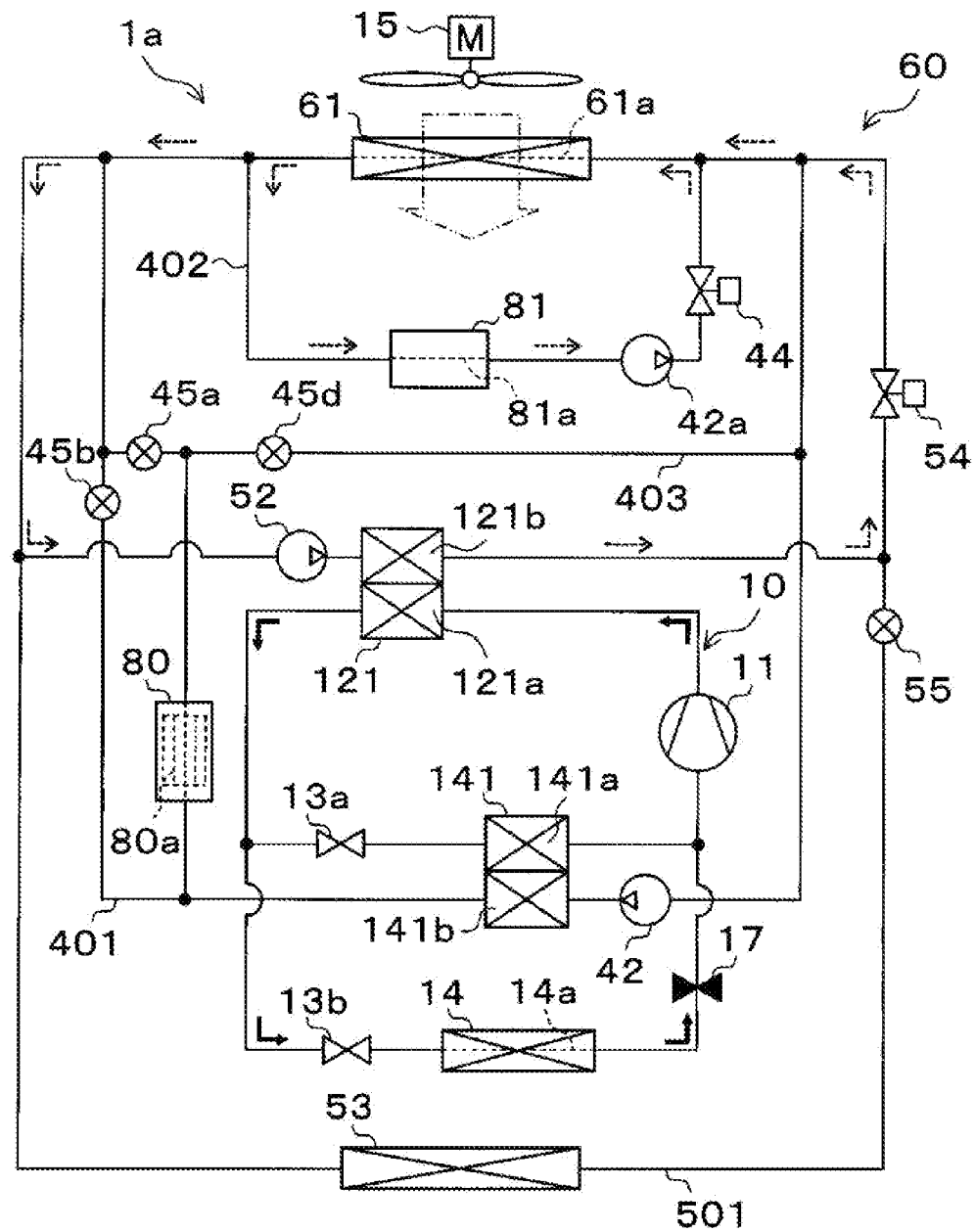
FIG. 24 is an overall configuration diagram of a temperature adjusting device during a cooling operation mode in an eighteenth embodiment.
Figure 25:
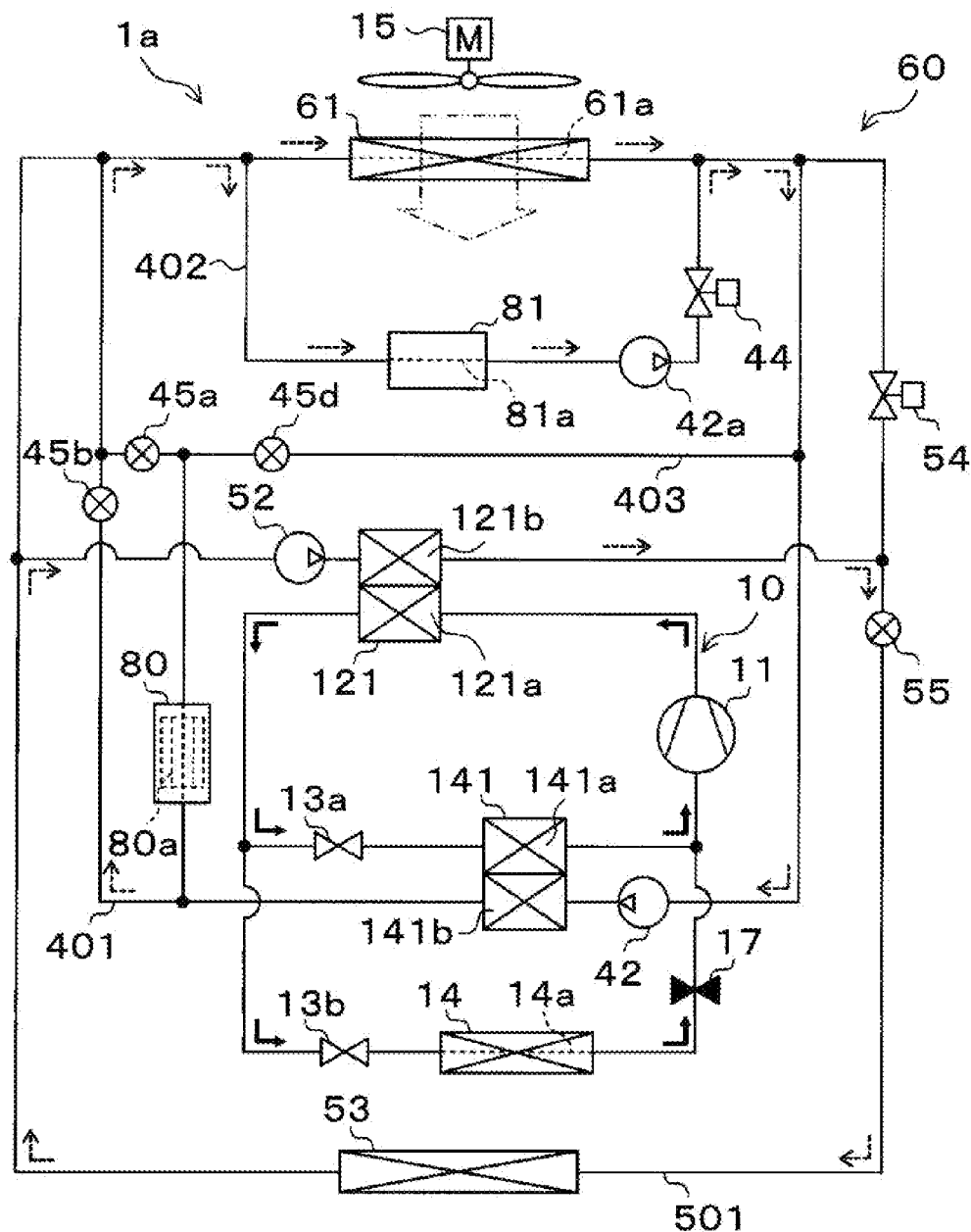
FIG. 25 is an overall configuration diagram of the temperature adjusting device during a heating operation mode in the eighteenth embodiment.
Figure 26:
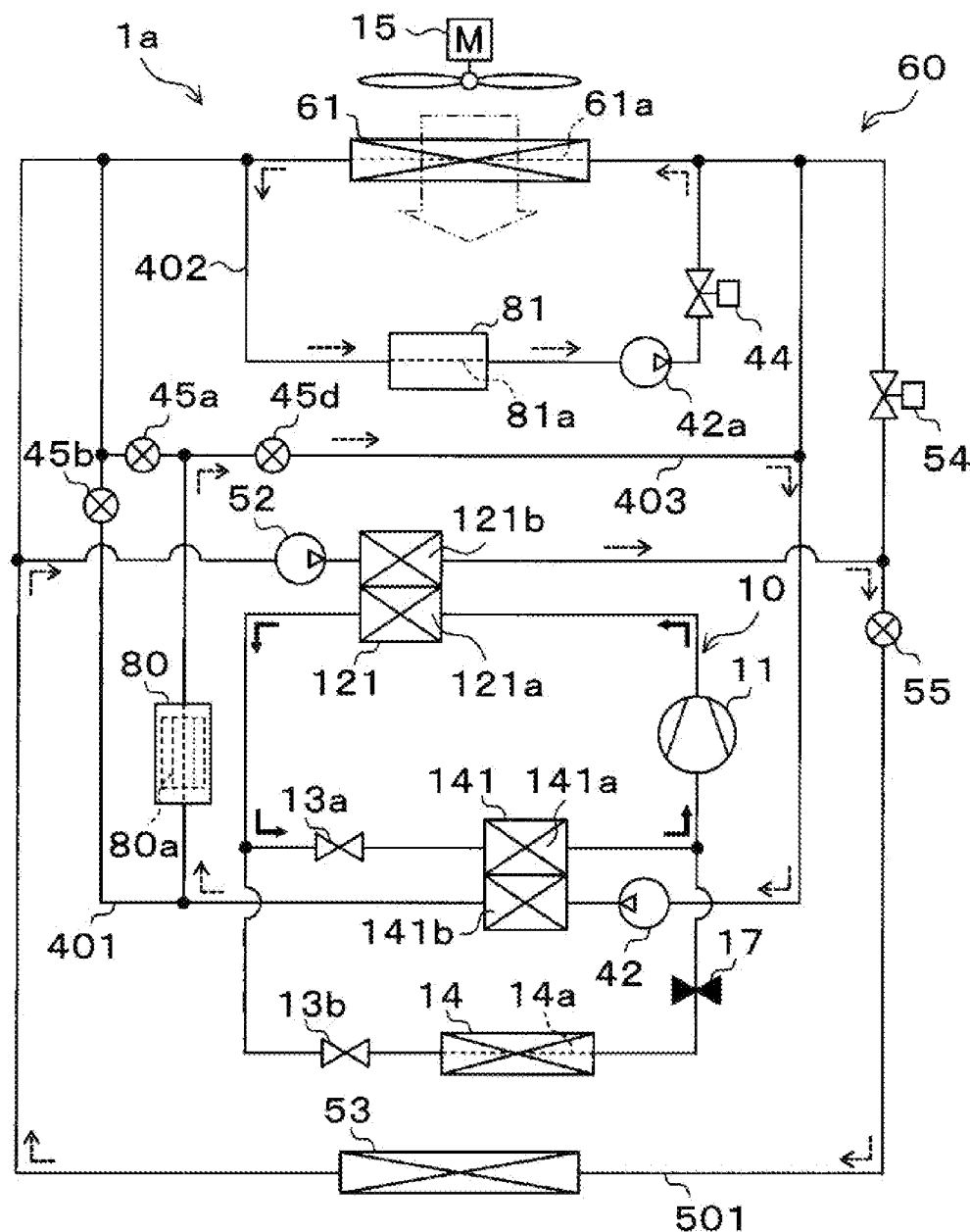
FIG. 26 is an overall configuration diagram of the temperature adjusting device during a battery priority cooling mode in the eighteenth embodiment.

In the present embodiment, as illustrated in FIGS. 24 to 26, a description will be made of a temperature adjusting device 1*a* in which the configurations of the first heat medium circuit 40 and the second heat medium circuit 50 described in the sixteenth embodiment are changed.

In the temperature adjusting device 1*a*, the first heat medium circuit 40 and the second heat medium circuit 50 of the temperature adjusting device 1 described in the sixteenth embodiment are connected to form a single heat medium circuit 60. In the temperature adjusting device 1*a*, the first radiator 41 and the second radiator 51 described in the sixteenth embodiment are integrated into a single radiator 61.

The radiator 61 is an external heat exchanger that exchanges heat between a heat medium and outside air blown from the external blower 15. Fundamental configurations of the radiator 61 are same as those of the first radiator 41 and the second radiator 51 described in the sixteenth embodiment. That is, the radiator 61 is a tank-and-tube type heat exchanger. Multiple heat medium tubes of the radiator 61 form a heat medium passage 61a through which the heat medium is circulated.

In the temperature adjusting device 1a, one heat medium outlet of the heat medium passage 61a is connected to the heat medium outlet side of the heater core 53, the outlet side of the coolant passage 80a of the battery 80, the inlet side of the coolant passage 81a of the vehicle-mounted device 81, and the like. The other heat medium outlet of the heat medium passage 61a is connected to the discharge port side of the first radiator side water pump 42a, the outlet side of the heat medium passage 121b of the water-refrigerant heat exchanger 121, the heat medium inlet side of the heater core 53, and the like.

Remaining configurations are the same as those in the sixteenth embodiment. In the present embodiment, various constituent devices are connected to the single heat medium circuit 60. Among these constituent devices, constituent devices except the radiator 61 are the same as the constituent devices connected to the first heat medium circuit 40 and the second heat medium circuit 50 of the sixteenth embodiment. Therefore, in the present embodiment, the constituent devices will be described without changing the names and codes thereof. This is the same for embodiments in which the other heat medium circuit 60 is employed.

Thus, in the present embodiment, the vehicle-mounted device 81 is an outside-air-side target object, and the coolant passage 81a of the vehicle-mounted device 81 is an outside-air-side target-object heat exchanger. The battery 80 is an evaporation-side target object, and the coolant passage 80a of the battery 80 is an evaporation-side target-object heat exchanger. The first battery side open-close valve 45a, the first bypass passage side open-close valve 45b on, the first radiator side open-close valve 45d, the second heater core side open-close valve 55, and the second radiator side flow rate regulation valve 54 correspond to a switching unit.

Next, an operation of the temperature adjusting device 1a of the present embodiment having the above configuration will be described. A fundamental operation of the temperature adjusting device 1a of the present embodiment is the same as that of the temperature adjusting device 1 of the sixteenth embodiment. Hereinafter, a cooling operation mode, a heating operation mode, and a battery priority cooling mode will be described.

(a) Cooling Operation Mode

In the cooling operation mode, the control device 70 closes the first battery side open-close valve 45a, closes the first bypass passage side open-close valve 45b, and closes the first radiator side open-close valve 45d. The control device 70 stops the first battery side water pump 42, operates the first radiator side water pump 42a, and brings the first vehicle-mounted device side flow rate regulation valve 44 into an open state.

The control device 70 closes the second heater core side open-close valve 55. The control device 70 operates the second heat exchanger side water pump 52 and brings the second radiator side flow rate regulation valve 54 into a fully opened state. The control device 70 operates the compressor 11 while bringing the evaporator side expansion valve 13b into a throttle state.

Therefore, as illustrated in FIG. 24, in the heat medium circuit 60 in the cooling operation mode, the heat medium pumped from the first radiator side water pump 42a is circulated in an order of the heat medium passage 61a of the radiator 61, the coolant passage 81a of the vehicle-mounted device 81, and the intake side of the first radiator side water pump 42a.

The heat medium pumped from the second heat exchanger side water pump 52 is circulated in an order of the heat medium passage 121b of the water-refrigerant heat exchanger 121, the heat medium passage 61a of the radiator 61, and the intake side of the second heat exchanger side water pump 52.

Consequently, in the heat medium circuit 60, the exhaust heat of the vehicle-mounted device 81 absorbed by the heat medium in the coolant passage 81a and the heat of the high-pressure refrigerant absorbed by the heat medium in the heat medium passage 121b of the water-refrigerant heat exchanger 121 can be radiated to the outside air in the radiator 61. In this case, the heat medium flows from the upper side to the lower side in the heat medium passage 61a of the radiator 61.

In the refrigeration cycle device 10, the high-pressure refrigerant discharged from the compressor 11 is circulated in the same manner as in the sixteenth embodiment. Consequently, in the refrigeration cycle device 10, the heat absorbed by the refrigerant from the ventilation air in the internal evaporator 14 can be radiated to the heat medium in the water-refrigerant heat exchanger 121.

Therefore, in the cooling operation mode, the air ventilation air can be cooled in the internal evaporator 14 to cool the vehicle compartment. The vehicle-mounted device 81 can be cooled.

(b) Heating Operation Mode

In the heating operation mode, the control device 70 closes the first battery side open-close valve 45a, opens the first bypass passage side open-close valve 45b, and closes the first radiator side open-close valve 45d. The control device 70 operates the first battery side water pump 42, operates the first radiator side water pump 42a, and brings the first vehicle-mounted device side flow rate regulation valve 44 into an open state.

The control device 70 opens the second heater core side open-close valve 55. The control device 70 operates the second heat exchanger side water pump 52 and brings the second radiator side flow rate regulation valve 54 into a fully closed state. The control device 70 operates the compressor 11 while bringing at least the chiller side expansion valve 13a into a throttle state.

Therefore, as illustrated in FIG. 25, in the heat medium circuit 60 in the heating operation mode, the heat medium pumped from the first battery side water pump 42 is circulated in an order of the heat medium passage 141b of the chiller 141, the heat medium passage 61a of the radiator 61, and the intake side of the first battery side water pump 42. The heat medium is also circulated in an order of the heat medium passage 141b of the chiller 141, the coolant passage 81a of the vehicle-mounted device 81, and the intake side of the first battery side water pump 42.

That is, the heat medium passage 61a of the radiator 61 and the coolant passage 81a of the vehicle-mounted device 81 are connected in parallel to each other with the flow of the heat medium flowing out of the heat medium passage 141b of the chiller 141.

Consequently, in the heat medium circuit 60, a part of the heat medium cooled in the heat medium passage 141b of the chiller 141 flows into the coolant passage 81a and absorbs the exhaust heat of the vehicle-mounted device 81. Consequently, the vehicle-mounted device 81 is cooled. The residual heat medium absorbs heat from the outside air in the radiator 61. The heat absorbed by the heat medium from the vehicle-mounted device 81 and the outside air can be absorbed by the low-pressure refrigerant in the chiller 141.

In this case, the heat medium flows from the lower side to the upper side in the heat medium passage 61a of the radiator 61. Therefore, a flowing direction of the heat medium flowing through the heat medium passage 61a of the radiator 61 during the cooling operation mode is different from a flowing direction of the heat medium flowing through the heat medium passage 61a during the heating operation mode.

A flowing direction of the heat medium flowing through the coolant passage 81a of the vehicle-mounted device 81 during the cooling operation mode is the same as a flowing direction of the heat medium flowing through the coolant passage 81a during the heating operation mode.

In the heat medium circuit 60, the heat medium pumped from the second heat exchanger side water pump 52 is circulated in an order of the heat medium passage 121b of the water-refrigerant heat exchanger 121, the heater core 53, and the intake side of the second heat exchanger side water pump 52. Consequently, in the heat medium circuit 60, the heat of the high-pressure refrigerant absorbed by the heat medium in the water-refrigerant heat exchanger 121 can be radiated to the ventilation air in the heater core 53.

In the refrigeration cycle device 10, the high-pressure refrigerant discharged from the compressor 11 is circulated in the same manner as in the sixteenth embodiment. Consequently, in the refrigeration cycle device 10, at least the heat absorbed by the refrigerant from the heat medium in the chiller 141 can be radiated to the heat medium in the water-refrigerant heat exchanger 121.

Therefore, in the heating operation mode, the ventilation air can be heated in the heater core 53 to heat the vehicle compartment. During the heating operation mode, as illustrated in FIG. 25, the low-pressure refrigerant may flow into the internal evaporator 14 when the evaporator side expansion valve 13b is in a throttle state. Thus, the vehicle compartment can be dehumidified and heated.

(c) Battery Priority Cooling Mode

The battery priority cooling mode is an evaporation-side target object cooling mode in which at least the battery 80 that is an evaporation-side target object is cooled. In the battery priority cooling mode, the control device 70 closes the first battery side open-close valve 45a, closes the first bypass passage side open-close valve 45b, and opens the first radiator side open-close valve 45d. The control device 70 operates the first battery side water pump 42, operates the first radiator side water pump 42a, and brings the first vehicle-mounted device side flow rate regulation valve 44 into a fully opened state.

The control device 70 closes the second heater core side open-close valve 55. The control device 70 operates the second heat exchanger side water pump 52 and brings the second radiator side flow rate regulation valve 54 into a fully closed state. The control device 70 operates the compressor 11 while bringing at least the chiller side expansion valve 13a into a throttle state.

Therefore, as illustrated in FIG. 26, in the heat medium circuit 60 in the battery priority cooling mode, the heat medium pumped from the first battery side water pump 42 is circulated in an order of the heat medium passage 141b of the chiller 141, the coolant passage 80a of the battery 80, and the intake side of the first battery side water pump 42. The heat medium pumped from the first radiator side water pump 42a is circulated in an order of the heat medium passage 61a of the radiator 61, the coolant passage 81a of the vehicle-mounted device 81, and the intake side of the first radiator side water pump 42a.

Consequently, in the heat medium circuit 60, the exhaust heat of the battery 80 absorbed by the heat medium can be absorbed by the refrigerant in the chiller 141. The heat absorbed by the heat medium from the vehicle-mounted device 81 can be radiated to the outside air in the radiator 61.

In the heat medium circuit 60, the heat medium is circulated in the same manner as in the heating operation mode. Consequently, in the heat medium circuit 60, the heat of the high-pressure refrigerant absorbed by the heat medium in the water-refrigerant heat exchanger 121 can be radiated to the ventilation air in the heater core 53.

In the refrigeration cycle device 10, the refrigerant is circulated in the same manner as in the heating mode. Consequently, in the refrigeration cycle device 10, at least the heat absorbed by the refrigerant from the first heat medium in the chiller 141 can be radiated to the second heat medium in the water-refrigerant heat exchanger 121.

Therefore, in the battery priority cooling mode, the heat medium cooled in the heat medium passage 141b of the chiller 141 can be made to flow into the coolant passage 80a of the battery 80 to cool the battery 80. The heat medium cooled to come close to the outside air temperature in the heat medium passage 61a of the radiator 61 can be made to flow into the coolant passage 81a of the vehicle-mounted device 81 to cool the vehicle-mounted device 81.

As described above, according to the temperature adjusting device 1a of the present embodiment, the battery 80 and the vehicle-mounted device 81 can be cooled to restrict increases in the temperatures of the battery 80 and the vehicle-mounted device 81. The temperature of the ventilation air can be adjusted to cool, heat, and dehumidify and heat the vehicle compartment.

In the temperature adjusting device 1a of the present embodiment, a flowing direction of the heat medium flowing through the heat medium passage 61a of the radiator 61 during the cooling operation mode is different from a flowing direction of the heat medium flowing through the heat medium passage 61a during the heating operation mode. A flowing direction of the heat medium flowing through the coolant passage 81a of the vehicle-mounted device 81 during the cooling operation mode is the same as a flowing direction of the heat medium flowing through the coolant passage 81a of the vehicle-mounted device 81 during the heating operation mode.

Therefore, in the same manner as in the sixteenth embodiment, during the heating operation mode, an amount of heat absorbed by the heat medium from the vehicle-mounted device 81 is appropriately adjusted, and thus it is possible to efficiently heat the ventilation air.

In the temperature adjusting device 1a of the present embodiment, during the battery priority cooling mode, the switching unit is configured to switch a circuit configuration in which the heat medium cooled in the heat medium passage 141a of the chiller 141 flows into the coolant passage 80a of the battery 80 of the chiller 141. The switching unit is configured to switch a circuit configuration in which the heat medium flowing out of the coolant passage

80*a* bypasses the coolant passage 81*a* of the vehicle-mounted device 81 to be guided to the inlet side of the heat medium passage 141*a*.

Therefore, during the battery priority cooling mode, the battery 80 can be cooled by the first heat medium cooled in the chiller 141 without being affected by the exhaust heat of the vehicle-mounted device 81.

Nineteenth Embodiment

Figure 27:
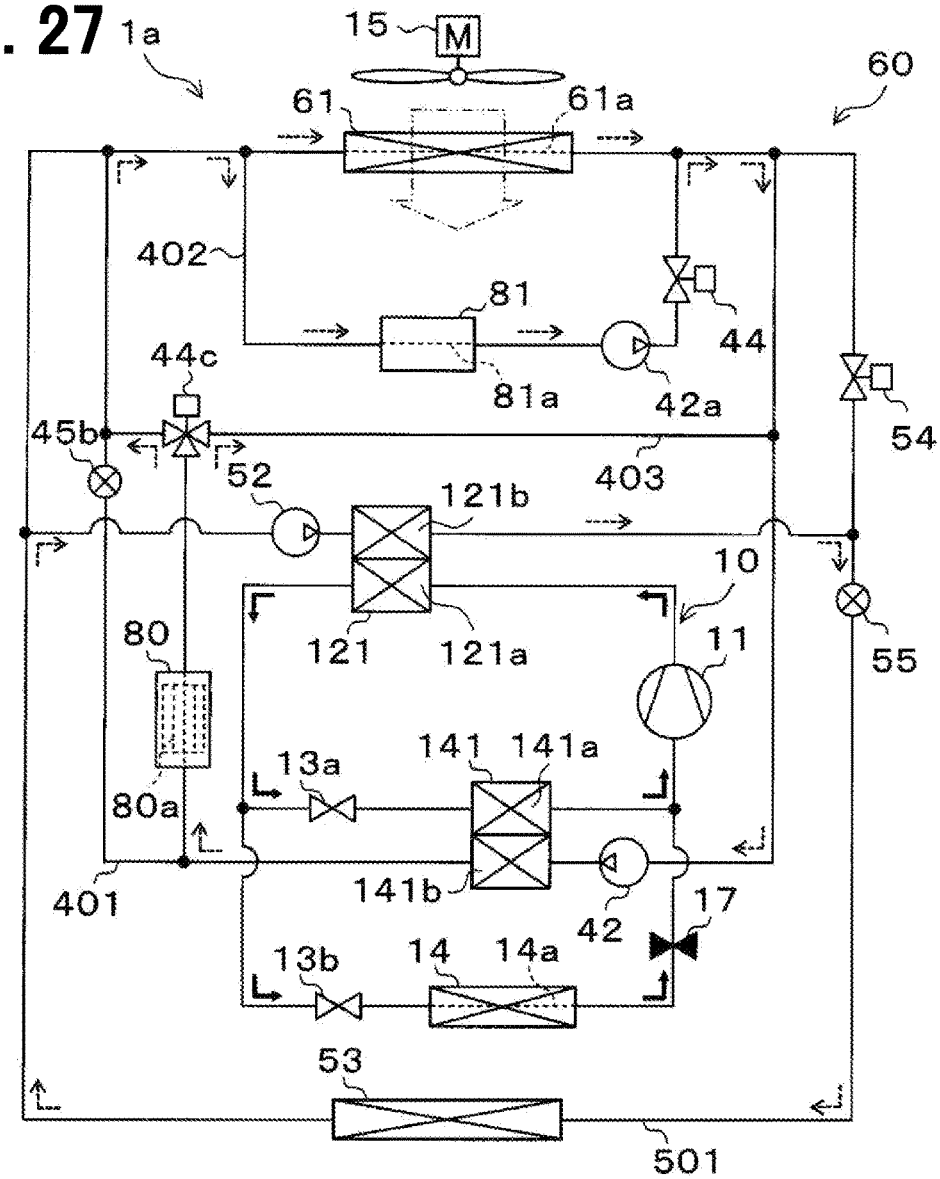
FIG. 27 is an overall configuration diagram of a temperature adjusting device during a heating operation mode in a nineteenth embodiment.

In the present embodiment, as illustrated in FIG. 27, a description will be made of an example in which the configuration of the heat medium circuit 60 is changed compared with the eighteenth embodiment. In the heat medium circuit 60 of the present embodiment, the first battery side open-close valve 45*a* and the first radiator side open-close valve 45*d* are omitted, and an evaporation-side flow-rate regulation valve 44*c* is added.

The evaporation-side flow-rate regulation valve 44*c* adjusts a flow rate ratio between a flow rate of the heat medium flowing into the inlet side of the heat medium passage 61*a* of the radiator 61 and a flow rate of the heat medium flowing into the inlet side of the heat medium passage 141*b* of the chiller 141 with respect to the heat medium flowing out of the coolant passage 80*a* of the battery 80.

The evaporation-side flow-rate regulation valve 44*c* may open and close at least one of the outflow port on the heat medium passage 61*a* side of the radiator 61 and the outflow port on the heat medium passage 141*b* side of the chiller 141 to switch circuit configurations of the first heat medium circuit 40. Therefore, the evaporation-side flow-rate regulation valve 44*c* is included in the switching unit. An operation of the evaporation-side flow-rate regulation valve 44*c* is controlled according to a control signal output from the control device 70. Remaining configurations are the same as those in the eighteenth embodiment.

Therefore, in the temperature adjusting device 1*a* of the present embodiment, switching to the same circuit as in the heating operation mode and the battery priority cooling mode described in the eighteenth embodiment can be performed, and the same operation as in the heating operation mode and the battery priority cooling mode can be performed. As illustrated in FIG. 27, the battery cooling switching mode may be executed.

In the battery cooling switching mode, the control device 70 closes the first bypass passage side open-close valve 45*b*. The control device 70 controls an operation of the evaporation-side flow-rate regulation valve 44*c* such that the heat medium flowing out of the coolant passage 80*a* of the battery 80 flows into both the heat medium passage 61*a* of the radiator 61 and the heat medium passage 141*b* and the chiller 141. Remaining operations are the same as those in the battery priority cooling mode described in the eighteenth embodiment.

Here, when the battery temperature TB increases and thus it is necessary to cool the battery 80 during the heating operation mode, it is conceivable to switch to the battery priority cooling mode. Specifically, an operation of the evaporation-side flow-rate regulation valve 44*c* corresponding to a switching unit may be controlled such that the entire flow rate of the heat medium flowing out of the coolant passage 80*a* of the battery 80 flows out toward the heat medium passage 141*b* side of the chiller 141. Consequently, the battery 80 can be cooled while heating the vehicle compartment.

However, if switching is simply performed from the heating operation mode to the battery priority cooling mode, the entire flow rate of the heat medium heated in the coolant passage 80*a* of the battery 80 flows into the heat medium passage 141*b* of the chiller 141.

Figure 28:
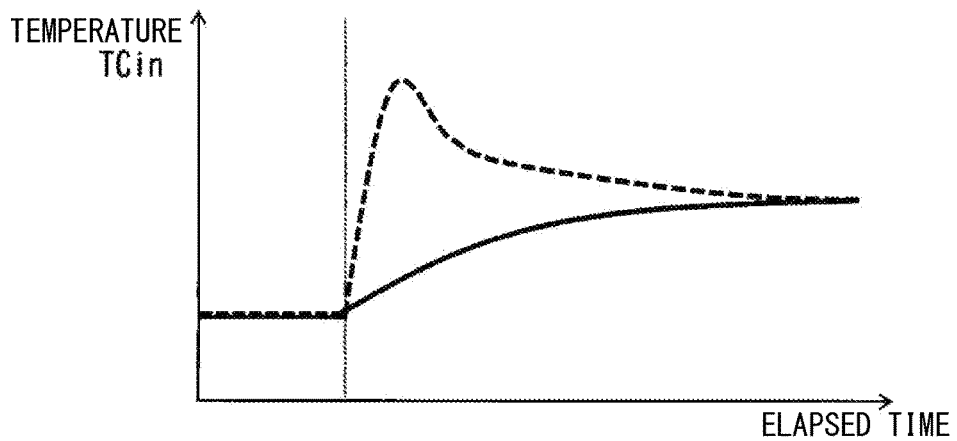
FIG. 28 is a graph illustrating a change in a temperature on a chiller inlet side during a battery cooling switching mode in the nineteenth embodiment.

Therefore, as indicated by a thick dashed line in FIG. 28, there is concern that a chiller inlet side temperature TCin that is the temperature of the heat medium flowing into the heat medium passage 141*b* of the chiller 141 may suddenly increase. Such a sudden increase in the chiller inlet side temperature TCin raises the pressure of the low-pressure refrigerant in the refrigeration cycle device 10, which hinders an efficient operation of the refrigeration cycle device 10.

In contrast, the temperature adjusting device 1*a* of the present embodiment includes the evaporation-side flow-rate regulation valve 44*c*. Thus, it is possible to change a mixing ratio between the heat medium flowing out of the coolant passage 80*a* of the battery 80 and the heat medium flowing out of the heat medium passage 61*a* of the radiator 61, to be mixed at the inlet side of the first battery side water pump 42.

Therefore, in a battery cooling switching mode, the mixing ratio of the heat media mixed at the inlet side of the first battery side water pump 42 can be changed by adjusting the opening degree of the evaporation-side flow-rate regulation valve 44*c*. The chiller inlet side temperature TCin can be adjusted.

As a result, as indicated by a thick solid line in FIG. 28, an operation of the evaporation-side flow-rate regulation valve 44*c* can be controlled such that the chiller inlet side temperature TCin does not suddenly increase. As a result, it is possible to restrict the refrigeration cycle device 10 from being inefficiently operated.

Twentieth Embodiment

Figure 29:
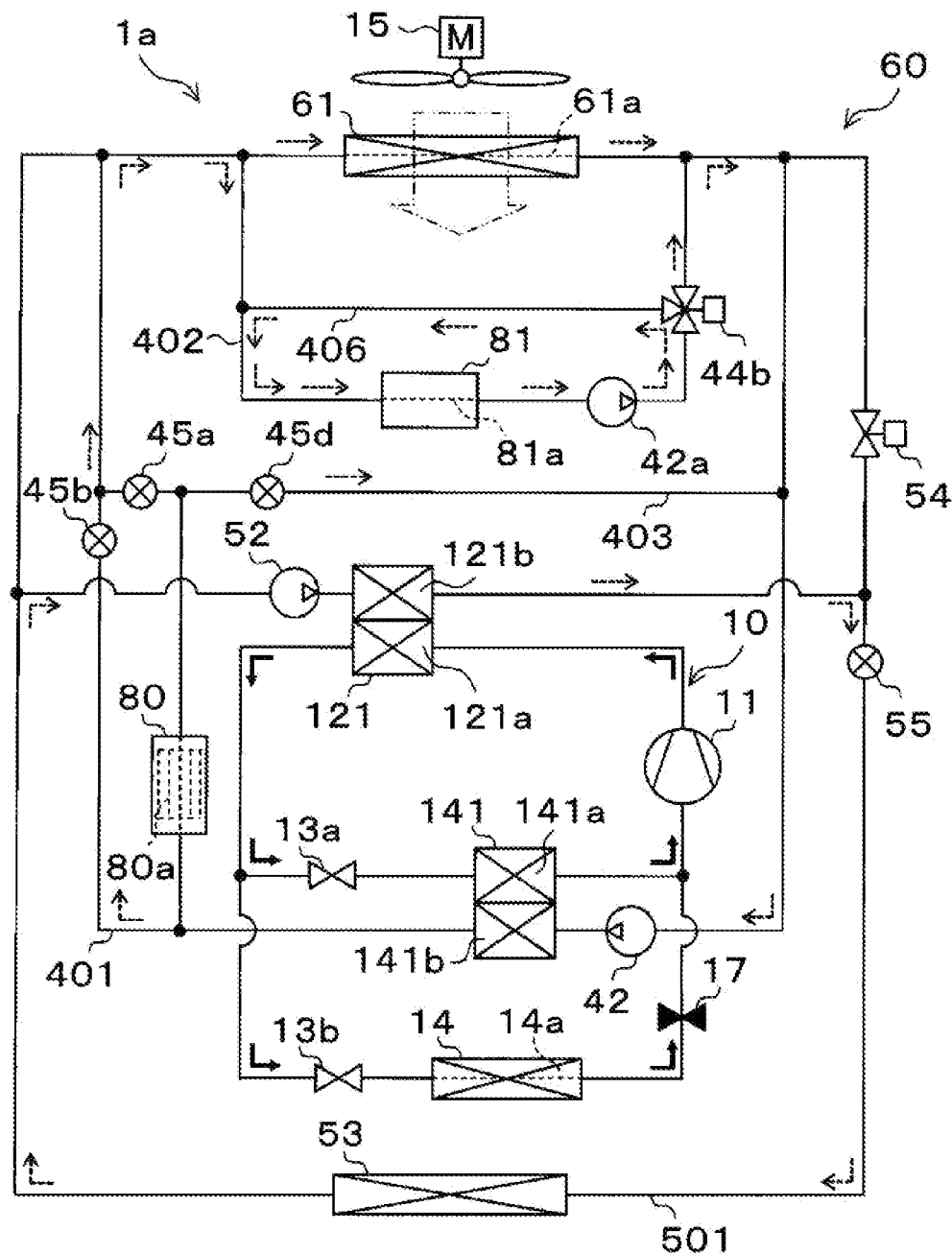
FIG. 29 is an overall configuration diagram of a temperature adjusting device during a heating operation mode in a twentieth embodiment.

In the present embodiment, as illustrated in FIG. 29, a description will be made of an example in which the configuration of the first heat medium circuit 40 is changed compared with the eighteenth embodiment. Specifically, the auxiliary bypass passage 406 and the auxiliary flow rate regulation valve 44*b* are added to the first heat medium circuit 40 of the present embodiment in the same manner as in the seventeenth embodiment. Remaining configurations are the same as those in the eighteenth embodiment.

Next, an operation of the temperature adjusting device 1*a* of the present embodiment having the above configuration will be described. In the temperature adjusting device 1*a* of the present embodiment, the auxiliary flow rate regulation valve 44*b* has the exactly same configuration as that in the eighteenth embodiment when the entire flow rate of the first heat medium pumped from the first radiator side water pump 42*a* flows out toward the intake side of the first battery side water pump 42. Therefore, the temperature adjusting device 1*a* of the present embodiment is operated in the same manner as in the eighteenth embodiment, and the same effect as that of the eighteenth embodiment can be achieved.

In the temperature adjusting device 1*a* of the present embodiment, it is possible to execute the device independent cooling mode in which the vehicle-mounted device 81 is cooled without cooling the battery 80.

The device independent cooling mode is executed, for example, when the battery temperature TB becomes low and it is not necessary to cool the battery 80 during the battery priority cooling mode described in the eighteenth embodiment.

In the device independent cooling mode, the control device 70 closes the first battery side open-close valve 45a, opens the first bypass passage side open-close valve 45b, and closes the first radiator side open-close valve 45d. The control device 70 operates the first battery side water pump 42 and operates the first radiator side water pump 42a.

The control device 70 closes the second heater core side open-close valve 55. The control device 70 operates the second heat exchanger side water pump 52 and brings the second radiator side flow rate regulation valve 54 into a fully opened state. The control device 70 operates the compressor 11 while bringing at least the chiller side expansion valve 13a into a throttle state. The control device 70 brings the auxiliary flow rate regulation valve 44b into an open state.

Therefore, as illustrated in FIG. 29, in the heat medium circuit 60 of the device independent cooling mode, the heat medium pumped from the first battery side water pump 42 is circulated in an order of the heat medium passage 141b of the chiller 141, the heat medium passage 61a of the radiator 61, and the intake side of the first battery side water pump 42. The heat medium is circulated in an order of the heat medium passage 141b of the chiller 141, the coolant passage 81a of the vehicle-mounted device 81, and the intake side of the first battery side water pump 42.

A part of the heat medium pumped from the first radiator side water pump 42a is returned to the inlet side of the coolant passage 81a of the vehicle-mounted device 81 through the auxiliary bypass passage 406. The heat medium returned to the inlet side of the coolant passage 81a of the vehicle-mounted device 81 merges with the heat medium cooled in the heat medium passage 141b of the chiller 141.

Consequently, in the heat medium circuit 60, the heat absorbed by the heat medium from the outside air in the radiator 61 and the exhaust heat absorbed from the vehicle-mounted device 81 can be radiated to the low-pressure refrigerant in the chiller 141.

In the heat medium circuit 60, the heat medium pumped from the second heat exchanger side water pump 52 is circulated in the same manner as in the battery priority cooling mode of the eighteenth embodiment. Consequently, in the heat medium circuit 60, the heat of the high-pressure refrigerant absorbed by the heat medium in the water-refrigerant heat exchanger 121 can be radiated to the ventilation air in the heater core 53.

In the refrigeration cycle device 10, the refrigerant discharged from the compressor 11 is circulated in the same manner as in the battery priority cooling mode of the eighteenth embodiment. Consequently, in the refrigeration cycle device 10, at least the heat absorbed by the refrigerant from the heat medium in the chiller 141 can be radiated to the heat medium in the water-refrigerant heat exchanger 121.

Therefore, in the device independent cooling mode, the first heat medium cooled in the chiller 141 can be made to flow into the coolant passage 81a of the vehicle-mounted device 81 to cool the vehicle-mounted device 81.

As described above, according to the temperature adjusting device 1 of the present embodiment, the battery 80 and the vehicle-mounted device 81 can be cooled to restrict increases in the temperatures of the battery 80 and the vehicle-mounted device 81. The temperature of the ventilation air can be adjusted to cool, heat, and dehumidify and heat the vehicle compartment.

In addition thereto, the temperature adjusting device 1 of the present embodiment includes the auxiliary bypass passage 406 and the auxiliary flow rate regulation valve 44b, and thus a sudden fluctuation in the temperature of the vehicle-mounted device 81 can be restricted when operation modes are switched.

More specifically, for example, it is assumed, when the temperature adjusting device 1a of the present embodiment is operated in the battery priority cooling mode described in the eighteenth embodiment, the battery temperature TB becomes low and thus it is not necessary to cool the battery 80. In such a case, it is conceivable to switch to the device independent cooling mode.

In order to switch the battery priority cooling mode to the device independent cooling mode, the first battery side open-close valve 45a corresponding to the switching unit may be closed, and the first bypass passage side open-close valve 45b may be opened. Consequently, it is possible to restrict unnecessary cooling of the battery 80.

However, if the first battery side open-close valve 45a is simply closed and the first bypass passage side open-close valve 45b is opened, the first heat medium cooled in the heat medium passage 141b of the chiller 141 flows into the coolant passage 81a of the vehicle-mounted device 81 without absorbing the exhaust heat of the battery 80. Thus, as described in FIG. 23 of the seventeenth embodiment, there is concern that the vehicle-mounted device inlet side temperature TMin may suddenly decrease to be lower than a lower limit value of an appropriate temperature range of the vehicle-mounted device 81.

In contrast, the temperature adjusting device 1a of the present embodiment includes the auxiliary bypass passage 406 and the auxiliary flow rate regulation valve 44b. Therefore, in the same manner as in the seventeenth embodiment, the auxiliary flow rate regulation valve 44b can change a flow rate of the heat medium returned to the inlet side of the coolant passage 81a of the vehicle-mounted device 81. As a result, it is possible to restrict the vehicle-mounted device 81 from being excessively cooled and thus to maintain the temperature of the vehicle-mounted device 81 within the appropriate temperature range.

Twenty-First Embodiment

Figure 30:
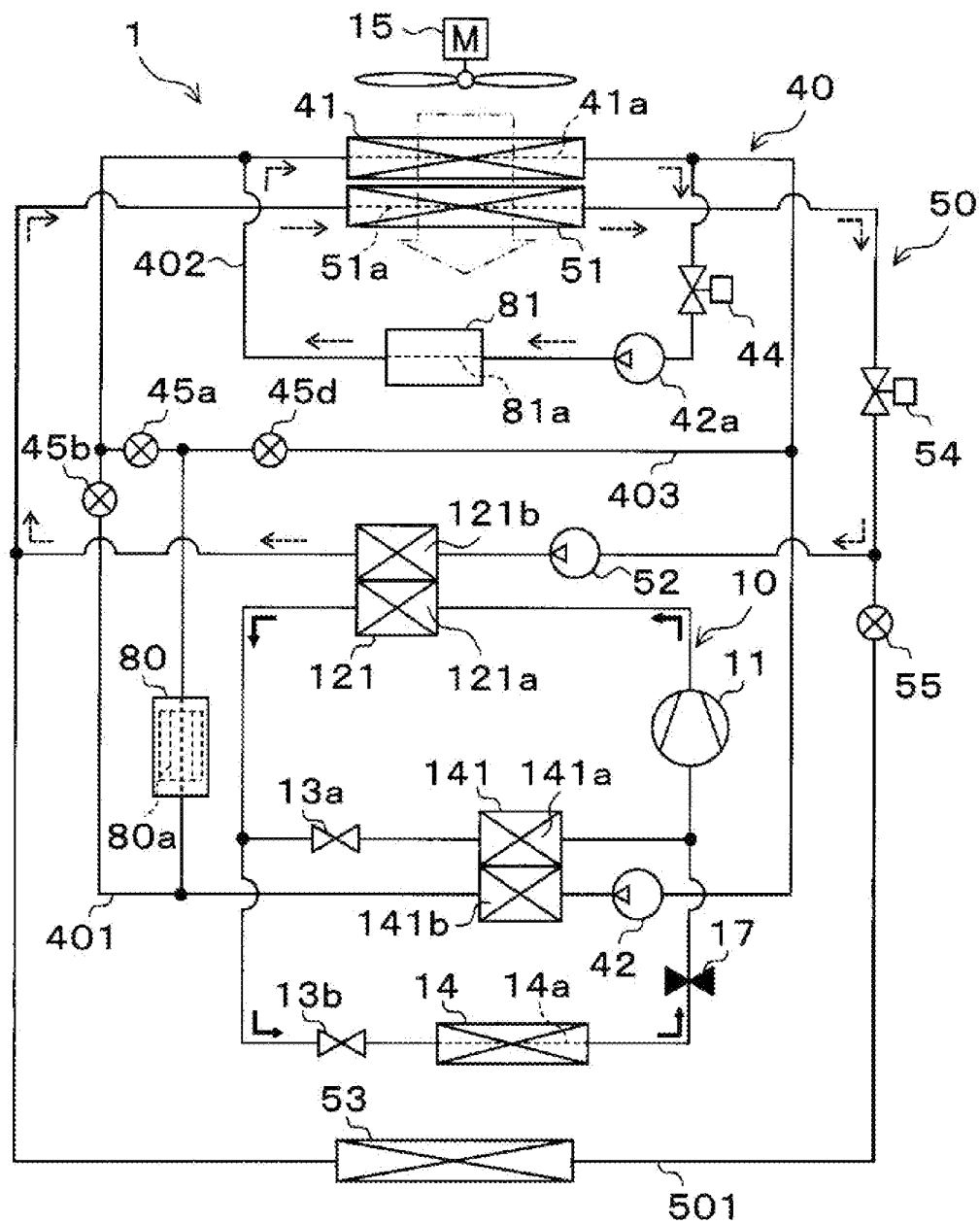
FIG. 30 is an overall configuration diagram of a temperature adjusting device during a cooling operation mode in a twenty-first embodiment.
Figure 31:
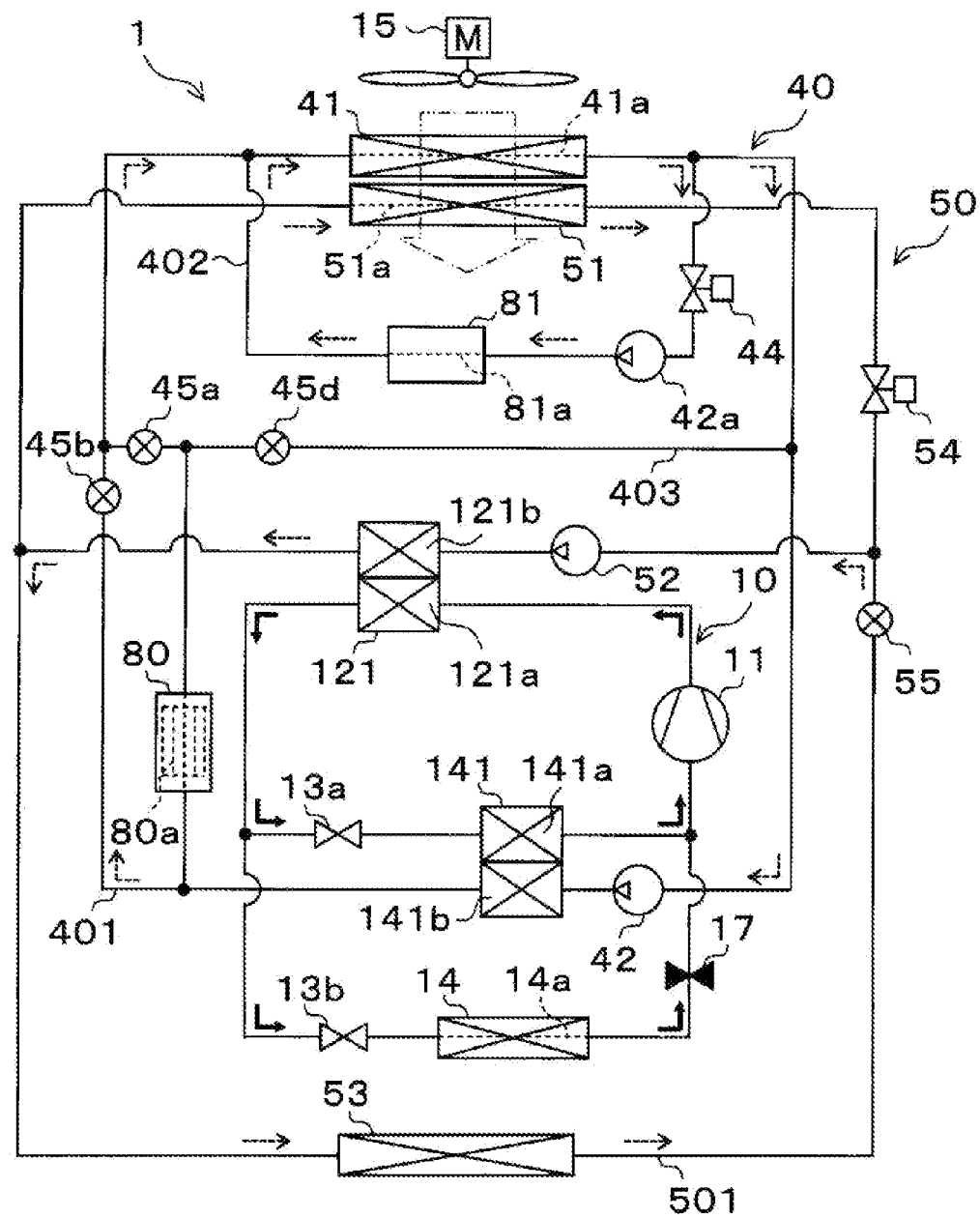
FIG. 31 is an overall configuration diagram of the temperature adjusting device during the heating operation mode of the twenty-first embodiment.

As illustrated in FIGS. 30 and 31, in the temperature adjusting device 1 of the present embodiment, a description will be made of an example in which the configuration of the second heat medium circuit 50 is changed compared with the eleventh embodiment.

Specifically, in the present embodiment, disposition of the second heat exchanger side water pump 52 of the second heat medium circuit 50 is changed compared with the eleventh embodiment. More specifically, the disposition is changed such that, during the cooling operation mode, a flowing direction of the first heat medium flowing through the first heat medium passage 41a of the first radiator 41 is the same as a flowing direction of the second heat medium flowing through the second heat medium passage 51a of the second radiator 51.

Remaining configurations are the same as those in the eleventh embodiment. In the present embodiment, the vehicle-mounted device 81 is an outside-air-side target object, and the coolant passage 81a of the vehicle-mounted device 81 is an outside-air-side target-object heat exchanger. The battery 80 is an evaporation-side target object, and the coolant passage 80a of the battery 80 is an evaporation-side target-object heat exchanger.

The first battery side open-close valve 45a, the first bypass passage side open-close valve 45b, and the first radiator side open-close valve 45d are a first switching unit.

The second heater core side open-close valve 55 and the second radiator side flow rate regulation valve 54 are a second switching unit.

Next, an operation of the temperature adjusting device 1 of the present embodiment having the above configuration will be described. A fundamental operation of the temperature adjusting device 1 of the present embodiment is the same as that in the eleventh embodiment. Therefore, in the present embodiment, a description of an operation mode for cooling the battery 80 will be omitted, and the cooling operation mode and the heating operation mode will be described.

(a) Cooling Operation Mode

In the cooling operation mode, the control device 70 closes the first battery side open-close valve 45a, closes the first bypass passage side open-close valve 45b, and closes the first radiator side open-close valve 45d. The control device 70 stops the first battery side water pump 42, operates the first radiator side water pump 42a, and brings the first vehicle-mounted device side flow rate regulation valve 44 into an open state.

The control device 70 closes the second heater core side open-close valve 55. The control device 70 operates the second heat exchanger side water pump 52 and brings the second radiator side flow rate regulation valve 54 into an open state. The control device 70 operates the compressor 11 while bringing the evaporator side expansion valve 13b into a throttle state.

Therefore, as illustrated in FIG. 30, in the first heat medium circuit 40 in the cooling operation mode, the first heat medium pumped from the first radiator side water pump 42a is circulated in an order of the first heat medium passage 41a of the first radiator 41, the coolant passage 81a of the vehicle-mounted device 81, and the intake side of the first radiator side water pump 42a.

Consequently, in the first heat medium circuit 40, the exhaust heat of the vehicle-mounted device 81 absorbed by the first heat medium can be radiated to the outside air blown from the external blower 15 in the first radiator 41. In this case, in the first heat medium passage 41a of the first radiator 41, the first heat medium flows from the upper side to the lower side.

In the second heat medium circuit 50, the second heat medium pumped from the second heat exchanger side water pump 52 is circulated in an order of the heat medium passage 121b of the water-refrigerant heat exchanger 121, the second heat medium passage 51a of the second radiator 51, and the intake side of the second heat exchanger side water pump 52.

Consequently, in the second heat medium circuit 50, the heat of the high-pressure refrigerant absorbed by the second heat medium in the water-refrigerant heat exchanger 121 can be radiated to the outside air that has passed through the first radiator 41 in the second radiator 51.

In this case, in the second heat medium passage 51a of the second radiator 51, the second heat medium flows from the upper side to the lower side. That is, a flowing direction of the first heat medium flowing through the first heat medium passage 41a of the first radiator 41 is the same as a flowing direction of the second heat medium flowing through the second heat medium passage 51a of the second radiator 51.

In the refrigeration cycle device 10, the refrigerant is circulated in the same manner as in the sixteenth embodiment. Consequently, in the refrigeration cycle device 10, the heat absorbed by the refrigerant from the ventilation air in the internal evaporator 14 can be radiated to the second heat medium in the water-refrigerant heat exchanger 121.

Therefore, in the cooling operation mode, the ventilation air can be cooled in the internal evaporator 14 to cool the vehicle compartment. The vehicle-mounted device 81 can be cooled without being affected by an operation state of the refrigeration cycle device 10.

(b) Heating Operation Mode

In the heating operation mode, the control device 70 closes the first battery side open-close valve 45a, opens the first bypass passage side open-close valve 45b, and closes the first radiator side open-close valve 45d. The control device 70 operates the first battery side water pump 42, operates the first radiator side water pump 42a, and brings the first vehicle-mounted device side flow rate regulation valve 44 into an open state.

The control device 70 opens the second heater core side open-close valve 55. The control device 70 operates the second heat exchanger side water pump 52 and brings the second radiator side flow rate regulation valve 54 into a fully closed state. The control device 70 operates the compressor 11 while bringing at least the chiller side expansion valve 13a into a throttle state.

Therefore, as illustrated in FIG. 31, in the first heat medium circuit 40 in the heating operation mode, the first heat medium pumped from the first battery side water pump 42 is circulated in an order of the heat medium passage 141b of the chiller 141, the first heat medium passage 41a of the first radiator 41, and the intake side of the first battery side water pump 42.

The first heat medium pumped from the first radiator side water pump 42a is circulated in an order of the coolant passage 81a of the vehicle-mounted device 81, the first heat medium passage 41a of the first radiator 41, and the intake side of the first radiator side water pump 42a.

That is, in the first heat medium circuit 40 in the heating operation mode, the first heat medium pumped from the first battery side water pump 42 flows into the heat medium passage 141b of the chiller 141 and is cooled. The first heat medium cooled in the heat medium passage 141b merges with the first heat medium heated in the coolant passage 81a of the vehicle-mounted device 81 and flows into the first heat medium passage 41a of the first radiator 41.

The heat medium that has flowed into the first heat medium passage 41a exchanges heat with the outside air blown from the external blower 15. Consequently, the temperature of the first heat medium flowing out of the first heat medium passage 41a comes close to the outside air temperature.

A part of the first heat medium that has reached the outside air temperature is sucked into the first radiator side water pump 42a and is pumped to the coolant passage 81a of the vehicle-mounted device 81. The first heat medium that has flowed into the coolant passage 81a absorbs the exhaust heat of the vehicle-mounted device 81. Consequently, the vehicle-mounted device 81 is cooled. The first heat medium flowing out of the coolant passage 81a merges with the first heat medium cooled in the chiller 141 and flows into the first heat medium passage 41a of the first radiator 41 again.

Therefore, in the first heat medium circuit 40 in the heating operation mode, the first heat medium cooled in the heat medium passage 141b of the chiller 141 and the first heat medium heated in the coolant passage 81a of the vehicle-mounted device 81 are mixed with each other and flow into the first heat medium passage 41a of the first radiator 41.

On the other hand, the residual first heat medium that has reached the outside air temperature is sucked into the first battery side water pump 42 and is pumped to the heat medium passage 141b of the chiller 141. The heat of the first heat medium that has flowed into the heat medium passage 141b is absorbed by the low-pressure refrigerant. Consequently, the first heat medium is cooled. The first heat medium flowing out of the heat medium passage 141b merges with the first heat medium flowing out of the coolant passage 81a of the vehicle-mounted device 81 and flows into the first heat medium passage 41a of the first radiator 41.

In this case, a flowing direction of the first heat medium flowing through the coolant passage 81a of the vehicle-mounted device 81 is the same as a flowing direction during the cooling operation mode.

In the second heat medium circuit 50, the second heat medium pumped from the second heat exchanger side water pump 52 is circulated in an order of the heat medium passage 121b of the water-refrigerant heat exchanger 121, the heater core 53, and the intake side of the second heat exchanger side water pump 52. Consequently, in the second heat medium circuit 50, the heat of the high-pressure refrigerant absorbed by the second heat medium in the water-refrigerant heat exchanger 121 can be radiated to the ventilation air in the heater core 53.

Therefore, in the heating operation mode, the ventilation air can be heated in the heater core 53 to heat the vehicle compartment. During the heating operation mode, the low-pressure refrigerant may flow into the internal evaporator 14 while bringing the evaporator side expansion valve 13b into a throttle state. Thus, the vehicle compartment can be dehumidified and heated. Remaining operations are the same as those in the eleventh embodiment.

As described above, according to the temperature adjusting device 1 of the present embodiment, the vehicle-mounted device 81 can be cooled to restrict an increase in the temperature of the vehicle-mounted device 81. Of course, in the same manner as in the eleventh embodiment, the battery 80 can be cooled to restrict an increase in the temperature of the battery 80. The temperature of the ventilation air can be adjusted to cool, heat, and dehumidify and heat the vehicle compartment.

According to the temperature adjusting device 1 of the present embodiment, during the cooling operation mode, a flowing direction of the first heat medium flowing through the first heat medium passage 41a of the first radiator 41 is the same as a flowing direction of the second heat medium flowing through the second heat medium passage 51a of the second radiator 51. That is, the flow of the first heat medium flowing through the first radiator 41 and the flow of the second heat medium flowing through the second radiator 51 are so-called parallel flows.

Therefore, in the same manner as in the sixteenth embodiment, the heat exchange efficiency between the second heat medium flowing through the second radiator 51 and the outside air can be improved, and the ventilation air can be cooled efficiently.

A flowing direction of the first heat medium flowing through the coolant passage 81a of the vehicle-mounted device 81 during the cooling operation mode is the same as a flowing direction of the first heat medium flowing through the coolant passage 81a during the heating operation mode.

Therefore, in both the cooling operation mode and the heating operation mode, the first heat medium having the temperature of the outside air flowing out of the first radiator 41 can be made to flow into the coolant passage 81a of the vehicle-mounted device 81. As a result, even if the cooling operation mode and the heating operation mode are switched, the temperature of the vehicle-mounted device 81 can be reliably and stably maintained to be the outside air temperature regardless of an operation state of the refrigeration cycle device 10.

Twenty-Second Embodiment

Figure 32:
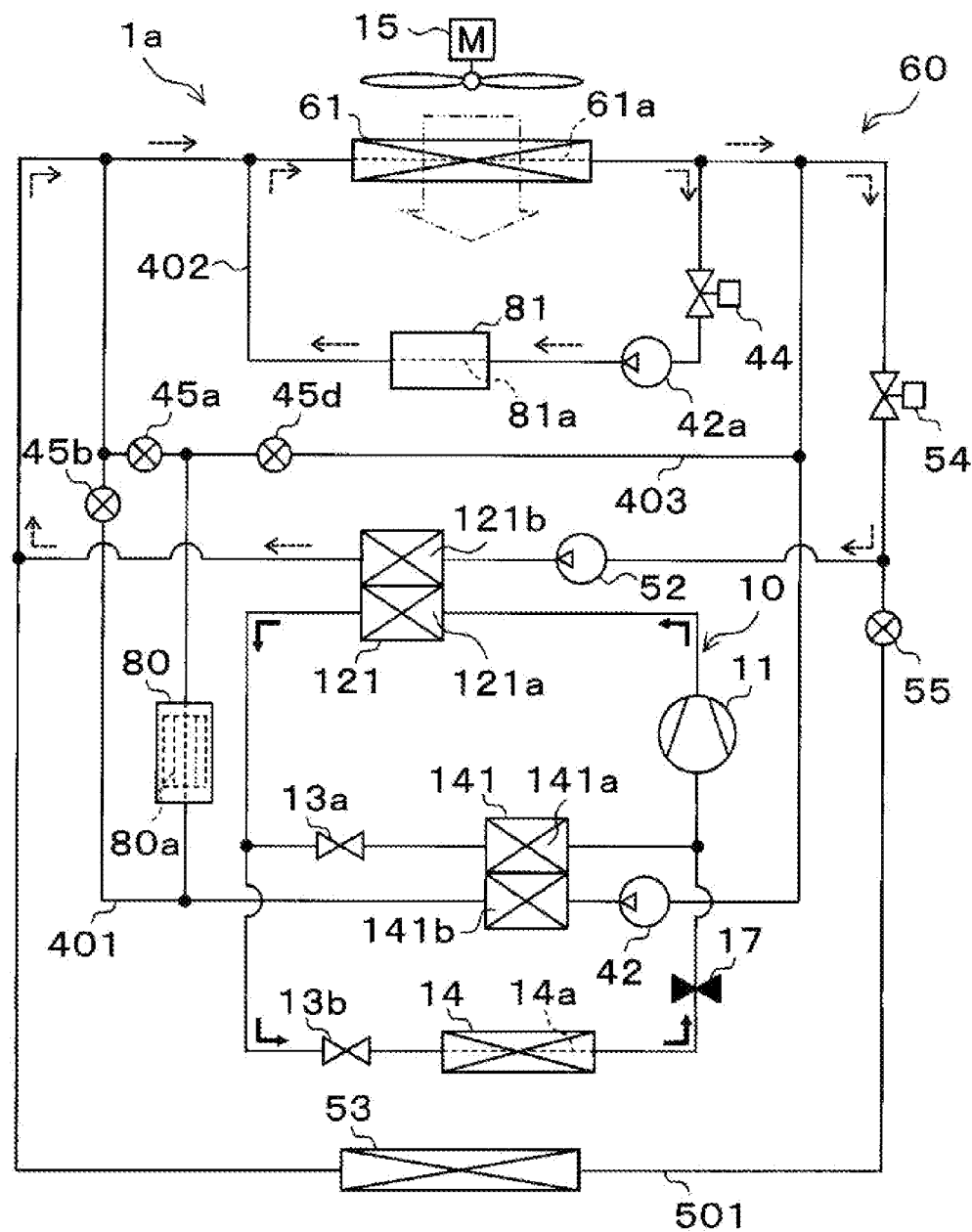
FIG. 32 is an overall configuration diagram of a temperature adjusting device during a cooling operation mode in a twenty-second embodiment.
Figure 33:
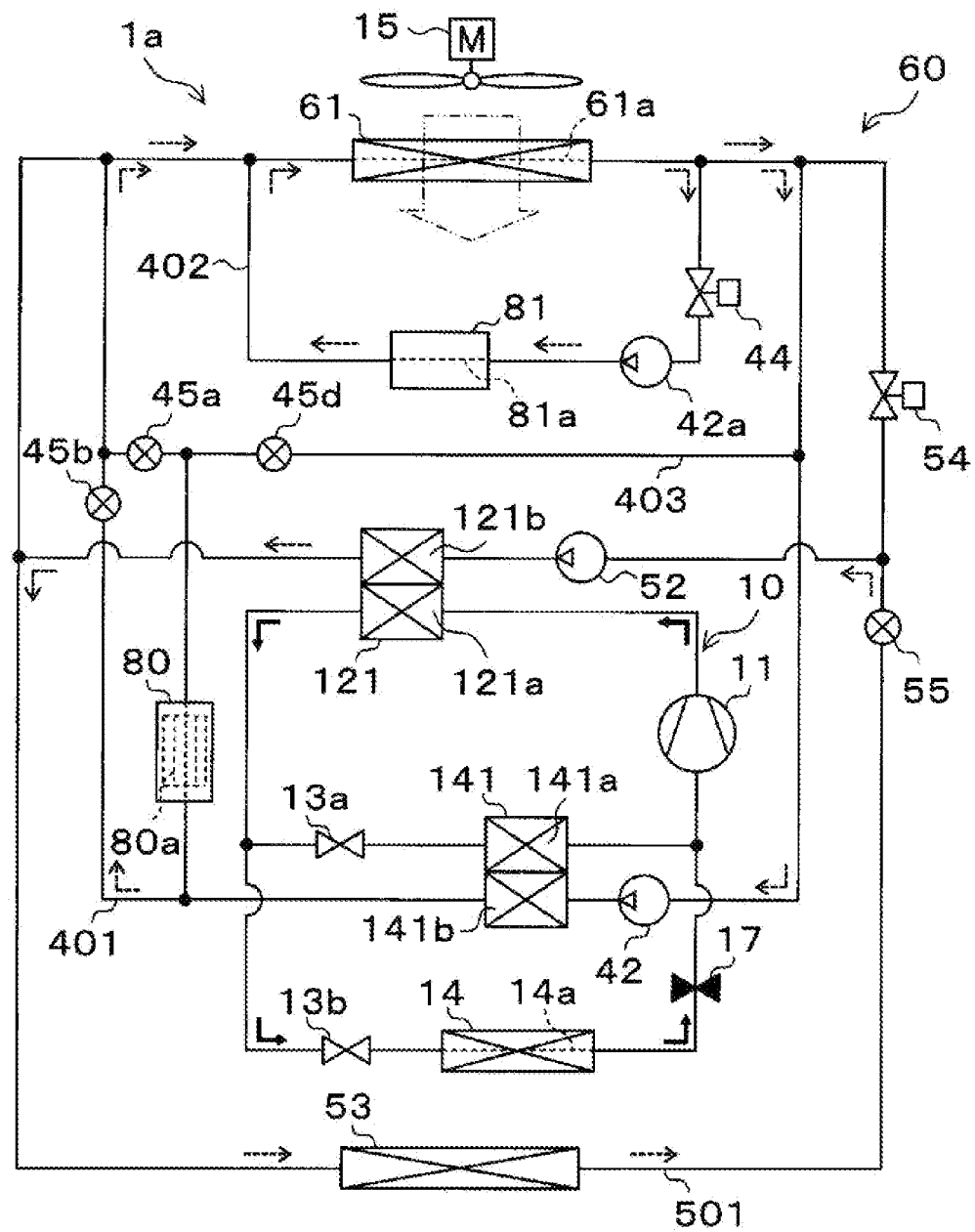
FIG. 33 is an overall configuration diagram of the temperature adjusting device during a heating operation mode in the twenty-second embodiment.

In the present embodiment, as illustrated in FIGS. 32 and 33, a description will be made of a temperature adjusting device 1a in which the configurations of the first heat medium circuit 40 and the second heat medium circuit 50 described in the twenty-first embodiment are changed. In the temperature adjusting device 1a of the present embodiment, a single radiator 61 is connected to a single heat medium circuit 60 in the same manner as in the eighteenth embodiment. Remaining configurations are the same as those in the eighteenth embodiment.

Thus, in the present embodiment, the vehicle-mounted device 81 is an outside-air-side target object, and the coolant passage 81a of the vehicle-mounted device 81 is an outside-air-side target-object heat exchanger. The battery 80 is an evaporation-side target object, and the coolant passage 80a of the battery 80 is an evaporation-side target-object heat exchanger. The first battery side open-close valve 45a, the first bypass passage side open-close valve 45b on, the first radiator side open-close valve 45d, the second heater core side open-close valve 55, and the second radiator side flow rate regulation valve 54 correspond to a switching unit.

Next, an operation of the temperature adjusting device 1a of the present embodiment having the above configuration will be described. A fundamental operation of the temperature adjusting device 1a of the present embodiment is the same as that of the temperature adjusting device 1 of the twenty-first embodiment. Operations in the cooling operation mode and the heating operation mode will be described.

(a) Cooling Operation Mode

In the cooling operation mode, the control device 70 closes the first battery side open-close valve 45a, closes the first bypass passage side open-close valve 45b, and closes the first radiator side open-close valve 45d. The control device 70 stops the first battery side water pump 42, operates the first radiator side water pump 42a, and brings the first vehicle-mounted device side flow rate regulation valve 44 into an open state.

The control device 70 closes the second heater core side open-close valve 55. The control device 70 operates the second heat exchanger side water pump 52 and brings the second radiator side flow rate regulation valve 54 into an open state. The control device 70 operates the compressor 11 while bringing the evaporator side expansion valve 13b into a throttle state.

Therefore, as illustrated in FIG. 32, in the heat medium circuit 60 of the cooling operation mode, the heat medium pumped from the first radiator side water pump 42a is circulated in an order of the heat medium passage 61a of the radiator 61, the coolant passage 81a of the vehicle-mounted device 81, and the intake side of the first radiator side water pump 42a.

The heat medium pumped from the second heat exchanger side water pump 52 is circulated in an order of the heat medium passage 121b of the water-refrigerant heat exchanger 121, the heat medium passage 61a of the radiator 61, and the intake side of the second heat exchanger side water pump 52.

Consequently, in the heat medium circuit 60, the exhaust heat of the vehicle-mounted device 81 absorbed by the heat medium in the coolant passage 81a and the heat of the high-pressure refrigerant absorbed by the heat medium in the heat medium passage 121b of the water-refrigerant heat exchanger 121 can be radiated to the outside air in the radiator 61. In this case, the heat medium flows from the upper side to the lower side in the heat medium passage 61a of the radiator 61.

In the refrigeration cycle device 10, the high-pressure refrigerant discharged from the compressor 11 is circulated in the same manner as in the eighteenth embodiment. Consequently, in the refrigeration cycle device 10, the heat absorbed by the refrigerant from the ventilation air in the internal evaporator 14 can be radiated to the heat medium in the water-refrigerant heat exchanger 121.

Therefore, in the cooling operation mode, the air ventilation air can be cooled in the internal evaporator 14 to cool the vehicle compartment. The vehicle-mounted device 81 can be cooled.

(b) Heating Operation Mode

In the heating operation mode, the control device 70 closes the first battery side open-close valve 45a, opens the first bypass passage side open-close valve 45b, and closes the first radiator side open-close valve 45d. The control device 70 operates the first battery side water pump 42, operates the first radiator side water pump 42a, and brings the first vehicle-mounted device side flow rate regulation valve 44 into an open state.

The control device 70 opens the second heater core side open-close valve 55. The control device 70 operates the second heat exchanger side water pump 52 and brings the second radiator side flow rate regulation valve 54 into a fully closed state. The control device 70 operates the compressor 11 while bringing at least the chiller side expansion valve 13a into a throttle state.

Therefore, as illustrated in FIG. 33, in the heat medium circuit 60 in the heating operation mode, the heat medium pumped from the first battery side water pump 42 is circulated in an order of the heat medium passage 141b of the chiller 141, the heat medium passage 61a of the radiator 61, and the intake side of the first battery side water pump 42.

The heat medium pumped from the first radiator side water pump 42a is circulated in an order of the coolant passage 81a of the vehicle-mounted device 81, the heat medium passage 61a of the radiator 61, and the intake side of the first radiator side water pump 42a.

That is, in the heat medium circuit 60 in the heating operation mode, the heat medium pumped from the first battery side water pump 42 flows into the heat medium passage 141b of the chiller 141 and is cooled. The heat medium cooled in the heat medium passage 141b merges with the heat medium heated in the coolant passage 81a of the vehicle-mounted device 81 and flows into the heat medium passage 61a of the radiator 61.

The heat medium that has flowed into the heat medium passage 61a exchanges heat with the outside air blown from the external blower 15. Consequently, the heat medium flowing out of the heat medium passage 61a reaches the outside air temperature.

A part of the heat medium that has reached the outside air temperature is sucked into the first radiator side water pump 42a and is pumped to the coolant passage 81a of the vehicle-mounted device 81. The heat medium that has flowed into the coolant passage 81a absorbs the exhaust heat of the vehicle-mounted device 81. Consequently, the vehicle-mounted device 81 is cooled. The heat medium flowing out of the coolant passage 81a merges with the heat medium cooled in the chiller 141 and flows into the heat medium passage 61a of the radiator 61.

Thus, in the heat medium circuit 60, the heat medium cooled in the heat medium passage 141b of the chiller 141 and the heat medium heated in the coolant passage 81a of the vehicle-mounted device 81 are mixed with each other and flow into the heat medium passage 61a of the radiator 61.

On the other hand, the residual heat medium that has reached the outside air temperature is sucked into the first battery side water pump 42 and is pumped to the heat medium passage 141b of the chiller 141. The heat of the heat medium that has flowed into the heat medium passage 141b is absorbed by the low-pressure refrigerant. Consequently, the heat medium is cooled. The heat medium flowing out of the heat medium passage 141b merges with the heat medium flowing out of the coolant passage 81a of the vehicle-mounted device 81 and flows into the heat medium passage 61a of the radiator 61.

In this case, a flowing direction of the heat medium flowing through the coolant passage 81a of the vehicle-mounted device 81 is the same as a flowing direction during the cooling operation mode.

In the heat medium circuit 60, the heat medium pumped from the second heat exchanger side water pump 52 is circulated in an order of the heat medium passage 121b of the water-refrigerant heat exchanger 121, the heater core 53, and the intake side of the second heat exchanger side water pump 52. Consequently, in the heat medium circuit 60, the heat of the high-pressure refrigerant absorbed by the heat medium in the water-refrigerant heat exchanger 121 can be radiated to the ventilation air in the heater core 53.

Therefore, in the heating operation mode, the ventilation air can be heated in the heater core 53 to heat the vehicle compartment. During the heating operation mode, the low-pressure refrigerant may flow into the internal evaporator 14 while bringing the evaporator side expansion valve 13b into a throttle state. Thus, the vehicle compartment can be dehumidified and heated.

As described above, according to the temperature adjusting device 1a of the present embodiment, the vehicle-mounted device 81 can be cooled to restrict an increase in the temperature of the vehicle-mounted device 81. Of course, in the same manner as in the eleventh embodiment, the battery 80 can be cooled to restrict an increase in the temperature of the battery 80. The temperature of the ventilation air can be adjusted to cool, heat, and dehumidify and heat the vehicle compartment.

According to the temperature adjusting device 1a of the present embodiment, a flowing direction of the heat medium flowing through the coolant passage 81a of the vehicle-mounted device 81 during the cooling operation mode is the same as a flowing direction of the heat medium flowing through the coolant passage 81a during the heating operation mode.

Therefore, in both the cooling operation mode and the heating operation mode, the heat medium having the temperature of the outside air flowing out of the radiator 61 can be made to flow into the coolant passage 81a of the vehicle-mounted device 81. As a result, even if the cooling operation mode and the heating operation mode are switched, the temperature of the vehicle-mounted device 81 can be reliably and stably maintained to be the outside air temperature regardless of an operation state of the refrigeration cycle device 10.

The present disclosure is not limited to the above-described embodiments and may be variously modified as follows without departing from the spirit of the present disclosure.

In the above-described embodiments, an example in which the temperature adjusting devices 1 and 1*a* are applied to a vehicle has been described, but an application of the temperature adjusting devices 1 and 1*a* is not limited thereto. For example, the temperature adjusting devices 1 and 1*a* may be applied to an air conditioner having a server cooling function that air-conditions a room where a server is housed while appropriately adjusting the temperature of the server (computer).

In the above-described first embodiment, an example in which the heat medium passage 41*a* of the radiator 41 is employed as a heat radiation portion has been described, but the heat radiation portion is not limited thereto.

For example, multiple heat radiation fins disposed on an outer surface of the battery 80 may be employed as the heat radiation portion. That is, the exhaust heat of the battery 80 may be directly radiated from the heat radiation fins to the outside air without using a heat medium. In this case, the condenser 12 may exchange heat between the outside air heated by passing between the multiple heat radiation fins and the refrigerant.

A constituent device of each of the first heat medium circuit 40, the second heat medium circuit 50, and the heat medium circuit 60 is not limited to that described in the above embodiments.

For example, multiple open-close valves or flow rate regulation valves configuring the first switching unit, the second switching unit, and the switching unit may be integrated as appropriate. For example, the first battery side open-close valve 45*a* and the first bypass passage side open-close valve 45*b* described in the third embodiment may be integrated as a three-way valve as long as the circuit configuration of the first heat medium circuit 40 can be switched in the same manner as in the third embodiment.

In the above-described embodiments, an example in which the first radiator 41 and the second radiator 51 have the same area of the heat exchangers has been described, but the present disclosure is not limited thereto. For example, an area of the heat exchanger of the second radiator 51 may be larger than an area of that of the first radiator 41. Heat may be exchanged between at least part of the outside air flowing out of the first radiator 41 and the second heat medium in the second radiator 51.

In the first to seventeenth and twenty-first embodiments described above, an example in which the first radiator 41 and the second radiator 51 are configured as separately from and are disposed close to each other has been described, but the present disclosure is not limited thereto. For example, as illustrated in FIGS. 34 and 35, the first radiator 41 and the second radiator 51 may be integrated as a composite heat exchanger 611.

Figure 34:
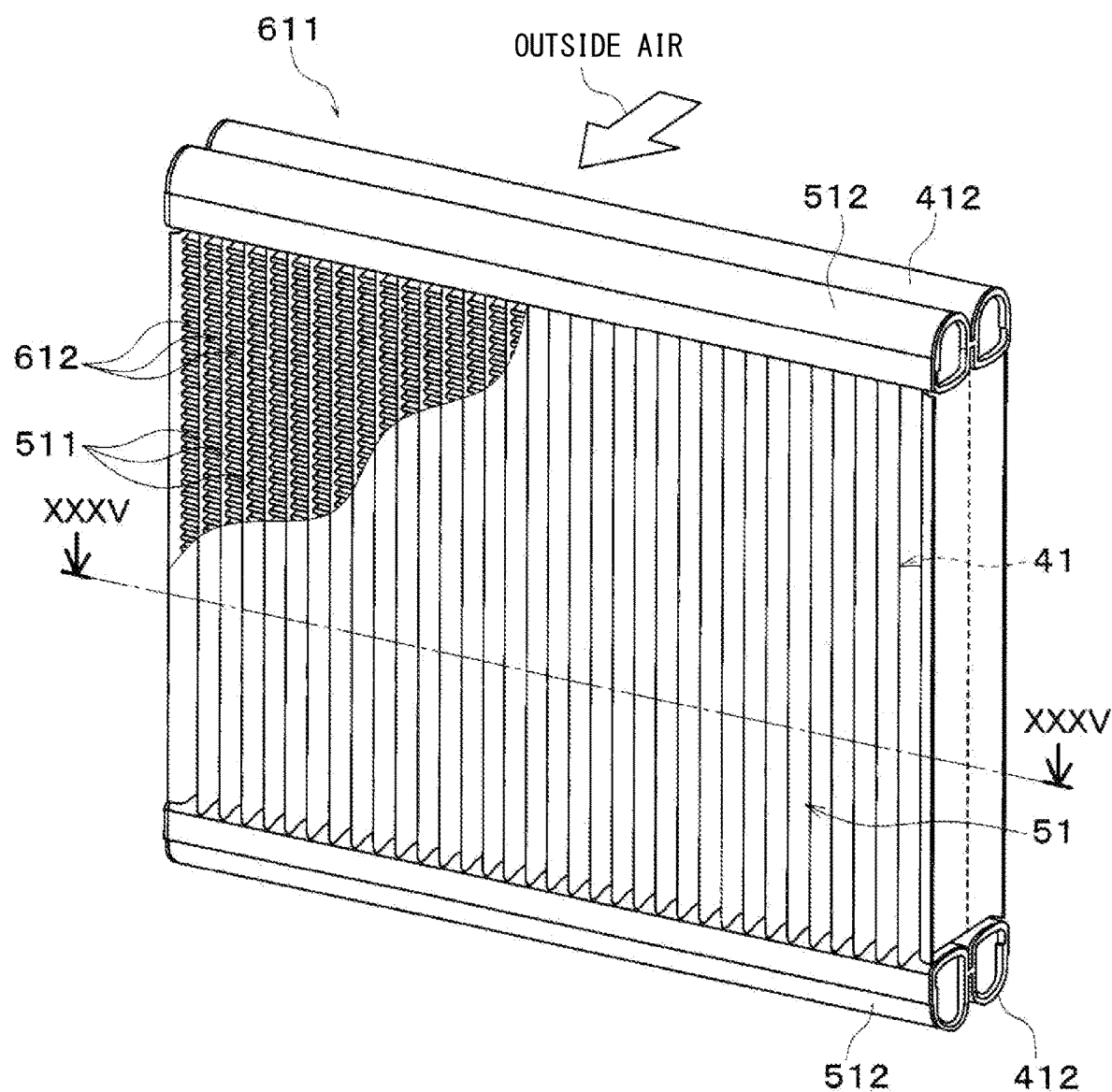
FIG. 34 is an external perspective view of a composite heat exchanger of another embodiment.

Specifically, in the composite heat exchanger 611, as illustrated in FIG. 34, as the first radiator 41 and the second radiator 51, a tank-and-tube type heat exchanger is employed in the same manner as in the sixteenth embodiment. Therefore, the first radiator 41 has multiple first tubes 411 and a pair of first tanks 412. Similarly, the second radiator 51 has multiple second tubes 511 and a pair of second tanks 512.

The first tanks 412 and the second tanks 512 are made of the same member, and the multiple first tubes 411, a pair of first tanks 412, the multiple second tubes 511, the pair of second tanks 512, and heat exchanging fins 612 are integrally brazed and joined together. Consequently, the composite heat exchanger 611 into which the first radiator 41 and the second radiator 51 are integrated is formed.

Figure 35:
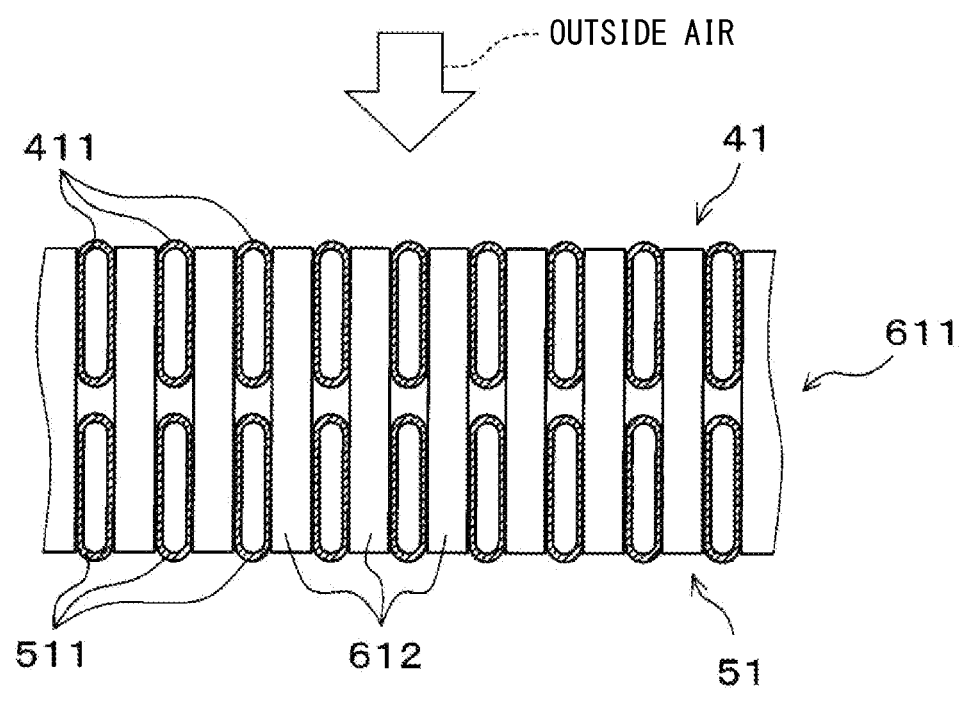
FIG. 35 is a cross-sectional view taken along the line XXXV-XXXV in FIG. 34.

In this case, in the composite heat exchanger 611, as illustrated in FIG. 35, the heat exchanging fins 612 made of a single metal member are disposed in an air passage provided between the first tubes 411 adjacent to each other and an air passage provided between the second tubes 511 adjacent to each other.

The heat exchanging fin 612 promotes heat exchange between the first heat medium circulated in the first tube 411 and the outside air, and also promotes heat exchange between the second heat medium circulated in the second tube 511 and the outside air that has passed through the first radiator 41. The heat exchanging fin 612 enables heat transfer between the first heat medium flowing through the first tube 411 and the second heat medium flowing through the second tube 511.

That is, in the composite heat exchanger 611, the first radiator 41 and the second radiator 51 are thermally connected to enable heat transfer between the first heat medium and the second heat medium. Thus, for example, when frost is formed on the first radiator 41, the heat of the second heat medium flowing through the second radiator 51 can be used to defrost the first radiator 41.

As in the heating operation mode of the third embodiment, when heat of the outside air is absorbed by the first heat medium in the first radiator 41 as a heat source for heating, heat of the second heat medium flowing through the second radiator 51 can also be absorbed by the first heat medium as a heat source for heating. Consequently, it is possible to improve the heating capacity of the ventilation air in the heater core 53.

In the above-described embodiments, an example in which the first heat medium, the second heat medium, and the heat medium respectively flow from the lower side to the upper side or from the upper side to the lower side in the first radiator 41, the second radiator 51, and the radiator 61 has been described, but the present disclosure is not limited thereto. For example, the media may flow in the horizontal direction.

When the first radiator 41 radiates heat from the first heat medium to the outside air, a flowing direction of the first heat medium flowing through the first radiator 41 is not limited to a direction of a flow from the upper side to the lower side. When heat is radiated from the first heat medium to the outside air, the flow may be from the lower side to the upper side.

Similarly, when the first heat medium absorbs heat from the outside air in the first radiator 41, a flowing direction of the first heat medium flowing through the first radiator 41 is not limited to a direction of a flow from the lower side to the upper side. When the first heat medium absorbs heat from the outside air, the flow may be from the upper side to the lower side. The same applies to the second radiator 51 and the radiator 61.

Each constituent device of the refrigeration cycle device 10 is not limited to that disclosed in the above-described embodiments. For example, in the above-described embodiments, an example in which an electric compressor is employed as the compressor 11 has been described, but an engine-driven compressor that is driven by a rotational driving force transmitted from an internal combustion engine may be employed.

In the above-described embodiments, an example in which R1234yf is used as the refrigerant has been described, but the refrigerant is not limited thereto. For example, R134a, R600a, R410A, R404A, R32, or R407C may be used. Alternatively, a mixture refrigerant in which multiple types of these refrigerants are mixed may be used.

Although the present disclosure has been described in accordance with the examples, it is understood that the present disclosure is not limited to the examples and structures. The present disclosure also includes various modifications or alterations within the equivalent scope. Various combinations or forms, and other combinations or forms including only one element, or more or less elements, fall within the scope and the spirit of the present disclosure.

What is claimed is:

1. A temperature adjusting device comprising:
   an evaporation-side target-object heat exchanger in which a first heat medium flows to exchange heat with an evaporation-side target object;
   a refrigeration cycle device that includes a condenser configured to condense a high-pressure refrigerant discharged from a compressor that compresses and discharges a refrigerant, and an evaporator configured to evaporate a low-pressure refrigerant pressure reduced in a pressure reducing portion that reduces a pressure of the high-pressure refrigerant;
   a condensing-side heat exchanger that is thermally connected to the condenser and exchanges heat between a second heat medium and the high-pressure refrigerant;
   a first heat exchanger configured to exchange heat between the first heat medium flowing out of the evaporation-side target-object heat exchanger and outside air;
   a second heat exchanger configured to exchange heat between the second heat medium flowing out of the condensing-side heat exchanger and the outside air;
   an evaporation-side heat exchanger thermally connected to the evaporator and exchanges heat between the first heat medium and the low-pressure refrigerant;
   a first heat medium circuit that circulates the first heat medium;
   a second heat medium circuit that circulates the second heat medium; and
   a switching unit configured to switch circuit configurations of the first heat medium circuit, wherein
   the first heat exchanger exchanges heat between the first heat medium flowing out of the evaporation-side target-object heat exchanger and the outside air;
   the second heat exchanger exchanges heat between the second heat medium flowing out of the condensing-side heat exchanger and at least part of the outside air that has passed through the first heat exchanger,
   the first heat medium circuit and the second heat medium circuit are configured as independent heat medium circuits in which the first heat medium is not mixed with the second heat medium, and
   the switching unit is configured to switch a circuit configuration in which the first heat medium flowing out of the first heat exchanger flows into the evaporation-side target-object heat exchanger and a circuit configuration in which the first heat medium flowing out of the first heat exchanger flows into the evaporation-side heat exchanger.

2. The temperature adjusting device according to claim 1, further comprising:
   a heater configured to heat a heating target fluid by using the high-pressure refrigerant as a heat source, wherein the refrigeration cycle device is configured such that heat absorbed by the refrigerant from the first heat medium in the evaporator is radiated to the second heat medium in the condenser.

3. The temperature adjusting device according to claim 1, further comprising:
   a heater configured to heat a heating target fluid by using the high-pressure refrigerant as a heat source, wherein the refrigeration cycle device is configured such that heat absorbed by the refrigerant from the second heat medium in the evaporator is radiated to the second heat medium in the condenser.

4. The temperature adjusting device according to claim 1, further comprising:
   an outside-air-side target-object heat exchanger in which the first heat medium flows to exchange heat with an outside-air-side target object.

5. The temperature adjusting device according to claim 1, further comprising:
   an outside-air-side target-object heat exchanger in which the second heat medium flows to exchange heat with an outside-air-side target object.

6. The temperature adjusting device according to claim 1, wherein
   the first heat exchanger and the second heat exchanger are thermally connected to each other to perform heat transfer between the first heat medium and the second heat medium.

7. The temperature adjusting device according to claim 1, wherein
   the refrigeration cycle device further includes a fluid-side evaporator configured to evaporate the refrigerant pressure reduced in a fluid-side pressure reducing portion that reduces a pressure of the high-pressure refrigerant, through heat exchange with a cooling target fluid, and
   the evaporator and the fluid-side evaporator are connected in parallel to each other, with respect to a flow of the high-pressure refrigerant flowing out of the condenser.

8. The temperature adjusting device according to claim 7, further comprising:
   an evaporation-side heat exchanger that is thermally connected to the evaporator and exchanges heat between the first heat medium and the low-pressure refrigerant, wherein the cooling target fluid is ventilation air blown to a space to be air conditioned; and
   an inside-outside air switch unit configured to adjust a ratio between inside air in the space to be air conditioned and outside air outside the space to be air conditioned, in the ventilation air flowing into the fluid-side evaporator, wherein
   the inside-outside air switch unit increases a ratio of the outside air, when an operation mode in which the cooling target fluid is cooled in the fluid-side evaporator is switched to an operation mode in which the cooling target fluid is cooled in the fluid-side evaporator and the first heat medium cooled in the evaporation-side heat exchanger flows into the evaporation-side target-object heat exchanger.

* * * * *